(12) United States Patent
Nishikori et al.

(10) Patent No.: US 7,878,613 B2
(45) Date of Patent: Feb. 1, 2011

(54) PRINT DATA GENERATION METHOD, PRINTING APPARATUS AND METHOD OF GENERATING MASK

(75) Inventors: Hitoshi Nishikori, Inagi (JP); Hiroshi Tajika, Yokohama (JP); Yuji Konno, Kawasaki (JP); Yoshito Mizoguchi, Kawasaki (JP); Daisaku Ide, Tokyo (JP); Takeshi Yazawa, Yokohama (JP); Satoshi Seki, Kawasaki (JP); Hirokazu Yoshikawa, Kawasaki (JP); Hideaki Takamiya, Kawasaki (JP); Fumiko Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1009 days.

(21) Appl. No.: 11/558,324

(22) Filed: Nov. 9, 2006

(65) Prior Publication Data

US 2007/0126789 A1 Jun. 7, 2007

(30) Foreign Application Priority Data

Dec. 1, 2005 (JP) ............................. 2005-348248

(51) Int. Cl.
- *B41J 2/205* (2006.01)
- *B41J 2/15* (2006.01)
- *G06K 15/02* (2006.01)
- *H04N 1/60* (2006.01)

(52) U.S. Cl. ............................. 347/15; 347/41; 358/1.2; 358/1.9

(58) Field of Classification Search ................... 347/15, 347/40, 14, 41, 43; 358/1.2, 1.9, 3.01–3.03, 358/3.06, 501, 520
See application file for complete search history.

(56) References Cited

U.S. PATENT DOCUMENTS

| 5,818,474 | A | 10/1998 | Takahashi et al. |
| 6,042,212 | A | 3/2000 | Takahashi et al. |
| 6,206,502 | B1 * | 3/2001 | Kato et al. ..................... 347/41 |
| 6,527,364 | B2 | 3/2003 | Takahashi et al. |
| 6,601,939 | B2 | 8/2003 | Fujita et al. |
| 6,700,680 | B2 * | 3/2004 | Toyoda et al. .............. 358/3.03 |
| 6,779,873 | B2 * | 8/2004 | Maeda et al. ................. 347/43 |
| 6,874,864 | B1 | 4/2005 | Maeda et al. |
| 7,284,823 | B2 * | 10/2007 | Nishikori et al. .............. 347/40 |
| 7,303,247 | B2 * | 12/2007 | Maru et al. .................... 347/15 |
| 7,614,713 | B2 * | 11/2009 | Marumoto ................... 347/14 |

FOREIGN PATENT DOCUMENTS

| JP | 7-52390 A | 2/1995 |
| JP | 2002-96455 A | 4/2002 |
| JP | 2002144552 A | 5/2002 |
| JP | 2005-177992 A | 7/2005 |

* cited by examiner

*Primary Examiner*—Stephen D Meier
*Assistant Examiner*—Rene Garcia, Jr.
(74) *Attorney, Agent, or Firm*—Fitzpatrick, Cella, Harper & Scinto

(57) ABSTRACT

Mask patterns to be used for multi-pass printing make it possible to make a print with a higher quality at a higher speed. Specifically, by performing a swapping process with adjacency forbiddance, two points in the horizontal direction, or the scanning direction of a printing head, are selected in a buffer in which codes for each scan pass are set depending on printing ratios of a gradation mask. Subsequently, codes are swapped between the two points. By this swap, adjacencies between print permitting areas are eliminated in the mask pattern. As a result, when driving frequencies set for the printing head is kept constant, the scanning speed can be doubled at minimum.

4 Claims, 41 Drawing Sheets

FIG.30A
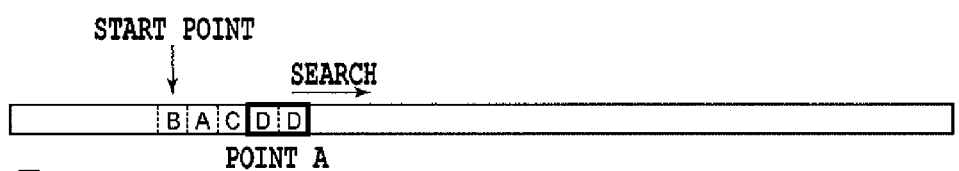
FIG.30B
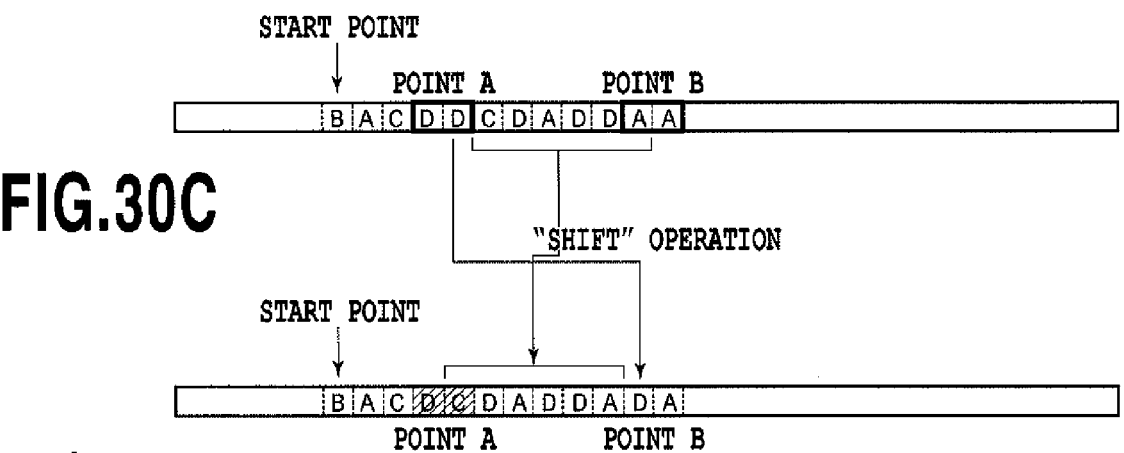
FIG.30C
FIG.30D

FIG.32A
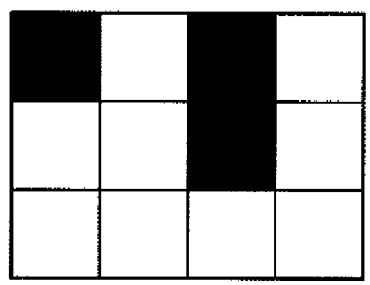
FIG.32B
FIRST SCAN
FIG.32C
SECOND SCAN
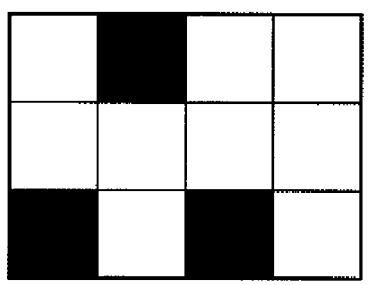
FIG.32D
THIRD SCAN
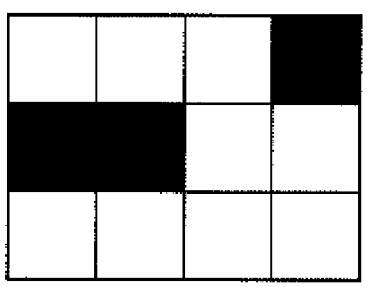
FIG.32E
FOURTH SCAN

FIG.41A  FIRST SCAN
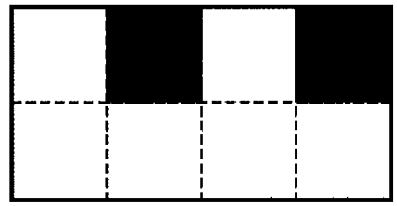
FIG.41B  SECOND SCAN
FIG.41C  THIRD SCAN
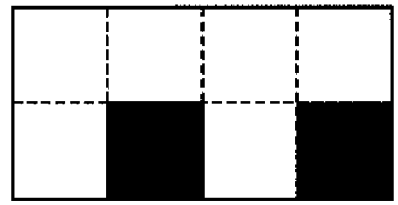
FIG.41D  FOURTH SCAN

PRINT DATA GENERATION METHOD, PRINTING APPARATUS AND METHOD OF GENERATING MASK

BACKGROUND OF THE INVENTION

1. Field of the Invention

The present invention relates to a print data generation method, a printing apparatus, a method of generating a mask, and a mask pattern. Specifically, the present invention relates to a method of generating a mask, and a mask pattern, which are used for multi-pass printing.

2. Description of the Related Art

Printing apparatuses of these years include an apparatus which performs so-called multi-pass printing, in which a print in a given printing region is completed by multiple scanning, for the purpose of forming an image which is intended to be formed on a printing medium with a higher image quality. Generally for the multi-pass printing method, AND operation is performed between print data and a mask pattern, which determines permitting/non-permitting printing based on each print data for each unit same as a pixel of print data, and thereby print data for each scanning are generated. Descriptions will be provided below for the multi-pass printing.

FIG. 4 which will be described in conjunction with an embodiment of the present invention schematically shows a printing head and print patterns for the purpose of describing the multi-pass printing method. Reference numeral P0001 denotes a printing head. In FIG. 4, it is supposed that the printing head has 16 printing elements (nozzles) for the purpose of simplifying the following descriptions. The nozzles are divided into four nozzle groups: a first to a fourth nozzle groups, as shown in FIG. 4. Each nozzle group includes four nozzles. Reference numeral P0002 denotes mask patterns. In each mask pattern, a unit area corresponding to a pixel which permits printing based on print data is blackened, and a unit area corresponding to a pixel which does not permit printing based on print data is whitened. The patterns which are printed by those nozzle groups are complementary to one another. When these printed patterns are superposed over one another, a print to be made in a region corresponding to 4×4 areas is completed by four times of scanning.

Each of print patterns denoted by reference numerals P0003 to P0006 shows how an image is progressing toward its completion each time a scan is repeated. Every time one scan is completed, a printing medium is conveyed in a distance equal to a width of a corresponding one of the nozzle groups in a direction indicated by an arrow. Thereby, an image to be formed in a given region (corresponding to the width of each of the nozzle groups) in the printing medium is completed by print scanning four times.

As described above, printing of each region in the printing medium is completed by scanning a plurality of times and by using a plurality of printing nozzle groups. This brings about an effect of reducing variation in printing properties particular to the respective nozzles, of reducing variation in precision with which a printing medium is conveyed, and of reducing equivalent problems. In addition, if ingenuity is exerted in arranging print permitting areas and print non-permitting areas in each of the mask patterns, this can be adopted as countermeasures for other various problems with an image and with reliability of the printing apparatus.

For example, in the case of an inkjet printing head of recent years which ejects a larger number of fine ink droplets with higher frequencies, the direction in which droplets are ejected from each of nozzles located in end portions of the printing head has a tendency to be inward. In this case, dots to be formed by the nozzles located in the end portions of each nozzle row sometimes causes a white stripe (hereinafter referred to as an "end stripe") with a pitch equal to the printing width of the printing head. This is because the dots are landed in inner positions which deviate from their normal positions. Even in such a situation, if ingenuity is exerted in arranging the foregoing mask patterns, this makes it possible to make the end stripe less conspicuous (Japanese Patent Application Laid-open No. 2002-096455).

FIG. 5 which will be similarly described in conjunction with the embodiment of the present invention shows an example of mask patters to be adopted for the purpose of reducing the occurrence of this kind of end stripe. Blackened areas in the mask patterns shown in FIG. 5 perform the same function as the blackened areas in the mask patterns shown in FIG. 4 perform, and indicate areas which permit printing based on print data (print permitting areas). On the other hand, whitened areas in the mask patterns shown in FIG. 5 perform the same function as the whitened areas in the mask patterns shown in FIG. 4 perform, and indicate areas which does not permit printing based on print data (print non-permitting areas). In FIG. 5, a case where a multi-pass printing with four passes is performed four times by use of a printing head with 768 nozzles (a print is completed by scanning four times) is shown as the example. The 768 nozzles in total of the example shown in FIG. 5 are divided into four nozzle groups similarly to the example shown in FIG. 4. In the case of the mask shown in FIG. 5, a printing ratio (a ratio of the number of blackened areas constituting the mask pattern to the sum of the numbers of blackened and whitened areas constituting the same mask pattern) varies depending on where the nozzles are located. Printing ratios of a mask pattern corresponding to the first nozzle group are 10% and 20% respectively from nozzles shown lowermost in the figure. In addition, printing ratios of a mask pattern corresponding to the second nozzle group are 30% and 40%. Printing ratios of a mask pattern corresponding to the third nozzle group are 40% and 30%. Printing ratios of a mask pattern corresponding to the fourth nozzle group are 20% and 10%. A total of the printing ratios of the mask patterns corresponding to these four nozzle groups is 100%. More specifically, mask patterns corresponding to respective lower parts of the first to fourth nozzle groups are complementary to one another and then have the printing ratio of 100% (=10%+40%+30%+20%). Also, mask patterns corresponding to respective upper parts of the first to fourth nozzle groups are complementary to one another and then have the printing ratio of 100% (=20%+40%+30%+10%).

In the case of the mask shown in FIG. 5, as described above, the printing ratios corresponding to nozzles located in the center parts are set relatively high. The closer to the end parts nozzles are located, the lower the printing ratios corresponding to the nozzles are. It has been observed that the direction in which droplets are ejected from each of nozzles located in end portions of a nozzle row has a more marked tendency to be inward when a print is made by ejecting finer ink droplets in higher density with higher frequencies. For this reason, the setting of the printing ratios in the end portions lower than the printing ratios in the center portions makes it possible to reduce the tendency that the direction in which droplets are ejected from each of the nozzles located in the end portions of each nozzle row are inward. In addition, even if the direction in which droplets are ejected from each of the nozzles located in the end portions of the nozzle row has a slight tendency to be inward, the mask as shown in FIG. 5 brings about an effect of making less conspicuous the end stripe which would otherwise be obviously caused by deviation of landing positions of ejected inks from their normal positions, as well. This is because the number of dots to be ejected therefrom is reduced.

In the case of inkjet printing apparatuses each with the importance placed on image quality of a picture, a smaller number of dots, higher density of nozzles and higher frequencies for drive are important factors for satisfying both of the image quality and the printing speed. For this reason, the mask with the ratios decreasing from the highest in the center portion of the nozzle arrangement to the lowest in the end portions thereof along the nozzle arrangement (hereinafter also referred to as a "gradation mask") as shown in FIG. 5 is generally considered as being useful of inkjet printing apparatuses of recent years with the importance placed on high-quality printing such as image quality of a picture.

In addition, a random mask with white noise properties as described in Japanese Patent Application Laid-open No. 7-052390 (1995) and a mask with blue noise properties as described in Japanese Patent Application Laid-open No. 2002-144552 are often employed as a mask pattern used for the multi-pass printing method. These mask patterns have a characteristic that print permitting areas and print non-permitting areas are arranged a periodically. Accordingly, these mask patterns have an advantage that a fine texture rarely appears in an image formed by use of the multi-pass printing method.

If the mask patterns each with the characteristic of the a periodical arrangement as described in Japanese Patent Application Laid-open Nos. 7-052390 (1995) and 2002-144552 are applied to the mask as described in Japanese Patent Application Laid-open No. 2002-096455, this makes it possible to print an image with high-quality which meets requirements for a smaller number of dots and higher density of nozzles.

In a case, however, where the masks disclosed as the prior arts are used in combination as described above, such a use can not be sometimes adapted for high-speed printing. Specifically, in the case of the foregoing conventional mask patterns respectively with the white noise properties and the blue noise properties, and in the case of the mask pattern with printing ratios varying depending on the positions of the nozzles of the printing head, the print permitting areas often exist adjacent to one another in a direction in which the printing head scans. In the case of the gradation mask described in Japanese Patent Application Laid-open No. 2002-096455 in particular, the printing ratios of the masks corresponding to the nozzles located in the center portion are relatively high. For this reason, the print permitting areas are often adjacent to one another in the scanning direction. On the other hand, for the purpose of executing printing in the scanning direction based on print data corresponding to one of the nozzles, the frequency for driving the nozzle is often set so that the nozzle can be driven depending on the distance (pitch) between two adjacent print permitting areas in the mask. In other words, when the highest possible frequencies for driving the nozzles of the printing head are constant, it needs to be considered that the highest frequencies each for driving the nozzle are caused to correspond to a distance which is the shortest among distances between the two print permitting areas in the scanning direction (a distance between the adjacent print permitting areas in the case of the example described in the foregoing patent documents). In this case, the shorter this shortest distance is, the lower the scanning speed of the printing head needs to be, so that dots can be printed in positions, the distance between which is the shortest.

By contrast, consideration can be give to a mask in which, as shown in FIGS. 41A to 41D, for example, mask data of the mask patterns are arranged in a way that, simply, print permitting areas are not adjacent to each other, and in which the shortest distance can be thus extended. FIGS. 41A to 41D respectively show mask patterns to be used for the first to the fourth passes in the multi-pass printing method. In the case of these mask patterns, mask data are arranged in a way that the print permitting areas are not adjacent to each other in the scanning direction. This arrangement makes it possible to double the scanning speed in comparison with the case where there are print permitting areas adjacent to each other, and thus to realize high-speed printing, when the frequencies for driving the nozzles of the printing head are set to be constant.

When, however, the mask patterns each with the characteristic of the periodical arrangement as shown in FIGS. 41A to 41D are applied to such a mask pattern with the characteristic of the a periodical arrangement as described in Japanese Patent Application Laid-open Nos. 7-052390 (1995) and 2002-144552, this application impairs the characteristic of the a periodical arrangement which is brought about by the mask pattern. In other words, the foregoing periodical patterns do no have the characteristic of the a periodical arrangement which is brought by the mask patterns as described in these patent documents. This makes it impossible to expect high-quality printing which can be realized on the basis of the techniques described in these patent documents.

SUMMARY OF THE INVENTION

An object of the present invention is to provide a print data generating method and a printing apparatus which make it possible to realize high-quality printing and high-speed printing. Another object of the present invention is to provide a mask patterns and a generating method of the mask pattern which make it possible to realize such high-quality printing and such high-speed printing.

In the first aspect of the present invention, there is provided a method of generating print data for printing by a plurality of times of scanning of a print head arranging a plurality of nozzles to a given region on a print medium, said method comprising: a step of generating print data for printing in each of the plurality of times of scanning, by thinning print data for printing on the given region with use of a plurality of mask patterns corresponding to the plurality of times of scanning, respectively, wherein each of the plurality of mask patterns corresponding to the plurality of times of scanning arranges print permitting areas that permit printing based on the print data and print non-permitting areas that do not permit printing based on the print data in a scanning direction, in correspondence with each of the plurality of nozzles, and the print permitting areas are not adjacent to each other in the scanning direction, and wherein a ratio of the print permitting areas in the mask pattern corresponding to end nozzles of the printing head are smaller than a ratio of the print permitting areas in the mask pattern corresponding to central nozzles of the printing head.

In the second aspect of the present invention, there is provided a printing apparatus for printing by a plurality of times of scanning of a print head arranging a plurality of nozzles to a given region on a print medium, said apparatus comprising: generating unit that generates print data for printing in each of the plurality of times of scanning, by thinning print data for printing on the given region with use of a plurality of mask patterns corresponding to the plurality of times of scanning, respectively, wherein each of the plurality of mask patterns corresponding to the plurality of times of scanning arranges print permitting areas that permit printing based on the print data and print non-permitting areas that do not permit printing based on the print data in a scanning direction, in correspondence with each of the plurality of nozzles, and the print permitting areas are not adjacent to each other in the scanning direction, and wherein a ratio of the print permitting areas in the mask pattern corresponding to end nozzles of the printing head are smaller than a ratio of the print permitting areas in the mask pattern corresponding to central nozzles of the printing head.

In the third aspect of the present invention, there is provided an ink jet printing apparatus capable of performing a plurality of times of scanning with a print head arranging a plurality of nozzles to a given region on a print medium to print thinned images with use of different nozzle groups of the print head for each of the plurality of times of scanning so that an image to be printed to the given region is completed, said apparatus comprising: generating unit that generates print data for printing in each of the plurality of times of scanning, by thinning print data for printing on the given region with use of a plurality of mask patterns corresponding to a plurality of nozzle groups used in the plurality of times of scanning respectively; and print controller that prints the tinned image with use of the nozzle group which is opposed to the given region based on the generated print data, in each of the plurality of times of scanning, wherein each of the plurality of mask patterns arranges print permitting areas and print non-permitting areas so that a ratio of the print permitting areas corresponding to a nozzle at a part closer to an end of the nozzle arrangement is smaller than a ratio of the print permitting areas corresponding to a nozzle at a part closer to a center of the nozzle arrangement, and the print permitting areas are arranged to be not adjacent to each other and to be aperiodic, in a scanning direction, and wherein a ratio of the print permitting areas in the mask pattern corresponding to the nozzle group including an end nozzle of the printing head are smaller than a ratio of the print permitting areas in the mask pattern corresponding to the nozzle group including no end nozzle.

In the fourth aspect of the present invention, there is provided an ink jet printing apparatus capable of performing a plurality of times of scanning with a print head arranging a plurality of nozzles to a given region on a print medium to print thinned images with use of different nozzles of the print head for each of the plurality of times of scanning so that an image to be printed to the given region is completed, said apparatus comprising: convey device that conveys the print medium by an amount corresponding to one nozzle group of a plurality of nozzle groups that are made by dividing the plurality of nozzles in predetermined number of parts, in order to oppose each of the plurality of nozzle groups to the given region for each of the plurality of times of scanning; generating unit that generates print data for printing in each of the plurality of times of scanning, by thinning print data for printing on the given region with use of a plurality of mask patterns corresponding to a plurality of nozzle groups used in the plurality of times of scanning respectively; and print controller that prints the tinned image with use of the nozzle group which is opposed to the given region based on the generated print data, in each of the plurality of times of scanning, wherein each of the plurality of mask patterns arranges print permitting areas and print non-permitting areas so that the farther from a central part of the nozzle arrangement along the nozzle arrangement, ratios of the print permitting areas become smaller, and the print permitting areas are arranged to be not adjacent to each other and to be aperiodic, in a scanning direction, and wherein a ratio of the print permitting areas in the mask pattern corresponding to the nozzle group including an end nozzle of the printing head are smaller than a ratio of the print permitting areas in the mask pattern corresponding to the nozzle group including no end nozzle.

In the fifth aspect of the present invention, there is provided a method of generating mask patterns used for generating print data for execution of printing in each of a plurality of times of scanning, by thinning print data for printing on a given region with use of a plurality of mask patterns corresponding to the plurality of times of scanning, respectively, in the case that the plurality of times of scanning with a print head arranging a plurality of nozzles is performed to a given region on a print medium to execute printing, said method comprising: a code setting step of setting an array of respective codes corresponding to the plurality of times of scanning in a direction corresponding to the scanning direction, in accordance with ratio of print permitting areas, the ratio being determined in accordance with position of the nozzle in the print head; a interchanging step of interchanging positions of codes so that same codes which are adjacent to each other are excluded in the set array of codes; and a conversion step of converting the array of code for which interchanging positions of codes has been executed into an arrangement of the print permitting areas for each of the plurality of times of scanning.

With the foregoing configuration, a white stripe and the like can be avoided by setting the printing ratios depending on the positions of corresponding nozzles. In addition, high-speed printing can be realized by generating a mask pattern in which print permitting areas are not adjacent to each other in the horizontal direction (scanning direction).

Moreover, in a case where change of the foregoing codes is selected at random, a code after scanning a plurality of times and a resultant arrangement of print permitting areas have the characteristic of the aperiodical arrangement. This makes it possible to realize high-quality printing without textures.

Further features of the present invention will become apparent from the following description of exemplary embodiments (with reference to the attached drawings).

BRIEF DESCRIPTION OF THE DRAWING

FIGS. 30A to 30D are diagrams for explaining an adjacency eliminating process to be performed in the process of generating the mask pattern according to the first embodiment;

FIGS. 32A to 32E are diagrams for explaining a "conversion to mask pattern" step to be performed in the process of generating the mask pattern according to the first embodiment;

FIGS. 41A to 41D are diagrams showing examples of a mask pattern of a conventional example where pieces of data are not adjacent to each other.

DESCRIPTION OF THE EMBODIMENTS

Figure 1:
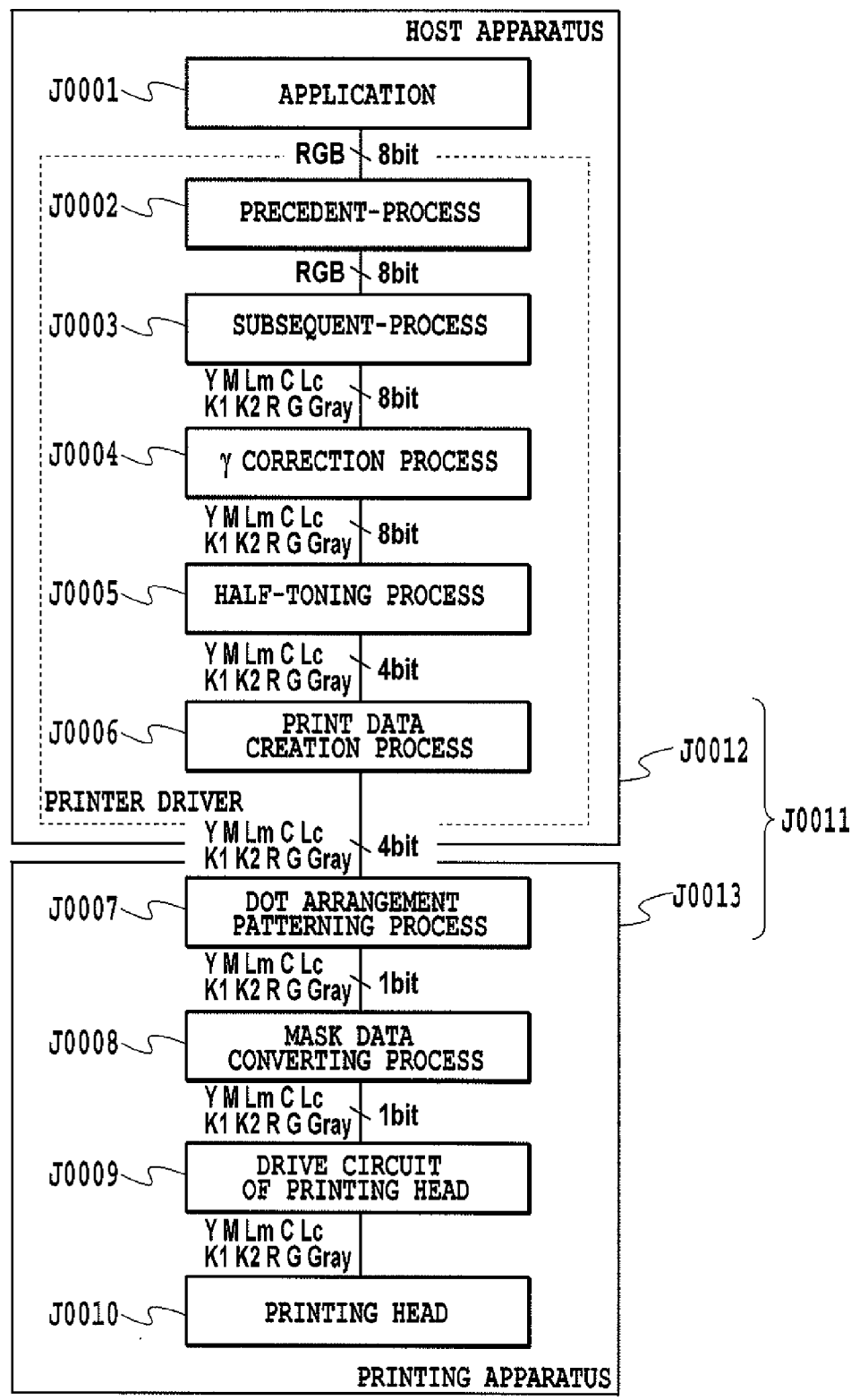
FIG. 1 is a diagram for explaining a flow in which image data are processed in a printing system to which an embodiment of the present invention is applied.

Descriptions will be provided below for embodiments of the present invention by referring to the drawings.

1. Basic Configuration 1.1 Outline of Printing System

FIG. 1 is a diagram for explaining a flow in which image data are processed in a printing system to which an embodiment of the present invention is applied. This printing system J0011 includes a host apparatus J0012 which generates image data indicating an image to be printed, and which sets up a user interface (UI) for generating the data and so on. In addition, the printing system J0011 includes a printing apparatus J0013 which prints an image on a printing medium on the basis of the image data generated by the host apparatus J0012. The printing apparatus J0013 performs a printing operation by use of 10 color inks of cyan (C), light cyan (Lc), magenta (M), light magenta (Lm), yellow (Y), red (R), green (G), black 1 (K1), black 2 (K2) and gray (Gray). To this end, a printing head H1001 for ejecting these 10 color inks is used for the printing apparatus J0013. These 10 color inks are pigmented inks respectively including ten color pigments as the color materials thereof.

Programs operated with an operating system of the host apparatus J0012 include an application and a printer driver. An application J0001 executes a process of generating image data with which the printing apparatus makes a print. Personal computers (PC) are capable of receiving these image data or pre-edited data which is yet to process by use of various media. By means of a CF card, the host apparatus according to this embodiment is capable of populating, for example, JPEG-formatted image data associated with a photo taken with a digital camera. In addition, the host apparatus according to this embodiment is capable of populating, for example, TIFF-formatted image data read with a scanner and image data stored in a CD-ROM. Moreover, the host apparatus according to this embodiment is capable of capturing data from the Web through the Internet. These captured data are displayed on a monitor of the host apparatus. Thus, an edit, a process or the like is applied to these captured data by means of the application J001. Thereby, image data R, G and B are generated, for example, in accordance with the sRGB specification. A user sets up a type of printing medium to be used for making a print, a printing quality and the like through a UI screen displayed on the monitor of the host apparatus. The user also issues a print instruction through the UI screen. Depending on this print instruction, the image data R, G and B are transferred to the printer driver.

The printer driver includes a precedent process J0002, a subsequent process J0003, a γ correction process J0004, a half-toning process J0005 and a print data creation process J0006 as processes performed by itself. Brief descriptions will be provided below for these processes J0002 to J0006.

(A) Precedent Process

The precedent process J0002 performs mapping of a gamut. In this embodiment, data are converted for the purpose of mapping the gamut reproduced by image data R, G and B in accordance with the sRGB specification onto a gamut to be produced by the printing apparatus. Specifically, a respective one of image data R, G and B deal with 256 gradations of the respective one of colors which are represented by 8 bits. These image data R, G and B are respectively converted to 8-bit data R, G and B in the gamut of the printing apparatus J0013 by use of a three-dimensional LUT.

(B) Subsequent Process

On the basis of the 8-bit data R, G and B obtained by mapping the gamut, the subsequent process J0003 obtains 8-bit color separation data on each of the 10 colors. The 8-bit color separation data correspond to a combination of inks which are used for reproducing a color represented by the 8-bit data R, G and B. In other words, the subsequent process J0003 obtains color separation data on each of Y, M, Lm, C, Lc, K1, K2, R, G, and Gray. In this embodiment, like the precedent process, the subsequent process is carried out by using the three dimensional LUT, simultaneously using an interpolating operation.

(C) γ Correction Process

The γ correction J0004 converts the color separation data on each of the 10 colors which have been obtained by the subsequent process J0003 to a tone value (gradation value) representing the color. Specifically, a one-dimensional LUT corresponding to the gradation characteristic of each of the color inks in the printing apparatus J0013 is used, and thereby a conversion is carried so that the color separation data on the 10 colors can be linearly associated with the gradation characteristics of the printer.

(D) Half-Toning Process

The half-toning process J0005 quantizes the 8-bit color separation data on each of Y, M, Lm, C, Lc, K1, K2, R, G and Gray to which the γ correction process has been applied so as to convert the 8-bit separation data to 4-bit data. In this embodiment, the 8-bit data dealing with the 256 gradations of each of the 10 colors are converted to 4-bit data dealing with 9 gradations by use of the error diffusion method. The 4-bit data are data which serve as indices each for indicating a dot arrangement pattern in a dot arrangement patterning process in the printing apparatus.

(E) Print Data Creation Process

The last process performed by the printer driver is the print data creation process J0006. This process adds information on print control to data on an image to be printed whose contents are the 4-bit index data, and thus creates print data.

Figure 2:
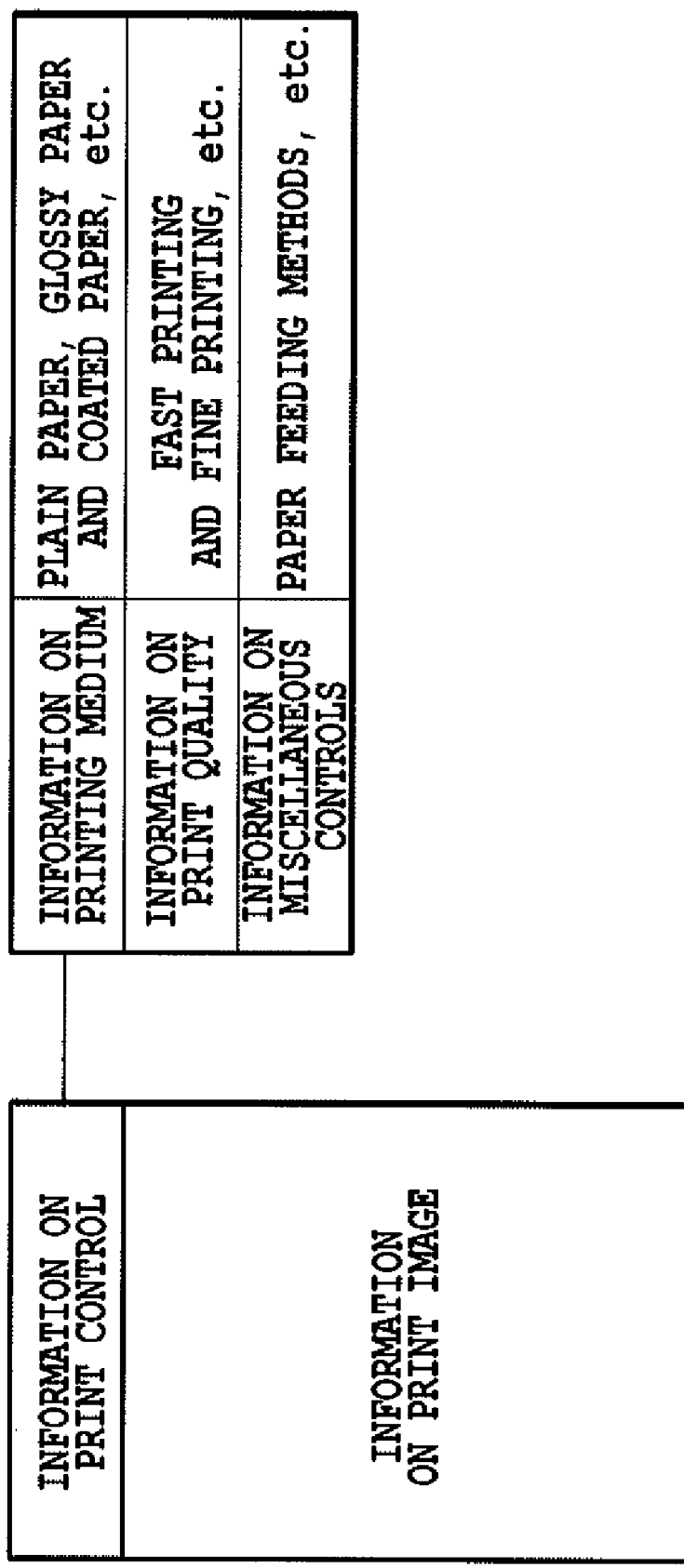
FIG. 2 is an explanatory diagram showing an example of a configuration of print data transferred from a printer driver of a host apparatus to a printing apparatus in the printing system shown in FIG. 1.

FIG. 2 is a diagram showing an example of a configuration of the print data. The print data are configured of the information on print control and the data on an image to be printed. The information on print control is in charge of controlling a printing operation. The data on an image to be printed indicates an image to be printed (the data are the foregoing 4-bit index data). The information on print control is configured of "information on printing medium," "information on print quality," and "information on miscellaneous controls" including information on paper feeding methods or the like. Types of printing media on which to make a print are described in the information on printing medium. One type of printing medium selected out of a group of plain paper, glossy paper, a post card, a printable disc and the like is specified in the information on printing medium. Print quality to be sought is described in the information on print quality. One type of print quality selected out of a group of "fine (high-quality print)," "normal," "fast (high-speed print)" and the like is specified in the information on print quality. Note that these pieces of information on print control are formed on the basis of contents which a user designates through the UI screen in the monitor of the host apparatus J0012. In addition, image data originated in the half-toning process J0005 are described in the data on an image to be printed. The print data thus generated are supplied to the printing apparatus J0013.

The printing apparatus J0013 performs a dot arrangement patterning process J0007 and a mask data converting process J0008 on the print data which have been supplied from the host apparatus J0012. Descriptions will be provided next for the dot arrangement patterning process J0007 and the mask data converting process J0008.

(F) Dot Arrangement Patterning Process

In the above-described half-toning process J0005, the number of gradation levels is reduced from the 256 tone values dealt with by multi-valued tone information (8-bit data) to the 9 tone values dealt with by information (4-bit data). However, data with which the printing apparatus J0013 is actually capable of making a print are binary data (1-bit) data on whether or not an ink dot should be printed. Taken this into consideration, the dot arrangement patterning process J0007 assigns a dot arrangement pattern to each pixel represented by 4-bit data dealing with gradation levels 0 to 8 which are an outputted value from the half-toning process J0005. The dot arrangement pattern corresponds to the tone value (one of the levels 0 to 8) of the pixel. Thereby, whether or not an ink dot should be printed (whether a dot should be on or off) is defined for each of a plurality of areas in each pixel. Thus, 1-bit binary data indicating "1 (one)" or "0 (zero)" are assigned to each of the areas of the pixel. In this respect, "1 (one)" is binary data indicating that a dot should be printed. "0 (zero)" is binary data indicating that a dot should not be printed.

Figure 3:
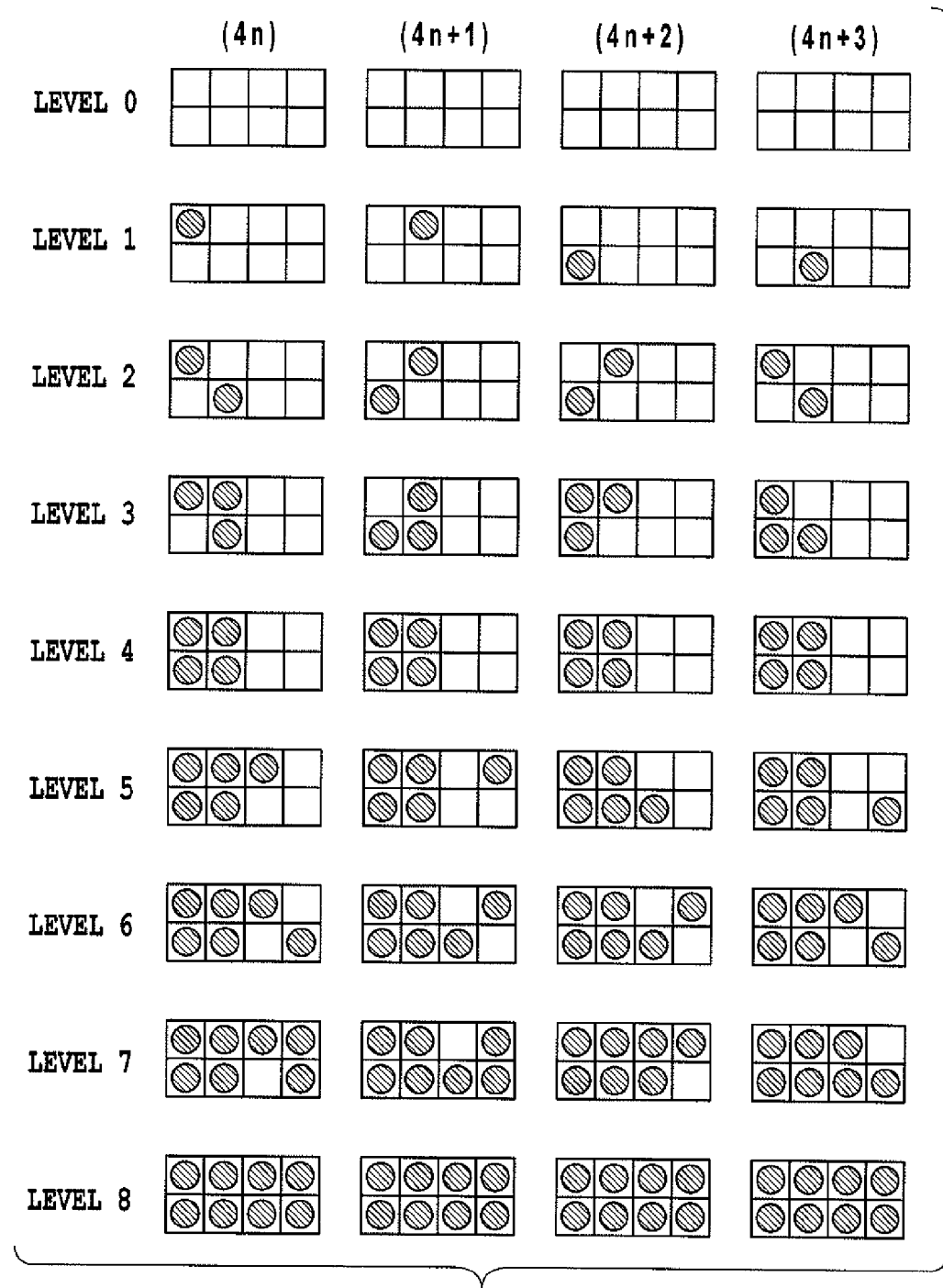
FIG. 3 is a diagram showing output patterns which correspond to input levels, and which are obtained by conversion in a dot arrangement patterning process in the printing apparatus used in the embodiment.

FIG. 3 shows output patterns corresponding to input levels 0 to 8. These output patterns are obtained through the conversion performed in the dot arrangement patterning process of the embodiment. Level numbers in the left column in the diagram correspond respectively to the levels 0 to 8 which are the outputted values from the half-toning process in the host apparatus. Regions each configured of 2 vertical areas×4 horizontal areas are shown to the right of this column. Each of the regions corresponds to a region occupied by one pixel receiving an output from the half-toning process. In addition, each of the areas in one pixel corresponds to a minimum unit for which it is specified whether the dot thereof should be on or off. Note that, in this description, a "pixel" means a minimum unit which is capable of representing a gradation, and also means a minimum unit to which the image processes (the precedent process, the subsequent process, the γ correction process, the half-toning process and the like) are applied using multi-valued data represented by the plurality of bits.

In this figure, an area in which a circle is drawn denotes an area where a dot is printed. As the level number increases, the number of dots to be printed increases one-by-one. In this embodiment, information on density of an original image is finally reflected in this manner.

From the left to the right, (4n) to (4n+3) denotes horizontal positions of pixels, each of which receives data on an image to be printed. An integer not smaller than 1 (one) is substituted for n in the expression (4n) to (4n+3). The patterns listed under the expression indicate that a plurality of mutually-different patterns are available depending on a position where a pixel is located even though the pixel receives an input at the same level. In other words, the configuration is that, even in a case where a pixel receives an input at one level, the four types of dot arrangement patterns under the expression (4n) to (4n+3) at the same level are assigned to the pixel in an alternating manner.

In FIG. 3, the vertical direction is a direction in which the ejection openings of the printing head are arrayed, and the horizontal direction is a direction in which the printing head moves. The configuration enabling a print to be made using the plurality of different dot arrangement patterns for one level brings about the following two effects. First, the number of times that ejection is performed can be equalized between two nozzles in which one nozzle is in charge of the patterns located in the upper row of the dot arrangement patterns at one level, and the other nozzle is in charge of the patterns located in the lower row of the dot arrangement patterns at the same level. Secondly, various noises unique to the printing apparatus can be disgregated.

When the above-described dot arrangement patterning process is completed, the assignment of dot arrangement patterns to the entire printing medium is completed.

(G) Mask Data Converting Process

In the foregoing dot arrangement patterning process J0007, whether or not a dot should be printed is determined for each of the areas on the printing medium. As a result, if binary data indicating the dot arrangement are inputted to a drive circuit J0009 of the printing head H1001, a desired image can be printed. In this case, what is termed as a one-pass print can be made. The one-pass print means that a print to be made for a given scan region on a printing medium is completed by the printing head H1001 moving once. Alternatively, what is termed as a multi-pass print can be made. The multi-pass print means that a print to be made for a given scan region on the printing medium is completed by the printing head moving a plurality of times. Here, descriptions will be provided for a mask data converting process, taking an example of the multi-pass print.

Figure 4:
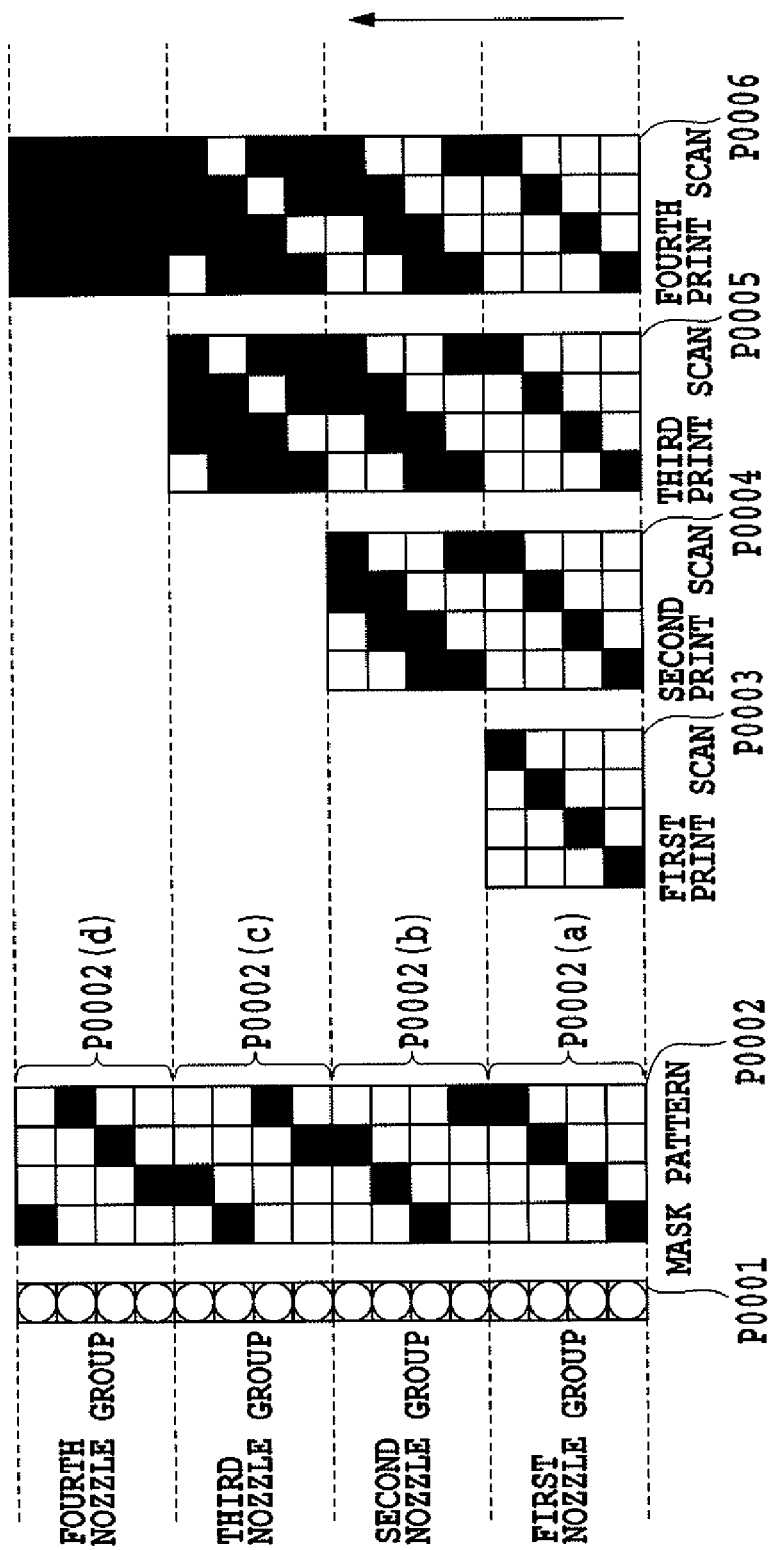
FIG. 4 is a schematic diagram for explaining a multi-pass printing method which is performed by the printing apparatus used in the embodiment.

FIG. 4 is a schematic diagram showing the printing head and print patterns for the purpose of describing the multi-pass printing method. The print head H1001 applied to this embodiment actually has 768 nozzles. For the sake of convenience, however, descriptions will be provided for the printing head and the print patterns, supposing that the printing head H1001 has 16 nozzles. The nozzles are divided into a first to a fourth nozzle groups. Each of the four nozzle groups includes four nozzles. Mask P0002 are configured of a first to a fourth mask patterns P0002(*a*) to P0002(*d*). The first to the fourth mask patterns P0002(*a*) to P0002(*d*) define the respective areas in which the first to the fourth nozzle groups are capable of making a print. Blackened areas in the mask patterns indicate print permitting areas, whereas whitened areas in the mask patterns indicate print non-permitting areas. The first to the fourth mask patterns are complementary to one another. The configuration is that, when these four mask patterns are superposed over one another, a print to be made in a region corresponding to a 4×4 area is completed. Mask patterns according to embodiments of the present invention are what will be explained with reference to FIG. 5 or FIG. 20 and following drawings, and are not so simple patterns as shown in FIG. 4. FIG. 4 shows a relatively simple pattern for the purpose of simplification of explaining a mask pattern.

Patterns denoted by reference numerals P0003 to P0006 show how an image is going to be completed by repeating a print scan. Each time a print scan is completed, the printing medium is transferred by a width of the nozzle group (a width of four nozzles in this figure) in a direction indicated by an arrow in the figure. In other words, the configuration is that an image in any same region (a region corresponding to the width of each nozzle region) on the printing medium is completed by repeating the print scan four times. Formation of an image in any same region on the printing medium by use of multiple nozzle groups by repeating the scan the plurality of times in the afore-mentioned manner makes it possible to bring about an effect of reducing variations characteristic of the nozzles, and an effect of reducing variations in accuracy in transferring the printing medium.

Figure 5:
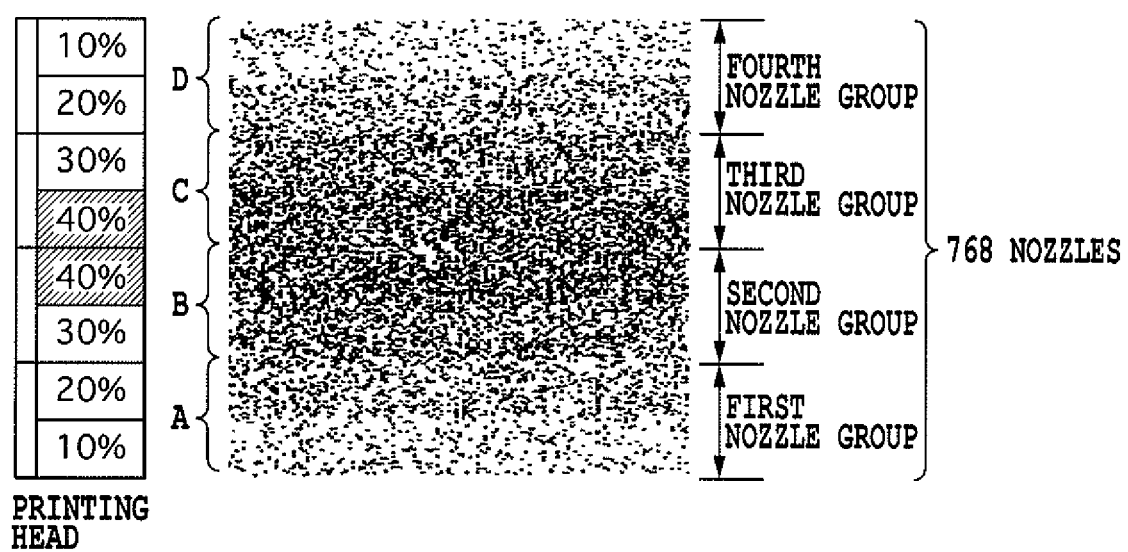
FIG. 5 is an explanatory diagram showing an example of mask patterns which are applied to the multi-pass printing method which is performed by the printing apparatus used in the embodiment.

FIG. 5 shows an example of mask which is capable of being actually applied to this embodiment. The printing head H1001 to which this embodiment is applied has 768 nozzles, and 192 nozzles belong to each of the four nozzle groups. As for the size of the mask, the mask has 768 areas in the vertical direction, and this number is equal to the number of nozzles. The mask has 256 areas in the horizontal direction. The mask has a configuration that the four mask patterns respectively corresponding to the four nozzle groups maintain a complementary relationship among themselves.

In the case of the ink jet printing head applied to this embodiment, which ejects a large number of fine ink droplets by means of a high frequency, it has been known that an air flow occurs in a neighborhood of the printing part during printing operation. In addition, it has been proven that this air flow particularly affects a direction in which ink droplets are ejected from nozzles located in the end portions of the printing head. For this reason, in the case of the mask patterns of this embodiment, a distribution of printable ratios is biased among nozzle groups or is biased depending on where a region is located in each of the nozzle groups, as seen from FIG. 5. As shown in FIG. 5, by employing the mask patterns having a configuration which makes the printable ratios of the nozzles in the end portions of the printing head smaller than those of nozzles in a central portion thereof, it is possible to make inconspicuous an adverse effect stemming from variations in positions where ink droplets ejected from the nozzles in the end portions of the printing head are landed.

Note that a printable ratio specified by a mask pattern is as follows. A printable ratio of a mask pattern is a percentage denomination of a ratio of the number of print permitting areas constituting the mask pattern (blackened areas in the mask pattern P0002(*a*) to P0002(*d*) of FIG. 4) to the sum of the number of print permitting areas and the number of print non-permitting areas constituting the mask pattern (the whitened areas in the mask patterns P0002(*a*) to P0002(*d*) of FIG.

4). In other words, a printable ratio (%) of a mask pattern is expressed by

M÷(M+N)×100 where M denotes the number of print permitting areas constituting the mask pattern and N denotes the number of print non-permitting areas constituting the mask pattern.

In this embodiment, data for the mask as shown in FIG. 5 are stored in memory in the main body of the printing apparatus. The mask data converting process J0008 performs the AND process on the mask data with the binary data obtained in the foregoing dot arrangement patterning process. Thereby, binary data to be a print object in each print scan are determined. Subsequently, the binary data are transferred to the driving circuit J0009. Thus, the printing head H1001 is driven, and hence inks are ejected in accordance with the binary data. The mask patterns according to this embodiment are described later with reference to FIG. 22 and following drawings.

FIG. 1 shows that the host apparatus J0012 is configured to perform the precedent process J0002, the subsequent process J0003, the γ correction process J0004, the half-toning process J0005 and the print data creation process J0006. In addition, FIG. 1 shows that the printing apparatus J0013 is designed to perform the dot arrangement patterning process J0007 and the mask data converting process J0008. However, the present invention is not limited to this embodiment. For example, the present invention may be carried out as an embodiment in which parts of the processes J0002 to J0005 are designed to be performed by the printing apparatus J0013 instead of by the host apparatus J0012. Otherwise, the present invention may be carried out as an embodiment in which all of these processes are designed to be performed by the host apparatus J0012. Alternately, the present invention may be carried out as an embodiment in which the processes J0002 to J0008 are designed to be performed by the printing apparatus J0013.

1.2 Configuration of Mechanisms

Descriptions will be provided for a configuration of the mechanisms in the printing apparatus to which this embodiment is applied. The main body of the printing apparatus of this embodiment is divided into a paper feeding section, a paper conveying section, a paper discharging section, a carriage section, a flat-pass printing section and a cleaning section from a viewpoint of functions performed by the mechanisms. These mechanisms are contained in an outer case.

Figure 6:
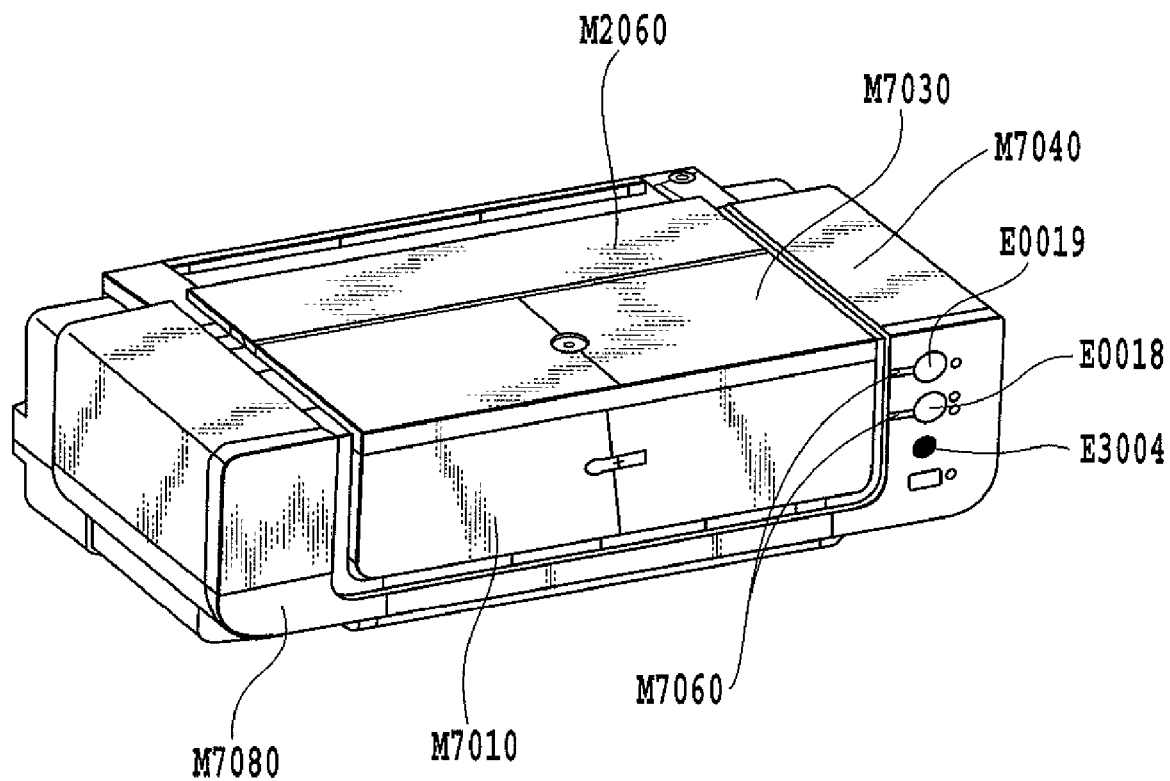
FIG. 6 is a perspective view of the printing apparatus used in the embodiment, and shows the printing apparatus in an unused condition when viewed from the front.
Figure 7:
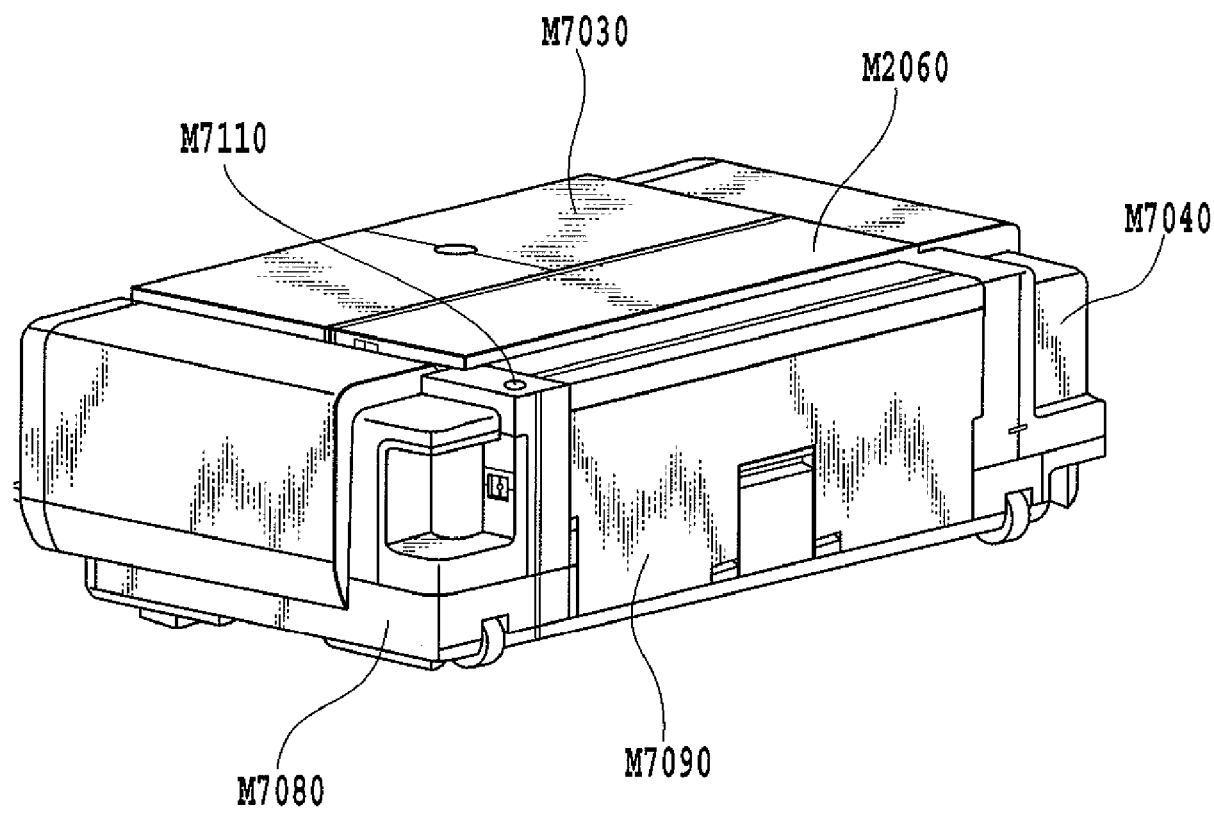
FIG. 7 is another perspective view of the printing apparatus used in the embodiment, and shows the printing apparatus in the unused condition when viewed from the back.
Figure 8:
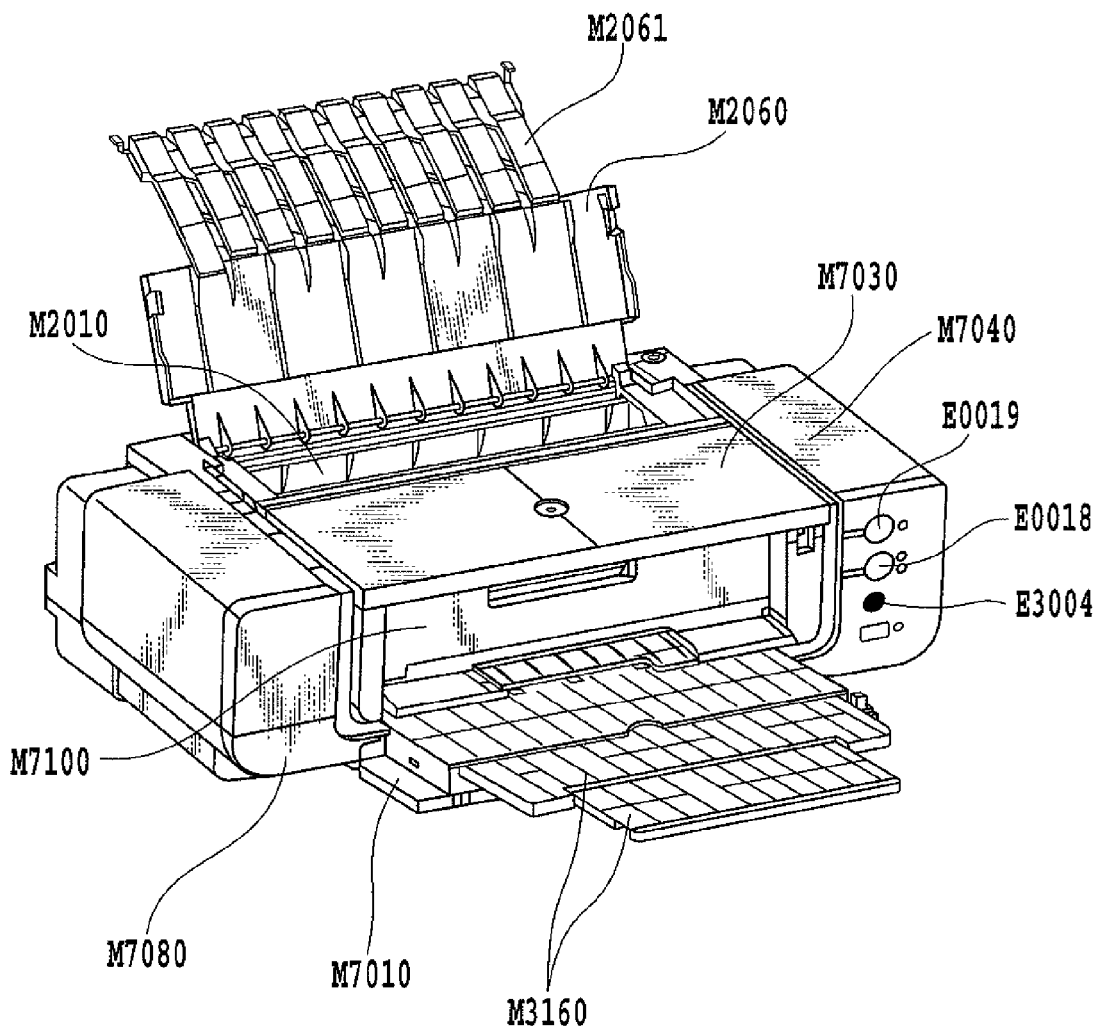
FIG. 8 is yet another perspective view of the printing apparatus used in the embodiment, and shows the printing apparatus in a used condition when viewed from the front.
Figure 9:
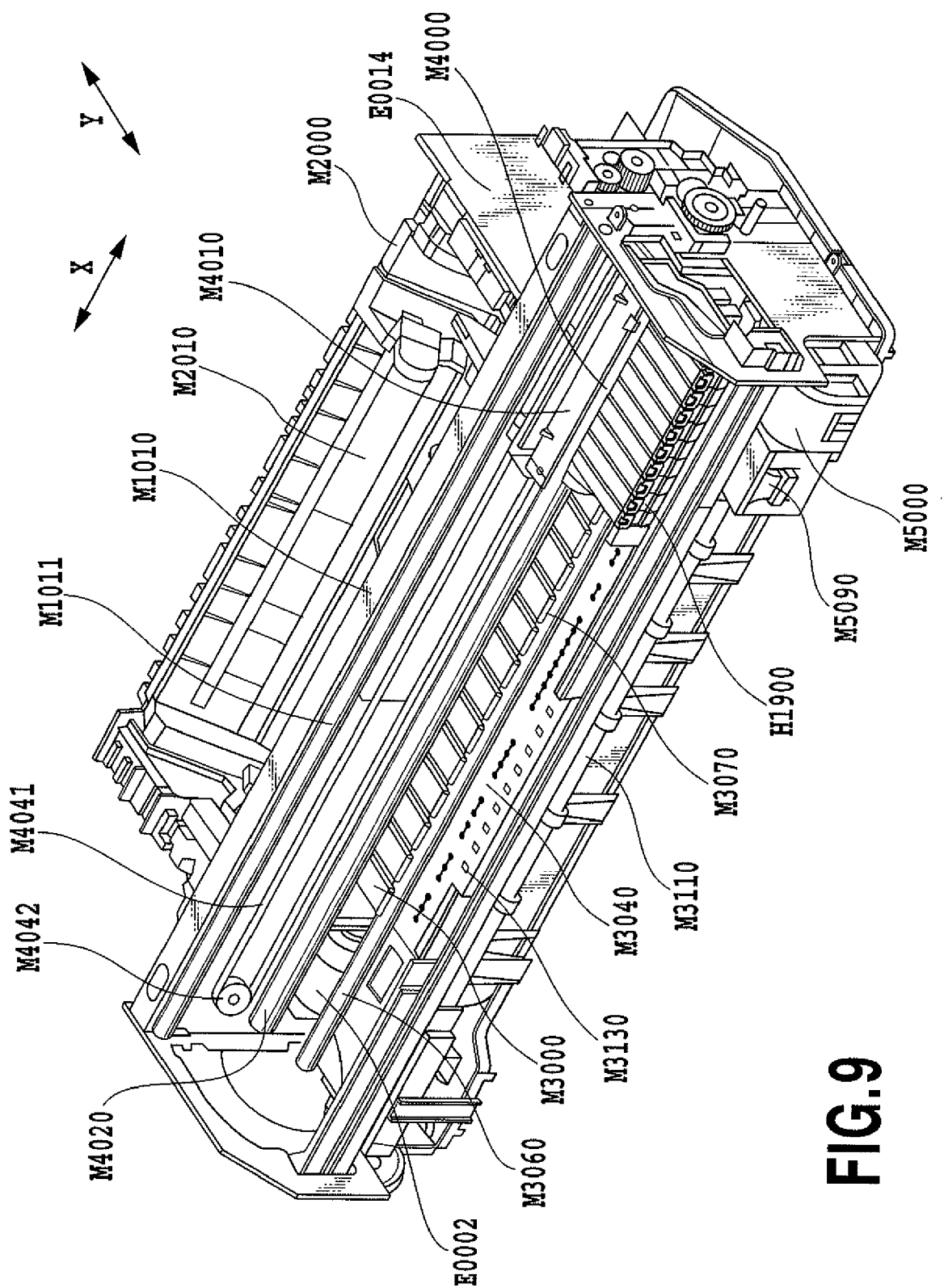
FIG. 9 is a diagram for explaining an internal mechanism of the main body of the printing apparatus used in the embodiment, and is a perspective view showing the printing apparatus when viewed from the right above.
Figure 10:
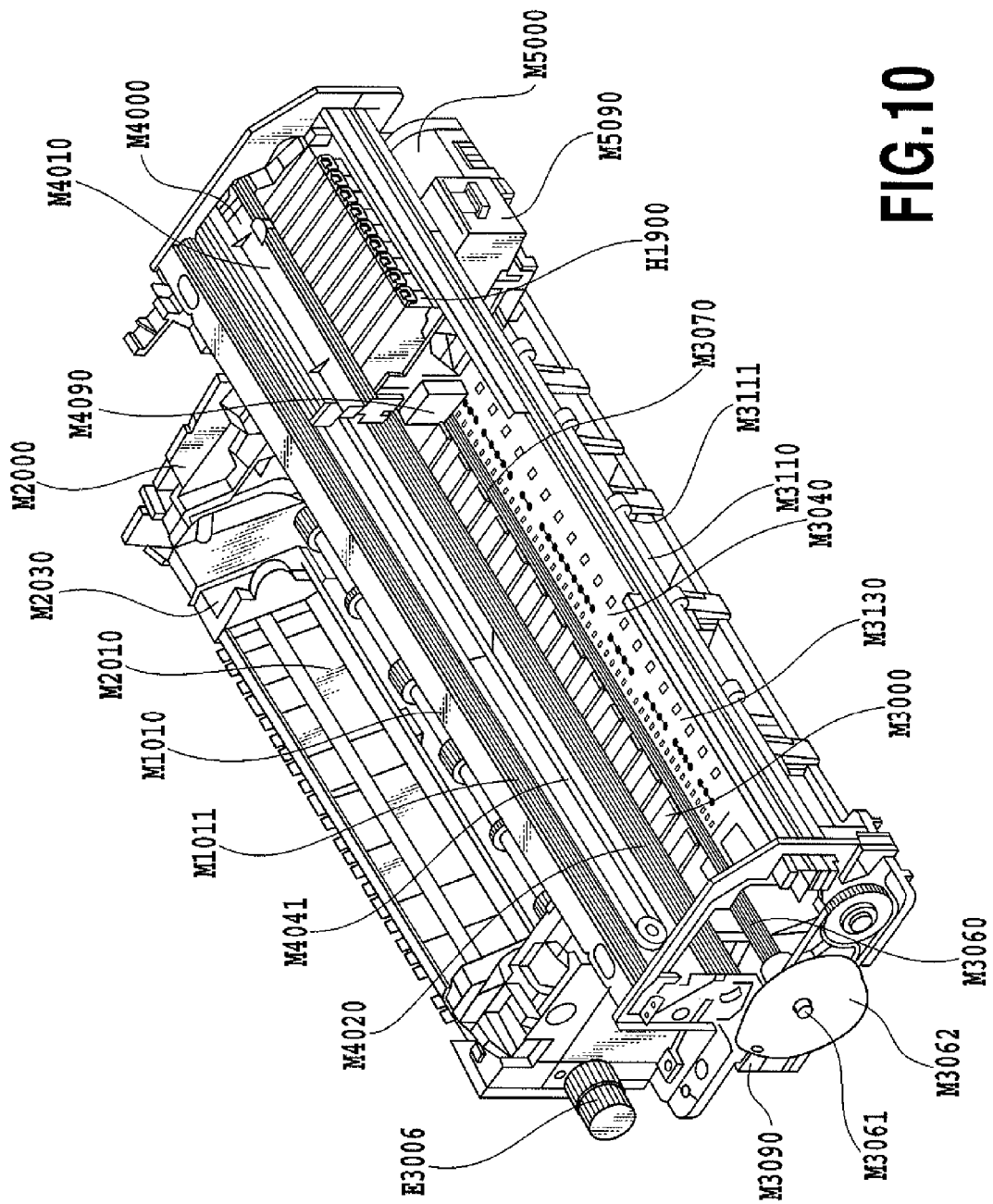
FIG. 10 is another diagram for explaining the internal mechanism of the main body of the printing apparatus used in the embodiment, and is another perspective view showing the printing apparatus when viewed from the left above.
Figure 11:
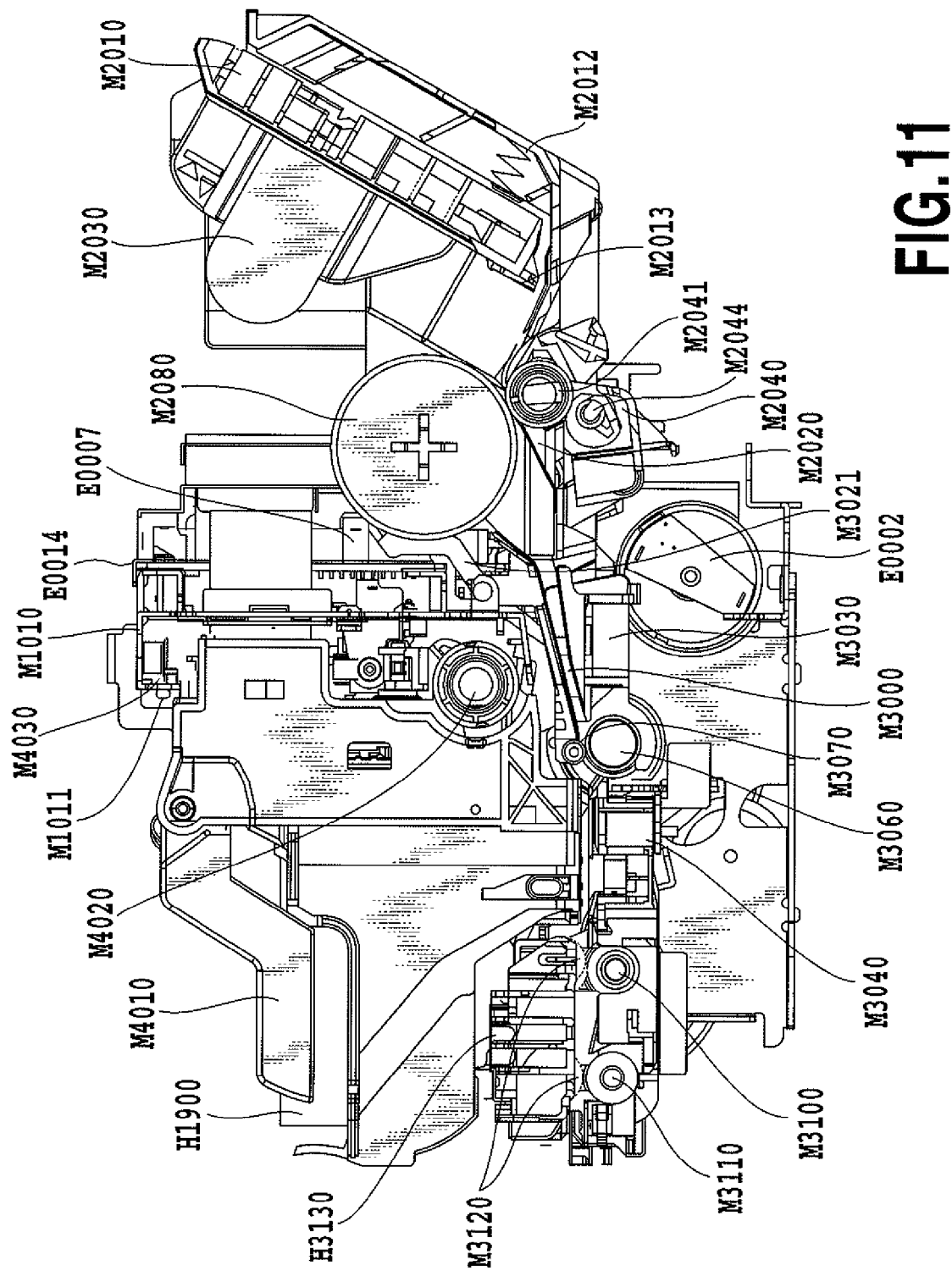
FIG. 11 is a side, cross-sectional view of the main body of the printing apparatus used in the embodiment for the purpose of explaining the internal mechanism of the main body of the printing apparatus.
Figure 12:
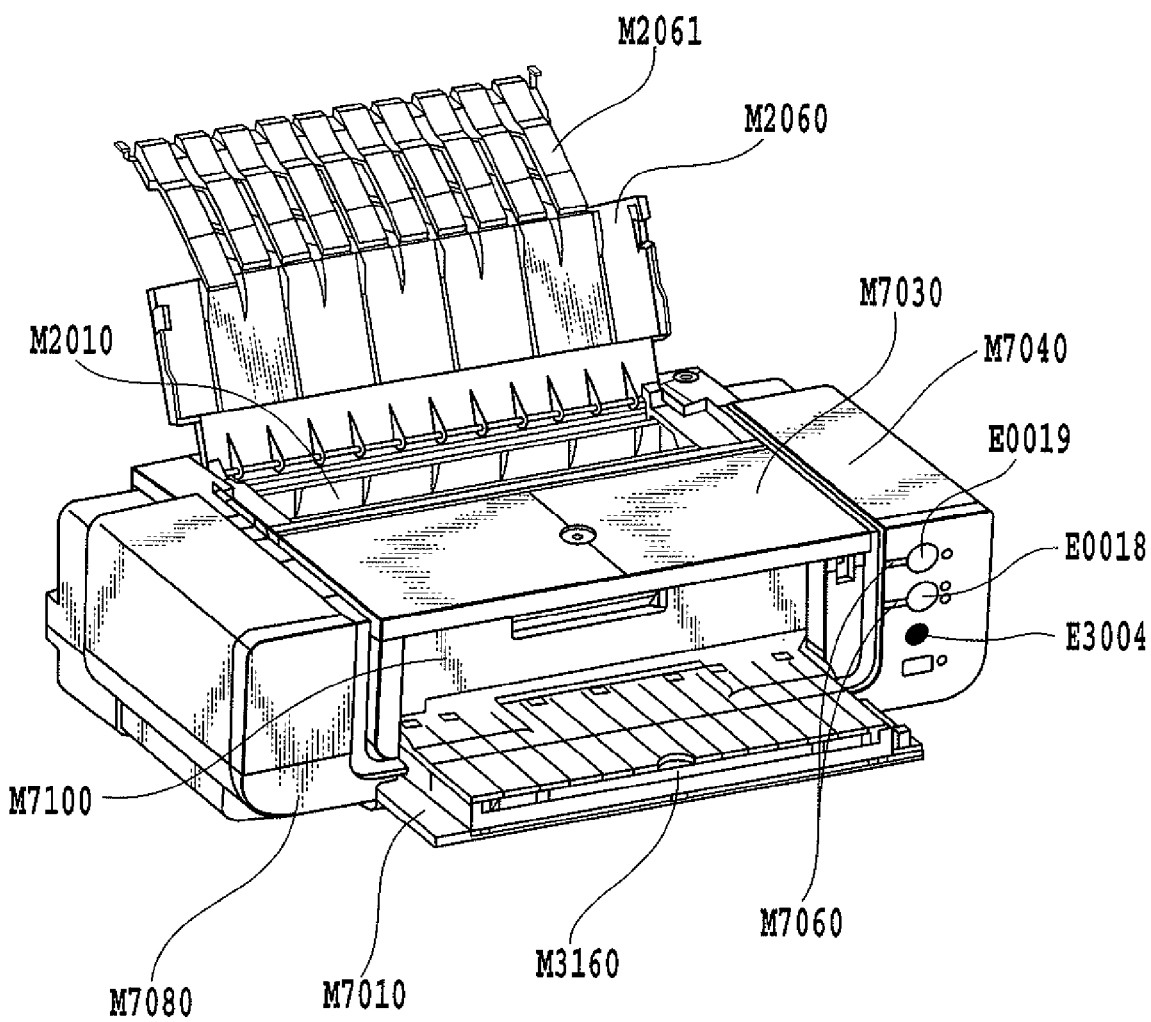
FIG. 12 is yet another perspective view of the printing apparatus used in the embodiment, and shows the printing apparatus in the process of performing a flat-pass printing operation when viewed from the front.
Figure 13:
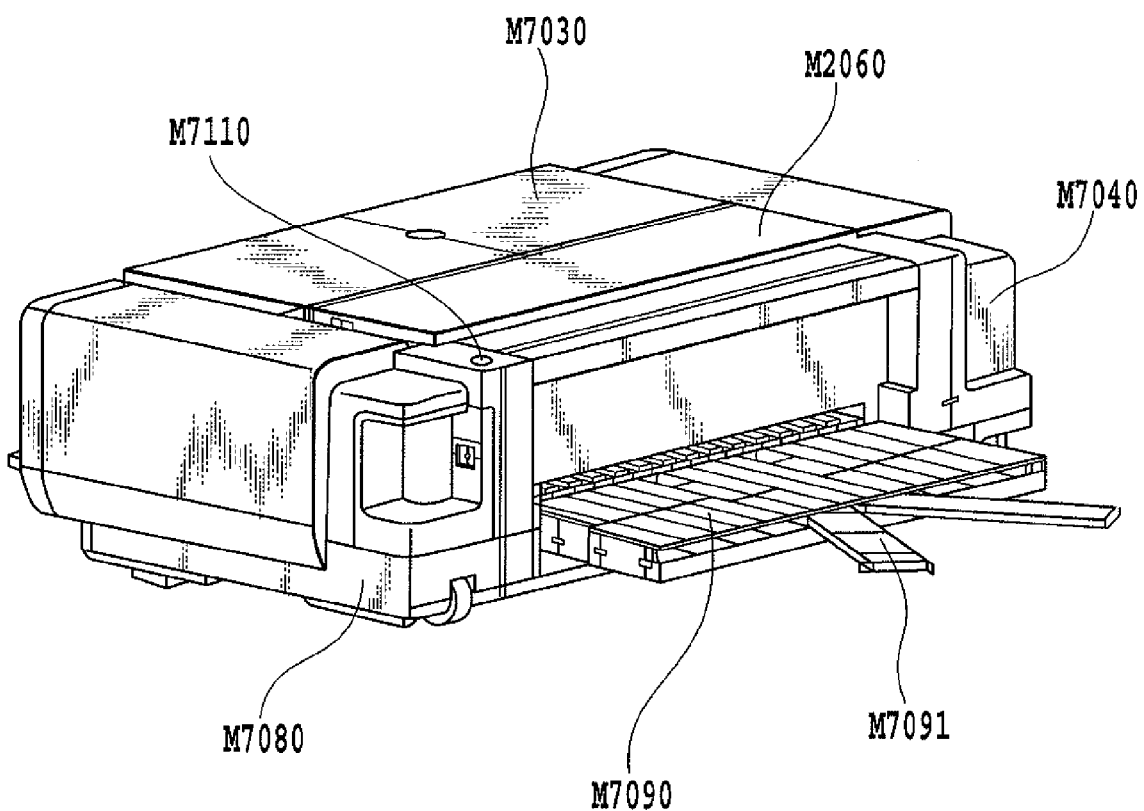
FIG. 13 is still another perspective view of the printing apparatus used in the embodiment, and shows the printing apparatus in the process of performing the flat-pass printing operation when viewed from the back.
Figure 14:
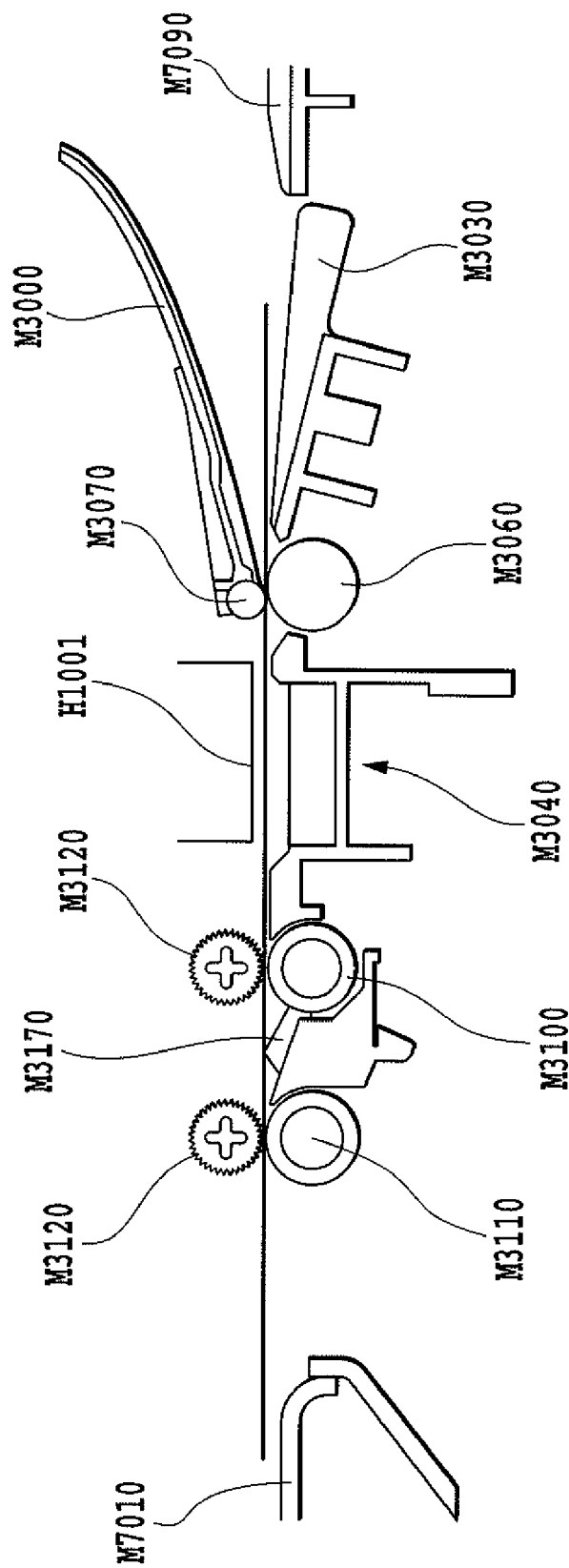
FIG. 14 is a schematic, side, cross-sectional view of the internal mechanism for explaining the flat-pass printing operation performed in the embodiment.
Figure 15:
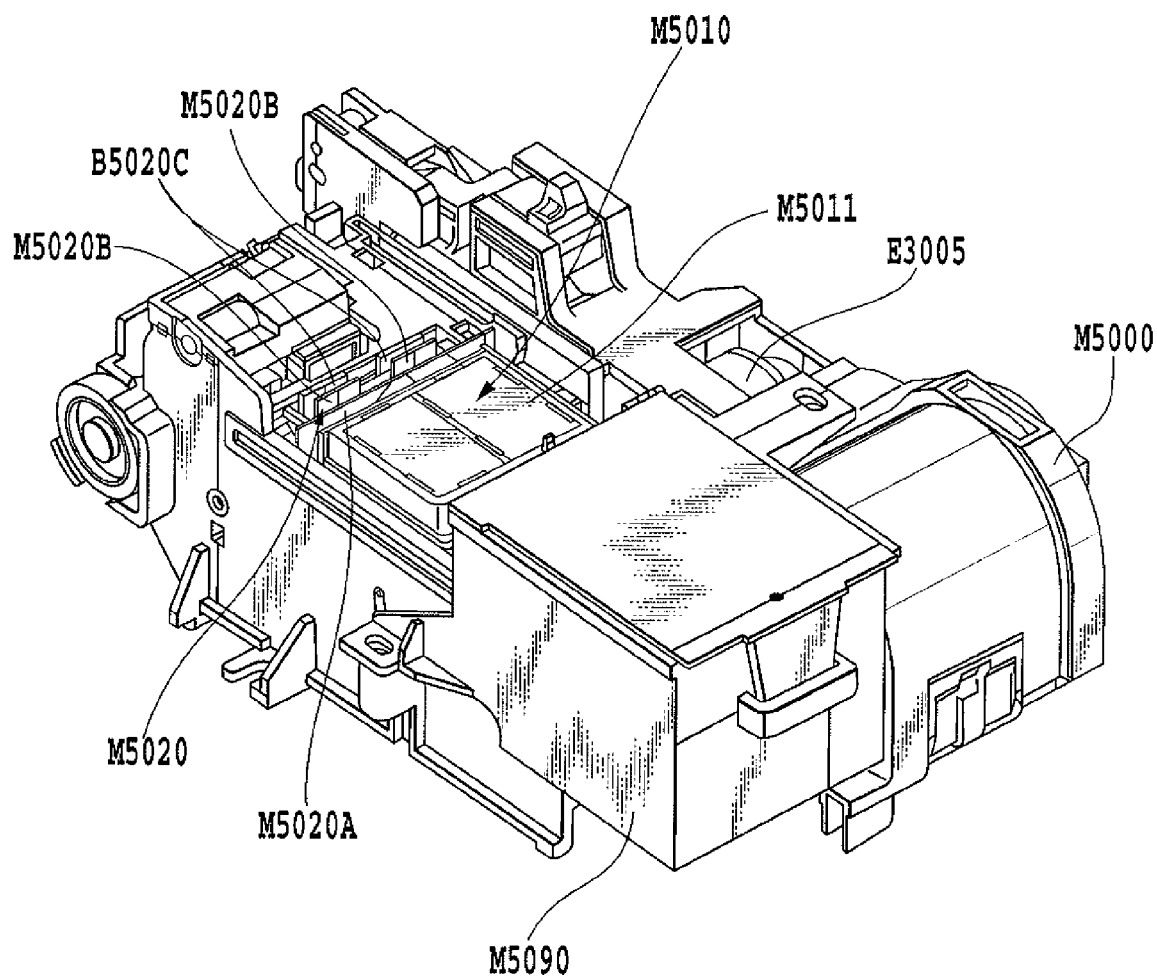
FIG. 15 is a perspective view showing a cleaning section in the main body of the printing apparatus used in the embodiment.
Figure 16:
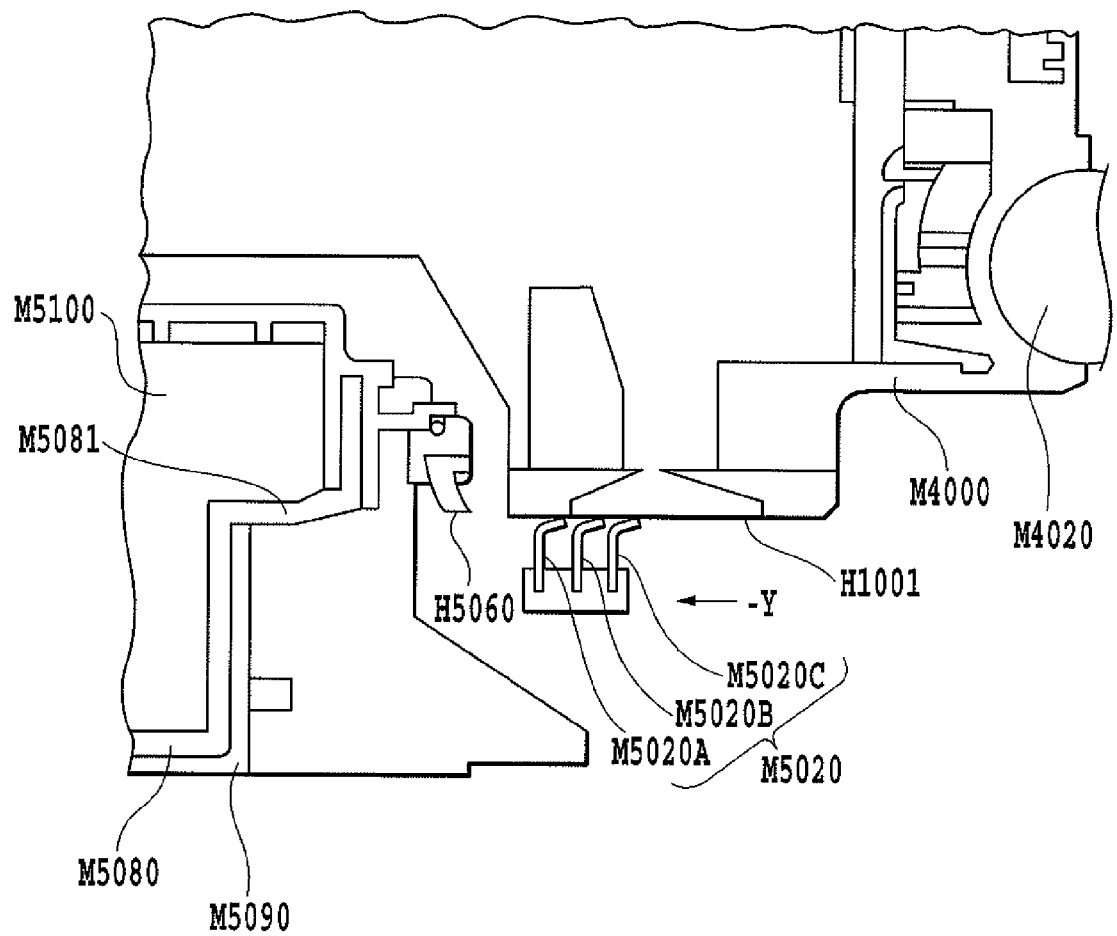
FIG. 16 is across-sectional view of a wiper portion in the cleaning section shown in FIG. 15 for explaining a configuration and an operation of the wiper portion.
Figure 17:
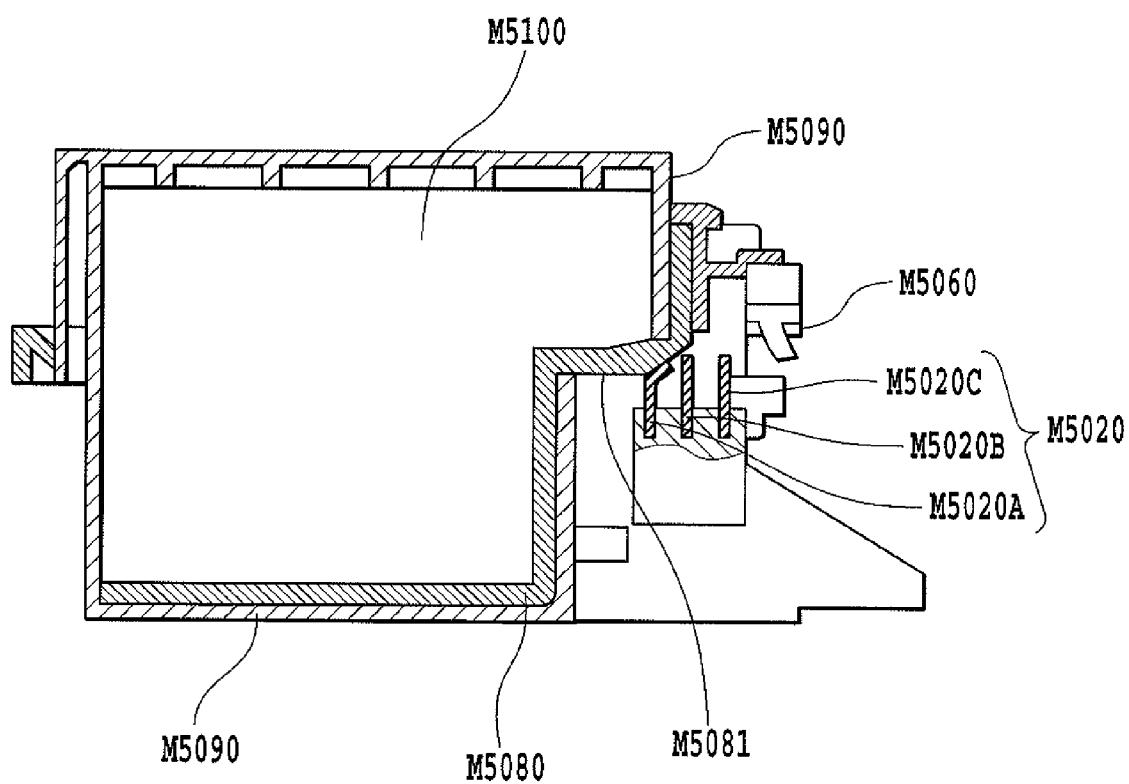
FIG. 17 is a cross-sectional view of a wetting liquid transferring unit in the cleaning section for explaining a configuration and an operation of the wetting liquid transferring unit.

FIGS. 6, 7, 8, 12 and 13 are perspective views respectively showing appearances of the printing apparatus to which this embodiment is applied. FIG. 6 shows the printing apparatus in an unused condition when viewed from the front. FIG. 7 shows the printing apparatus in an unused condition when viewed from the back. FIG. 8 shows the printing apparatus in a used condition when viewed from the front. FIG. 12 shows the printing apparatus during flat-pass printing when viewed from the front. FIG. 13 shows the printing apparatus during flat-pass printing when viewed from the back. In addition, FIGS. 9 to 11 and 14 to 16 are diagrams for describing internal mechanisms in the main body of the printing apparatus. In this respect, FIG. 9 is a perspective view showing the printing apparatus when viewed from the right above. FIG. 10 is a perspective view showing the printing apparatus when viewed from the left above. FIG. 11 is a side, cross-sectional view of the main body of the printing apparatus. FIG. 14 is a cross-sectional view of the printing apparatus during flat-pass printing. FIG. 15 is a perspective view of the cleaning section. FIG. 16 is a cross-sectional view for describing a configuration and an operation of a wiping mechanism in the cleaning section. FIG. 17 is a cross-sectional view of a wetting liquid transferring unit in the cleaning section.

Descriptions will be provided for each of the sections by referring to these figures whenever deemed necessary.

(A) Outer Case (Refer to FIGS. 6 and 7)

The outer case is attached to the main body of the printing apparatus in order to cover the paper feeding section, the paper conveying section, the paper discharging section, the carriage section, the cleaning section, the flat-pass section and the wetting liquid transferring unit. The outer case is configured chiefly of a lower case M7080, an upper case M7040, an access cover M7030, a connector cover, and a front cover M7010.

Paper discharging tray rails (not illustrated) are provided under the lower case M7080, and thus the lower case M7080 has a configuration in which a divided paper discharging tray M3160 is capable of being contained therein. In addition, the front cover M7010 is configured to close the paper discharging port while the printing apparatus is not used.

An access cover M7030 is attached to the upper case M7040, and is configured to be rotatable. A part of the top surface of the upper case has an opening portion. The printing apparatus has a configuration in which each of ink tanks H1900 or the printing head H1001 (refer to FIG. 21) is replaced with a new one in this position. Incidentally, in the printing apparatus of this embodiment, the printing head H1001 has a configuration in which a plurality of ejecting portions are formed integrally into one unit. The plurality of ejecting portions corresponding respectively to a plurality of mutually different colors, and each of the plurality of ejecting portions is capable of ejecting an ink of one color. In addition, the printing head is configured as a printing head cartridge H1000 which the ink tanks H1900 are capable of being attached to, and detached from, independently of one another depending on the respective colors. The upper case M7040 is provided with a door switch lever (not illustrated), LED guides M7060, a power supply key E0018, a resume key E0019, a flat-pass key E3004 and the like. The door switch lever detects whether the access cover M7030 is opened or closed. Each of the LED guides M7060 transmits, and displays, light from the respective LEDs. Furthermore, a multi-stage paper feeding tray M2060 is rotatably attached to the upper case M7040. While the paper feeding section is not used, the paper feeding tray M2060 is contained within the upper case M7040. Thus, the upper case M7040 is configured to function as a cover for the paper feeding section.

The upper case M7040 and the lower case M7040 are attached to each other by elastic fitting claws. A part provided with a connector portion therebetween is covered with a connector cover (not illustrated).

(B) Paper Feeding Section (Refer to FIGS. 8 and 11)

As shown in FIGS. 8 and 11, the paper feeding section is configured as follows. A pressure plate M2010, a paper feeding roller M2080, a separation roller M2041, a return lever M2020 and the like are attached to a base M2000. The pressure plate M2010 is that on which printing media are stacked. The paper feeding roller M2080 feeds the printing media sheet by sheet. The separation roller M2041 separates a printing medium. The return lever M2020 is used for returning the printing medium to a stacking position.

(C) Paper Conveying Section (Refer to FIGS. 8 to 11)

A conveying roller M3060 for conveying a printing medium is rotatably attached to a chassis M1010 made of an upwardly bent plate. The conveying roller M3060 has a configuration in which the surface of a metal shaft is coated with ceramic fine particles. The conveying roller M3060 is attached to the chassis M1010 in a state in which metallic parts respectively of the two ends of the shaft are received by bearings (not illustrated). The conveying roller M3060 is provided with a roller tension spring (not illustrated). The roller tension spring pushes the conveying roller M3060, and thereby applies an appropriate amount of load to the conveying roller M3060 while the conveying roller M3060 is rotating. Accordingly, the conveying roller M3060 is capable of conveying printing medium stably.

The conveying roller M3060 is provided with a plurality of pinch rollers M3070 in a way that the plurality of pinch rollers M3070 abut on the conveying roller M3060. The plurality of pinch rollers M3070 are driven by the conveying roller M3060. The pinch rollers M3070 are held by a pinch roller holder M3000. The pinch rollers M3070 are pushed respectively by pinch roller springs (not illustrated), and thus are brought into contact with the conveying roller M3060 with the pressure. This generates a force for conveying printing medium. At this time, since the rotation shaft of the pinch roller holder M3000 is attached to the bearings of the chassis M1010, the rotation shaft rotates thereabout.

A paper guide flapper M3030 and a platen M3040 are disposed in an inlet to which a printing medium is conveyed. The paper guide flapper M3030 and the platen M3040 guide the printing medium. In addition, the pinch roller holder M3000 is provided with a PE sensor lever M3021. The PE sensor lever M3021 transmits a result of detecting the front end or the rear end of each of the printing medium to a paper end sensor (hereinafter referred to as a "PE sensor") E0007 fixed to the chassis M1010. The platen M3040 is attached to the chassis M1010, and is positioned thereto. The paper guide flapper M3030 is capable of rotating about a bearing unit (not illustrated), and is positioned to the chassis M1010 by abutting on the chassis M1010.

The printing head H1001 (refer to FIG. 21) is provided at a side downstream in a direction in which the conveying roller M3060 conveys the printing medium.

Descriptions will be provided for a process of conveying printing medium in the printing apparatus with the foregoing configuration. A printing medium sent to the paper conveying section is guided by the pinch roller holder M3000 and the paper guide flapper M3030, and thus is sent to a pair of rollers which are the conveying roller 3060 and the pinch roller M3070. At this time, the PE sensor lever M3021 detects an edge of the printing medium. Thereby, a position in which a print is made on the printing medium is obtained. The pair of rollers which are the conveying roller M3060 and the pinch roller M3070 are driven by an LF motor E0002, and are rotated. This rotation causes the printing medium to be conveyed over the platen M3040. A rib is formed in the platen M3040, and the rib serves as a conveyance datum surface. A gap between the printing head H1001 and the surface of the printing medium is controlled by this rib. Simultaneously, the rib also suppresses flapping of the printing medium in cooperation with the paper discharging section which will be described later.

A driving force with which the conveying roller M3060 rotates is obtained by transmitting a torque of the LF motor E0002 consisting, for example, of a DC motor to a pulley M3061 disposed on the shaft of the conveying roller M3060 through a timing belt (not illustrated). A code wheel M3062 for detecting an amount of conveyance performed by the conveying roller M3060 is provided on the shaft of the conveying roller M3060. In addition, an encode sensor M3090 for reading a marking formed in the code wheel M3062 is disposed in the chassis M1010 adjacent to the code wheel M3062. Incidentally, the marking formed in the code wheel M3062 is assumed to be formed at a pitch of 150 to 300 lpi (line/inch) (an example value).

(D) Paper Discharging Section (Refer to FIGS. 8 to 11)

The paper discharging section is configured of a first paper discharging roller M3100, a second paper discharging roller M3110, a plurality of spurs M3120 and a gear train.

The first paper discharging roller M3100 is configured of a plurality of rubber portions provided around the metal shaft thereof. The first paper discharging roller M3100 is driven by transmitting the driving force of the conveying roller M3060 to the first paper discharging roller M3100 through an idler gear.

The second paper discharging roller M3110 is configured of a plurality of elastic elements M3111, which are made of elastomer, attached to the resin-made shaft thereof. The second paper discharging roller M3110 is driven by transmitting the driving force of the first paper discharging roller M3100 to the second paper discharging roller M3110 through an idler gear.

Each of the spurs M3120 is formed by integrating a circular thin plate and a resin part into one unit. A plurality of convex portions are provided to the circumference of each of the spurs M3120. Each of the spurs M3120 is made, for example, of SUS. The plurality of spurs M3120 are attached to a spur holder M3130. This attachment is performed by use of a spur spring obtained by forming a coiled spring in the form of a stick. Simultaneously, a spring force of the spur spring causes the spurs M3120 to abut respectively on the paper discharging rollers M3100 and M3110 at predetermined pressures. This configuration enables the spurs 3120 to rotate to follow the two paper discharging rollers M3100 and M3110. Some of the spurs M3120 are provided at the same positions as corresponding ones of the rubber portions of the first paper discharging roller M3110 are disposed, or at the same positions as corresponding ones of the elastic elements M3111 are disposed. These spurs chiefly generate a force for conveying printing medium. In addition, others of the spurs M3120 are provided at positions where none of the rubber portions and the elastic elements M3111 is provided. These spurs M3120 chiefly suppresses lift of a printing medium while a print is being made on the printing medium.

Furthermore, the gear train transmits the driving force of the conveying roller M3060 to the paper discharging rollers M3100 and M3110.

With the foregoing configuration, a printing medium on which an image is formed is pinched with nips between the first paper discharging roller M3110 and the spurs M3120, and thus is conveyed. Accordingly, the printing medium is delivered to the paper discharging tray M3160. The paper discharging tray M3160 is divided into a plurality of parts, and has a configuration in which the paper discharging tray M3160 is capable of being contained under the lower case M7080 which will be described later. When used, the paper discharging tray M3160 is drawn out from under the lower case M7080. In addition, the paper discharging tray M3160 is designed to be elevated toward the front end thereof, and is also designed so that the two side ends thereof are held at a higher position. The design enhances the stackability of printing media, and prevents the printing surface of each of the printing media from being rubbed.

(E) Carriage Section (Refer to FIGS. 9 to 11)

The carriage section includes a carriage M4000 to which the printing head H1001 is attached. The carriage M4000 is supported with a guide shaft M4020 and a guide rail M1011. The guide shaft M4020 is attached to the chassis M1010, and guides and supports the carriage M4000 so as to cause the carriage M4000 to perform reciprocating scan in a direction perpendicular to a direction in which a printing medium is conveyed. The guide rail M1011 is formed in a way that the guide rail M1011 and the chassis M1010 are integrated into one unit. The guide rail M1011 holds the rear end of the carriage M4000, and thus maintains the space between the printing head H1001 and the printing medium. A slide sheet M4030 formed of a thin plate made of stainless steel or the like is stretched on a side of the guide rail M1011, on which side the carriage M4000 slides. This makes it possible to reduce sliding noises of the printing apparatus.

The carriage M4000 is driven by a carriage motor E0001 through a timing belt M4041. The carriage motor E0001 is attached to the chassis M1010. In addition, the timing belt M4041 is stretched and supported by an idle pulley M4042. Furthermore, the timing belt M4041 is connected to the carriage M4000 through a carriage damper made of rubber. Thus, image unevenness is reduced by damping the vibration of the carriage motor E0001 and the like.

An encoder scale E0005 for detecting the position of the carriage M4000 is provided in parallel with the timing belt M4041 (the encoder scale E0005 will be described later by referring to FIG. 18). Markings are formed on the encoder scale E0005 at pitches in a range of 150 lpi to 300 lpi. An encoder sensor E0004 for reading the markings is provided on a carriage board E0013 installed in the carriage M4000 (the encoder sensor E0004 and the carriage board E0013 will be described later by referring to FIG. 18). A head contact E0101 for electrically connecting the carriage board E0013 to the printing head H1001 is also provided to the carriage board E0013. Moreover, a flexible cable E0012 (not illustrated) is connected to the carriage M4000 (the flexible cable E0012 will be described later by referring to FIG. 18). The flexible cable E0012 is that through which a drive signal is transmitted from an electric substrate E0014 to the printing head H1001.

As for components for fixing the printing head H1001 to the carriage M4000, the following components are provided to the carriage M4000. An abutting part (not illustrated) and pressing means (not illustrated) are provided on the carriage M4000. The abutting part is with which the printing head H1001 positioned to the carriage M4000 while pushing the printing head H1001 against the carriage M4000. The pressing means is with which the printing head H1001 is fixed at a predetermined position. The pressing means is mounted on a headset lever M4010. The pressing means is configured to act on the printing head H1001 when the headset lever M4010 is turned about the rotation support thereof in a case where the printing head H1001 is intended to be set up.

Moreover, a position detection sensor M4090 including a reflection-type optical sensor is attached to the carriage M4000. The position detection sensor is used while a print is being made on a special medium such as a CD-R, or when a print result or the position of an edge of a sheet of paper is being detected. The position detection sensor M4090 is capable of detecting the current position of the carriage M4000 by causing a light emitting device to emit light and by thus receiving the emitted light after reflecting off the carriage M4000.

In a case where an image is formed on a printing medium in the printing apparatus, the set of the conveying roller M3060 and the pinch rollers M3070 transfers the printing medium, and thereby the printing medium is positioned in terms of a position in a column direction. In terms of a position in a row direction, by using the carriage motor E0001 to move the carriage M4000 in a direction perpendicular to the direction in which the printing medium is conveyed, the printing head H1001 is located at a target position where an image is formed. The printing head H1001 thus positioned ejects inks onto the printing medium in accordance with a signal transmitted from the electric substrate E0014. Descriptions will be provided later for details of the configuration of the printing head H1001 and a printing system. The printing apparatus of this embodiment alternately repeats a printing main scan and a sub-scan. During the printing main scan, the carriage M4000 scans in the row direction while the printing head H1001 is making a print. During the sub-scan, the printing medium is conveyed in the column direction by conveying roller M3060. Thereby, the printing apparatus is configured to form an image on the printing medium.

(F) Flat-pass Printing Section (Refer to FIGS. 12 to 14)

A printing medium is fed from the paper feed section in a state where the printing medium is bent, because the passage through which the printing medium passes continues curving up to the pinch rollers as shown in FIG. 11. For this reason, if a thicker printing medium with a thickness of approximately 0.5 mm or more, for example, is attempted to be fed from the paper feeding section, a reaction force of the bent printing medium occurs, and thus resistance to the paper feeding increases. As a result, it is likely that the printing medium cannot be fed. Otherwise, even if the printing medium can be fed, the delivered printing medium remains bent, or is folded.

A flat-pass print is made on printing media, such as thicker printing media, which a user does not wish to fold, and on printing media, such as CD-Rs, which cannot be bent.

Types of flat-pass prints include a type of print made by manually supplying a printing medium from a slit-shaped opening portion (under a paper feeding unit) in the back of the main body of a printing apparatus, and by thus causing pinch rollers of the main body to nip the printing medium. However, the flat-pass print of this embodiment employs the following mode. A printing medium is fed from the paper discharging port located in the front side of the main body of the printing apparatus to a position where a print is going to be made, and the print is made on the printing medium by switching back the printing medium.

The front cover M7010 is usually located below the paper discharging section, because the front cover M7010 is also used as a tray in which several tens of printing media on which prints have been made are stacked (refer to FIG. 8). When a flat-pass print is going to be made, the front tray M7010 is elevated up to a position where the paper discharging port is located (refer to FIG. 12) for the purpose of supplying a printing medium from the paper discharging port horizontally in a direction reverse to the direction in which a printing medium is usually conveyed. Hooks and the like (not illustrated) are provided to the front cover M7010. Thus, the front cover M7010 is capable of being fixed to a position where the printing medium is supplied for the purpose of the flat-pass print. It can be detected by a sensor whether or not the front cover M7010 is located at the position where the printing medium is supplied for the purpose of the flat-pass print. Depending on this detection, it can be determined whether the printing apparatus is in a flat-pass printing mode.

In the case of the flat-pass printing mode, first of all, a flat-pass key E3004 is operated for the purpose of placing a printing medium on the front tray M7010 and inserting the printing medium from the paper discharging port. Thereby, a mechanism (not illustrated) lifts the spur holder M3130 and the pinch roller holder M3000 respectively up to positions higher than a presumed thickness of the printing medium. In addition, in a case where the carriage M4000 exists in an area through which the printing medium is going to pass, a lifting mechanism (not illustrated) lifts the carriage M4000 up. This makes it easy to insert the printing medium therein. Moreover, by pressing a rear tray button M7110, a rear tray M7090 can be opened. Furthermore, a rear sub-tray M7091 can be opened in the form of the letter V (refer to FIG. 13). The rear tray M7090 and the rear sub-tray M7091 are trays with which a long printing medium is supported in the back of the main body of the printing apparatus. This is because, if the long printing medium is inserted from the front of the main body of the printing apparatus, the long printing medium juts out of the back of the main body of the printing apparatus. If a thicker printing medium is not kept flat while a print is being made on the thicker printing medium, the thicker printing medium may be rubbed against the head ejection face, or the conveyance load may change. This is likely to adversely affect the print quality. For this reason, the disposition of these trays is effective. However, if a printing medium is not long enough to jut out of the back of the main body of the printing apparatus, the rear tray M7090 and the like need not be opened.

In the foregoing manner, a printing medium can be inserted from the paper discharging port to the inside of the main body of the printing apparatus. A printing medium is positioned on the front tray M7010 by aligning the rear edge (an edge at the side located closest to a user) and the right edge of the printing medium to a position in the front tray M7010 where a marker is formed.

At this time, if the flat-pass key E3004 is operated once again, the spur holder M3130 comes down, and thus the paper discharging rollers M3100, M3110 and the spurs M3120 jointly nip the printing medium. Thereafter, the paper discharging rollers M3100 and M3110 draw the printing medium into the main body of the printing apparatus by a predetermined amount thereof (in a direction reverse to the direction in which the printing medium is conveyed during normal printing). Because the edge at the side closest to the user (the rear edge) of a printing medium is aligned to the marker when the printing medium is set up at the beginning, it is likely that the front edge (the edge located farthest from a user) of the printing medium may not reach the conveying roller M3060, if the printing medium is shorter. With this taken into consideration, the predetermined amount is defined as a distance between the rear edge of a printing medium with the presumably shortest length and the conveying roller M3060. Once a printing medium is transferred by the predetermined amount, the rear edge of the printing medium reaches the conveying roller M3060. Thus, the pinch roller holder M3000 is lowered at the position, and the conveying roller M3060 and the pinch rollers M3070 are caused to nip the printing medium. Subsequently, the printing medium is further transferred so that the rear edge of the printing medium is nipped by the conveying roller M3060 and the pinch rollers M3070. Thereby, the supplying of the printing medium for the purpose of the flat-pass print is completed (at a position where the printing medium waits for a print to be made thereon).

A nip force with which the paper discharging roller M3100 and M3110 as well as the spurs M3120 nip a printing medium is set relatively weak lest the force should adversely affect image formation while the printing medium is being delivered during a normal print. For this reason, in the case where a flat-pass print is going to be made, it is likely that the position of the printing medium shifts before the print starts. In this embodiment, however, a printing medium is nipped by the conveying roller M3060 and the pinch rollers M3070 which have a relatively stronger nip force. This secures a position where a printing medium should be set. In addition, while a printing medium is being conveyed into the inside of the main body by the predetermined amount, a flat-pass paper detection sensor lever (hereinafter referred to as an "FPPE sensor lever") M3170 blocks or forms a light path of an FPPE sensor E9001 which is an infrared-ray sensor, and which is not illustrated here. Thereby, the position of the rear edge (the position of the front edge during the print) of the printing medium can be detected. Incidentally, the FPPE sensor lever may be rotatably provided between the platen M3040 and the spur holder M3130.

Once a printing medium is set at the position where the printing medium waits for a print to be made thereon, a print command is executed. Specifically, the conveying roller M3060 conveys the printing medium to a position where the printing head H1001 is going to make a print on the printing medium. Thereafter, the print is made in the same manner as a normal printing operation is performed. After the print, the printing medium is discharged to the front tray M7010.

In a case where the flat-pass print is intended to be made successively, the printing medium on which the print has been made is removed from the front tray M7010, and the next printing medium is set thereon. After that, it is sufficient that the foregoing processes are repeated. Specifically, the subsequent print starts with the setting of a printing medium after the spur holder M3130 and the pinch roller holder M3000 are lifted up by pressing the flat-pass key E3004.

On the other hand, in a case where the flat-pass print is intended to be completed, the printing apparatus is returned to the normal printing mode by returning the front tray M7010 to the normal print position.

(G) Cleaning Section (Refer to FIGS. 15 and 16)

The cleaning section is a mechanism for cleaning the printing head H1001. The cleaning section is configured of a pump M5000, caps M5010, a wiper portion M5020 and the like. The caps M5010 are those which prevent the printing head H1001 from being dried out. The wiper portion M5020 is used for cleaning the surface of the printing head H1001 on which the ejection openings are formed.

Figure 18:
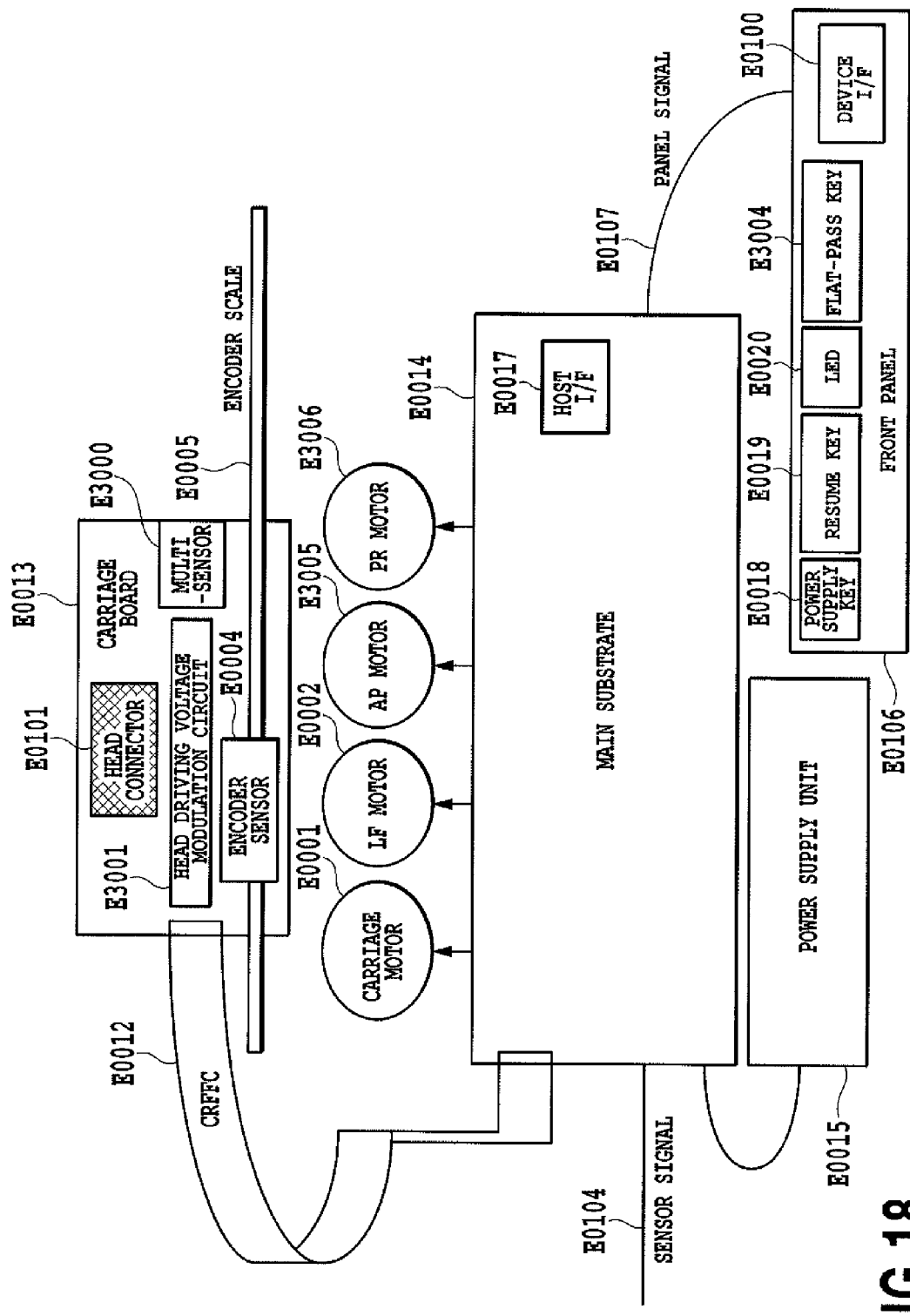
FIG. 18 is a block diagram schematically showing the entire configuration of an electrical circuit in the embodiment of the present invention.

In the case of this embodiment, a chief driving force of the cleaning section is transmitted from an AP motor E3005 (see FIG. 18). The pump M5000 is designed to be operated by rotation in one direction which is generated by means of a one-way clutch (not illustrated). The wiper portion M5020 and the caps M5010 are designed to ascend and descend by rotation in the other direction which is generated by the one-way clutch Incidentally, the AP motor E3005 is also used as a driving power supply for an operation of feeding printing medium, but a motor specialized for operating the cleaning section may be provided to the cleaning section instead.

The motor E0003 drives the caps M5010 so as for the caps M5010 to be capable of ascending and descending by means of an ascending/descending mechanism (not illustrated). When the caps M5010 go up to an ascending position, the caps M5010 cap each of the ejection faces of several ejecting portions provided to the printing head H1001. While no print operation is being performed, the caps M5010 can protect the printing head H1001. Otherwise, the caps M5010 can recover the printing head H1001 by suction. While a print operation is being performed, the caps M5010 can be placed in a descending position which prevents the caps M5010 from interfering with the printing head H1001. In addition, by opposing the caps M5010 to the ejection face, the caps M5010 are capable of receiving preliminary ejections. In a case where, for instance, the printing head H1001 is provided with ten ejecting portions, two caps M5010 are provided to the cleaning section in the illustrated example so that the ejection face corresponding to each five ejecting portions can be capped collectively by corresponding one of the two caps M5010.

A wiper portion M5020 made of an elastic member such as rubber is fixed to a wiper holder (not illustrated). The wiper holder is capable of moving in directions indicated by −Y and +Y in FIG. 16 (−Y and +Y are directions in which the ejection openings in the ejecting portions are arranged). When the printing head H1001 gets to the home position, the wiper holder moves in the direction indicated by an arrow −Y. Thereby, a surface of the printing head H1001 can be wiped. Once the wiping operation is completed, the carriage is caused to escape out of the range where the wiping operation is designed to be performed, and thus the wiper is returned to a position which prevents the wiper from interfering with the ejection face and the like. Incidentally, the wiper portion M5020 of this example is provided with a wiper blade M5020A for wiping the entire surface of the printing head H1001 including all of the ejection faces of the ejecting portions. In addition, the wiper portion M5020 is provided with the other two wiper blades M5020B and M5020C. The wiper blade M5020B wipes vicinities of nozzles for ejection faces of five of the ten ejecting portions, whereas the wiper blade M5020C wipes vicinities of nozzles for ejection faces of the other five of the ten ejecting portions.

After wiping, the wiper portion M5020 abuts on a blade cleaner M5060. Thereby, the wiper blades M5020A to M5020C are configured to be cleaned of inks and the like which have been adhered to themselves. In addition, the wiper portion M5020 has the following configuration (a wetting liquid transferring unit). A wetting liquid is transferred onto the wiper blades M5020A to M5020C before wiping. This enhances cleaning performance of the wiping operation. Descriptions will be provided later for a configuration of this wetting liquid transferring unit and the wiping operation.

The suction pump M5000 is capable of generating negative pressure in a state where an airtight space is formed inside the cap M5010 by connecting the cap M5010 to the ejection faces. Thereby, inks can be filled in the ejecting portions from the ink tanks H1900. In addition, dust, adhering matter, bubbles and the like which exist in the ejection openings and the internal ink passage leading to the ejection openings can be removed by suction.

What is used for the suction pump M5000 is, for example, a tube pump. This includes a member having a curved surface which is formed by squeezing and holding at least part of a flexible tube; a roller being capable of pressing the flexible tube towards the member; and a roller supporting part which supports the roller, and which is capable of rotating. Specifically, the roller supporting part is rotated in a predetermined direction, and thereby the roller is rolled on the member in which the curved surface has been formed, while pressing the flexible tube. In response to this, the negative pressure is generated in the airtight space formed by the cap M5010. This negative pressure sucks inks from the ejection openings, and subsequently sucks up the inks into the tube or the suction pump from the cap M5010. Thereafter, the sucked inks are further transferred to a suitable member (a waste ink absorbing member) provided inside the lower case M7080.

Note that an absorbing member M5011 is provided to the inside portion of the cap M5010 for the purpose of reducing the amount of inks remaining on the ejection faces of the printing head H1001 after the suction. In addition, consideration is made for sucking inks, which remain in the cap M5010 and the absorbing member M5011, in a state where the cap M5010 is opened, and for thus precluding the ink residue from coagulating and for accordingly preventing an adverse affect from occurring subsequently by sucking. It is desirable that no abrupt negative pressure should work on the ejection faces by providing an open-to-atmosphere valve (not illustrated) in a middle of the ink suction passage, and by thus beforehand opening the valve when the cap M5010 is intended to be detached from the ejection faces.

Furthermore, the suction pump M5000 can be operated not only for the purpose of the recovery by suction, but also for the purpose of discharging inks which have been received by the cap M5010 by the preliminary ejection operation performed in the state where the cap M5010 is opposite to the ejection faces. Specifically, when an amount of inks held in the cap M5010 after preliminary ejection reaches a predetermined amount, the inks held in the cap M5010 can be transferred to the waste ink absorbing member through the tube by operating the suction pump M5000.

The series of operations performed successively, such as the operations of the wiper portion M5020, the ascent/descent of the cap M5010 and the opening/closing of the valve, can be controlled by means of a main cam (not illustrated) provided on the output axle of the motor E0003, and a plurality of cams and arms and like which move so as to follow the main cam. Specifically, rotation of the main cam in response to a direction in which the motor E0003 rotates operates cams, arms and the like in each of the units and parts. Thereby, the predetermined operations can be performed. The position of the main cam can be detected with a position detection sensor such as a photo-interrupter.

(H) Wetting Liquid Transferring Unit (Refer to FIGS. 16 and 17)

Recently, inks containing pigment components as coloring agents (pigmented inks) are increasingly used for the purpose of enhancing the printing density, water resistance, light resistance of printed materials. Pigmented inks are produced through dispersing coloring agents themselves, which are originally solids, into water by adding dispersants thereto, or by introducing functional groups to pigment surfaces. Consequently, dried matter of pigmented inks resulting from drying the inks through evaporating moisture from the inks on the ejection faces damages the ejection faces more than dried coagulated matter of dyed inks in which the coloring agents are dissolved at molecular level. In addition, polymer compounds used for dispersing the pigments into the solvent are apt to be adsorbed to the ejection faces. This type of problem occurs in matter other than pigmented inks in a case where polymer compounds exist in the inks as a result of adding reactive liquids to the inks for the purpose of administering the viscosities of the inks, for the purpose of enhancing the light resistance of the inks, or for other purposes.

In this embodiment, a liquid is transferred onto, and adhered to, the blades of the wiper portion M5020, and thus the wiping operation is performed with the wetted blades M5020, in order to solve the foregoing problem. Thereby, the present embodiment attempts at preventing the ejection faces from deteriorating due to the pigmented inks, at reducing the abrasion of the wiper, and at removing the accumulated matter by dissolving the ink residue accumulated on the ejection faces. Such a liquid is termed as the wetting liquid from the viewpoint of its function in the description. The wiping by use of this liquid is termed as the wet wiping.

This embedment adopts a configuration in which the wetting liquid is stored inside the main body of the printing apparatus. Reference numeral M5090 denotes a wetting liquid tank. As the wetting liquid, a glycerin solution or the like is contained in the wetting liquid tank M5090. Reference numeral M5100 denotes a wetting liquid holding member, which is fibrous member or the like. The wetting liquid holding member M5100 has an adequate surface tension for the purpose of preventing the wetting liquid from leaking from the wetting liquid tank M5090. The wetting liquid holding member M5100 is impregnated with, and holds, the wetting liquid. Reference numeral M5080 denotes a wetting liquid transferring member, which is made, for example, of a porous material having an adequate capillary force. The wetting liquid transferring member M5080 includes a wetting liquid transferring part M5081 which is in contact with the wiper blade. The wetting liquid transferring member M5080 is also in contact with the wetting liquid holding member M5100 infiltrated with the wetting liquid. As a result, the wetting liquid transferring member M5080 is also infiltrated with the wetting liquid. The wetting liquid transferring member M5080 is made of the material having the capillary force which enables the wetting liquid to be supplied to the wetting liquid transferring part M5081 even if a smaller amount of wetting liquid remains Descriptions will be provided for operations of the wetting liquid transferring unit and the wiper portion.

First of all, the cap M5010 is set at the descending position, and thus is escaped to a position where the carriage M4000 does not contact the blades M5020A to M5020C, In this state, the wiper portion M5020 is moved in the −Y direction, and is caused to pass through the part of the blade cleaner M5060. Accordingly, the wiper portion M5020 is caused to abut on the wetting liquid transferring part M5081 (refer to FIG. 17). By keeping the wiper portion M5020 in contact with the wetting liquid transferring part M5081 for an adequate length of time, an adequate amount of wetting liquid is transferred onto the wiper portion M5020.

Subsequently, the wiper portion M5020 is moved in the +Y direction. The blade contacts the blade cleaner M5060 only in a part of the surface of the blade cleaner M5060, and no wetting liquid is adhered to the part. For this reason, the wetting liquid remains to be held on the blade.

The blade is returned to the position where the wiping operation has been started. Thereafter, the carriage M4000 is moved to the position where the wiping operation is designed to be performed. Subsequently, the wiper portion M5020 is moved in the −Y direction. Thereby, the ejection faces of the printing head H1001 can be wiped with the surface to which the wetting liquid is adhered.

1.3 Configuration of Electrical Circuit

Descriptions will be provided next for a configuration of an electrical circuit of this embodiment.

FIG. 18 is a block diagram for schematically describing the entire configuration of the electrical circuit in the printing apparatus J0013. The printing apparatus to which this embodiment is applied is configured chiefly of the carriage board E0013, the main substrate E0014, a power supply unit E0015, a front panel E0106 and the like.

The power supply unit E0015 is connected to the main substrate E0014, and thus supplies various types of drive power.

The carriage board E0013 is a printed circuit board unit mounted on the carriage M4000. The carriage board E0013 functions as an interface for transmitting signals to, and receiving signals from, the printing head H1001 and for supplying head driving power through the head connector E0101. The carriage board E0013 includes a head driving voltage modulation circuit E3001 with a plurality of channels to the respective ejecting portions of the printing head H1001. The plurality of ejecting portions corresponding respectively to the plurality of mutually different colors. In addition, the head driving voltage modulation circuit E3001 generates head driving power supply voltages in accordance with conditions specified by the main substrate E0014 through the flexible flat cable (CRFFC) E0012. In addition, change in a positional relationship between the encoder scale E0005 and the encoder sensor E0004 is detected on the basis of a pulse signal outputted from the encoder sensor E0004 in conjunction with the movement of the carriage M4000. Moreover, the outputted signal is supplied to the main substrate E0014 through the flexible flat cable (CRFFC) E0012.

Figure 20:
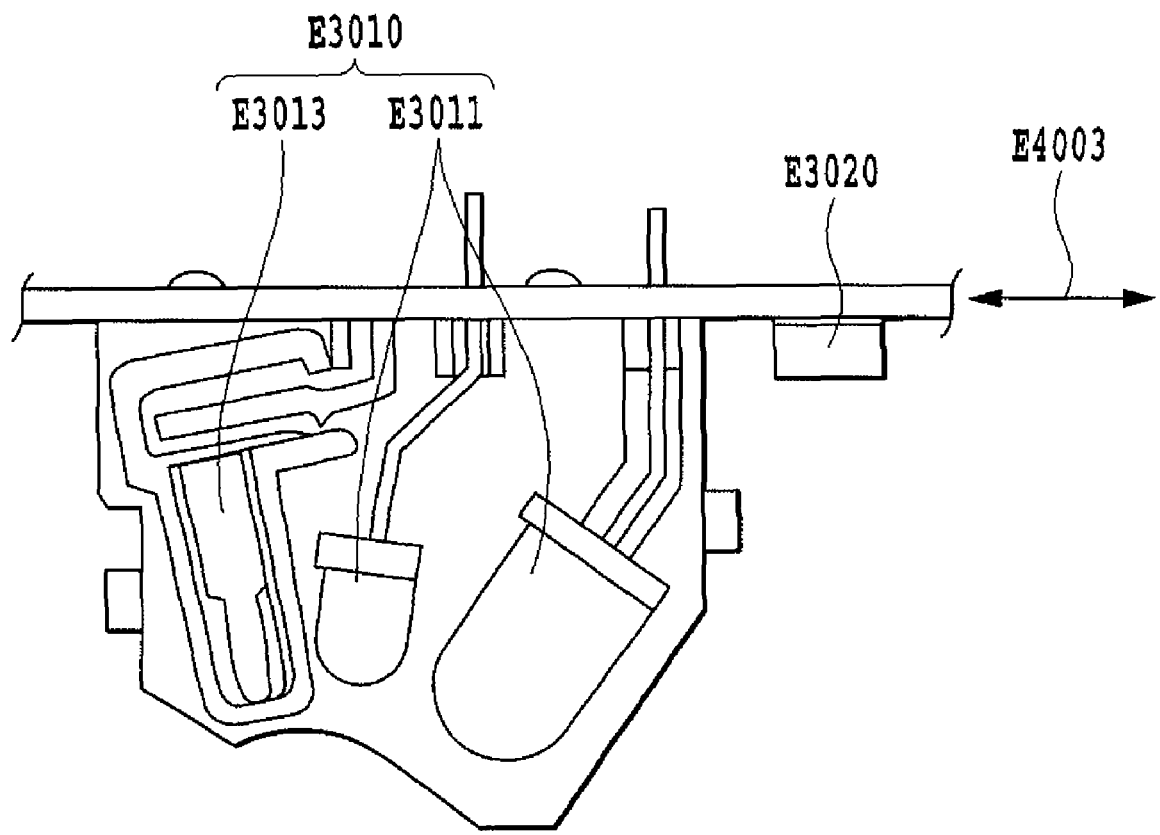
FIG. 20 is a diagram showing an example of a configuration of a multi-sensor system mounted on a carriage board shown in FIG. 18.

An optical sensor E3010 and a thermistor E3020 are connected to the carriage board E0013, as shown in FIG. 20. The optical sensor E3010 is configured of two light emitting devices (LEDs) E3011 and a light receiving element E3013. The thermistor E3020 is that with which an ambient temperature is detected. Hereinafter, these sensors are referred to as a multi-sensor system E3000. Information obtained by the multi-sensor system E3000 is outputted to the main substrate E00014 through the flexible flat cable (CRFFC) E0012.

The main substrate E0014 is a printed circuit board unit which drives and controls each of the sections of the ink jet printing apparatus of this embodiment. The main substrate E0014 includes a host interface (host I/F) E0017 thereon. The main substrate E0014 controls print operations on the basis of data received from the host apparatus J0012 (FIG. 1). The main substrate E0014 is connected to and controls various types of motors including the carriage motor E0001, the LF motor E0002, the AP motor E3005 and the PR motor E3006. The carriage motor E0001 is a motor serving as a driving power supply for causing the carriage M4000 to perform main scan. The LF motor E0002 is a motor serving as a driving power supply for conveying printing medium. The AP motor E3005 is a motor serving as a driving power supply for causing the printing head H1001 to perform recovery operations. The PR motor E3006 is a motor serving as a driving power supply for performing a flat-pass print operation; and the main substrate E0014 thus controls drive of each of the functions. Moreover, the main substrate E0014 is connected to sensor signals E0104 which are used for transmitting control signals to, and receiving detection signals from, the various sensors such as a PF sensor, a CR lift sensor, an LF encoder sensor, and a PG sensor for detecting operating conditions of each of the sections in the printer. The main substrate E0014 is connected to the CRFFC E0012 and the power supply unit E0015. Furthermore, the main substrate E0014 includes an interface for transmitting information to, and receiving information from a front panel E0106 through panel signals E0107.

The front panel E0106 is a unit provided to the front of the main body of the printing apparatus for the sake of convenience of user's operations. The front panel E0106 includes the resume key E0019, the LED guides M7060, the power supply key E0018, and the flat-pass key E3004 (refer to FIG. 6). The front panel E0106 further includes a device I/F E0100 which is used for connecting peripheral devices, such as a digital camera, to the printing apparatus.

Figure 19:
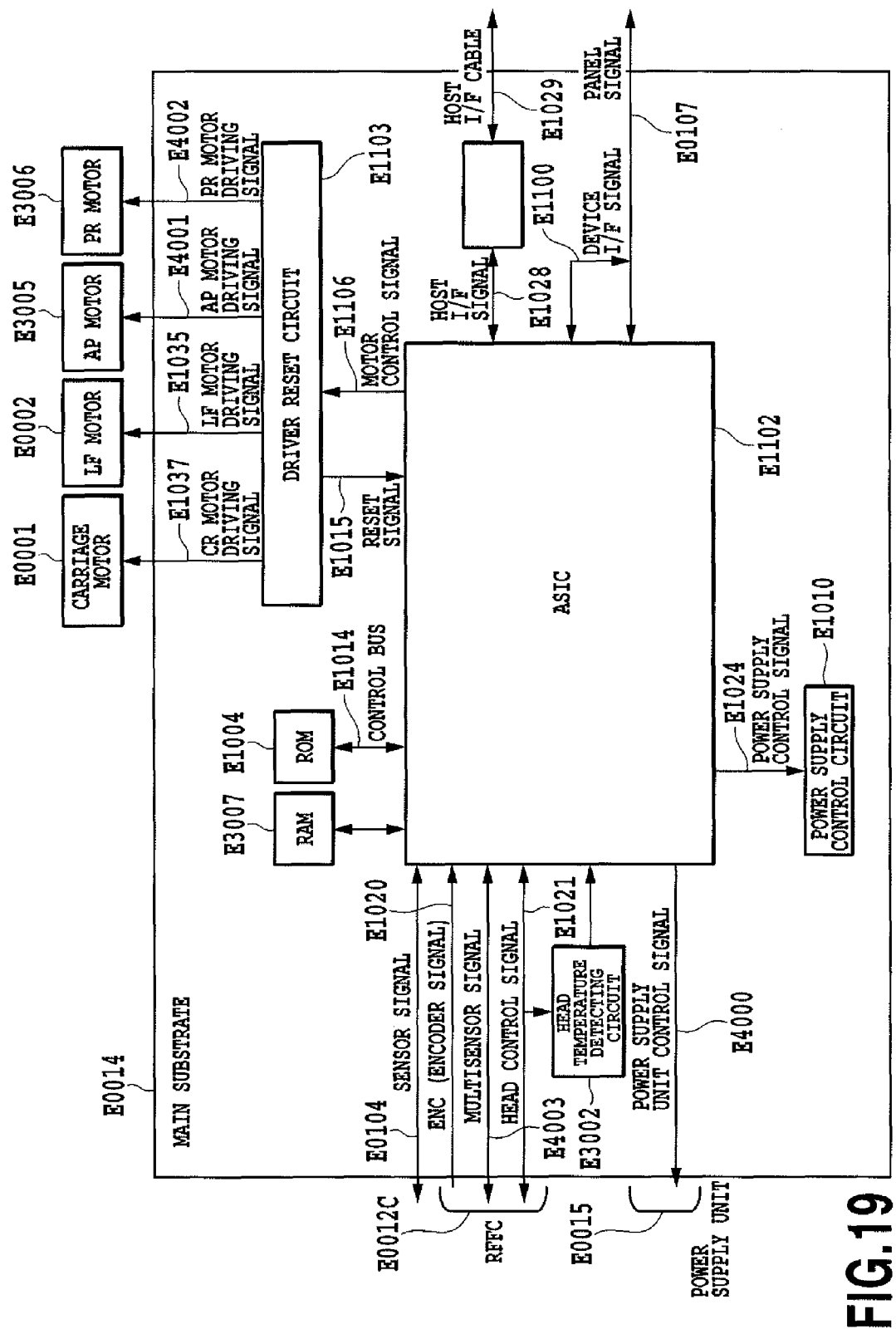
FIG. 19 is a block diagram showing an example of an internal configuration of a main substrate shown in FIG. 18.

FIG. 19 is a block diagram showing an internal configuration of the main substrate E1004.

In FIG. 19, reference numeral E1102 denotes an ASIC (Application Specific Integrated Circuit). The ASIC E1102 is connected to a ROM E1004 through a control bus E1014, and thus performs various controls in accordance with programs stored in the ROM E1004. For example, the ASIC E1102 transmits sensor signals E0104 concerning the various sensors and multi-sensor signals E4003 concerning the multi-sensor system E3000. In addition, the ASIC E1102 receives sensor signals E0104 concerning the various sensors and multi-sensor signals E4003 concerning the multi-sensor system. Furthermore, the ASIC E1102 detects encoder signals E1020 as well as conditions of outputs from the power supply key E0018, the resume key E0019 and the flat-pass key E3004 on the front panel E0106. In addition, the ASIC E1102 performs various logical operations, and makes decisions on the basis of conditions, depending on conditions in which the host I/F E0017 and the device I/F E0100 on the front panel are connected to the ASIC E1102, and on conditions in which data are inputted. Thus, the ASIC E1102 controls the various components, and accordingly drives and controls the ink jet printing apparatus.

Reference E1103 denotes a driver reset circuit. In accordance with motor controlling signals E1106 from the ASIC E1102, the driver reset circuit E1103 generates CR motor driving signals E1037, LF motor driving signals E1035, AP motor driving signals E4001 and PR motor driving signals 4002, and thus drives the motors. In addition, the driver reset circuit E1103 includes a power supply circuit, and thus supplies necessary power to each of the main substrate E0014, the carriage board E0013, the front panel E0106 and the like. Moreover, once the driver reset circuit E1103 detects drop of the power supply voltage, the driver reset circuit E1103 generates reset signals E1015, and thus performs initialization.

Reference numeral E1010 denotes a power supply control circuit. In accordance with power supply controlling signals E1024 outputted from the ASIC E1102, the power supply control circuit E1010 controls the supply of power to each of the sensors which include light emitting devices.

The host I/F E0017 transmits host I/F signals E1028, which are outputted from the ASIC E1102, to a host I/F cable E1029 connected to the outside. In addition, the host I/F E0017 transmits signals, which come in through this cable E1029, to the ASIC E1102.

Meanwhile, the power supply unit E0015 supplies power. The supplied power is supplied to each of the components inside and outside the main substrate E0014 after voltage conversion depending on the necessity. Furthermore, power supply unit controlling signals E4000 outputted from the ASIC E1102 are connected to the power supply unit E0015, and thus a lower power consumption mode or the like of the main body of the printing apparatus is controlled.

The ASIC E1102 is a single-chip semiconductor integrated circuit incorporating an arithmetic processing unit. The ASIC E1102 outputs the motor controlling signals E1106, the power supply controlling signals E1024, the power supply unit controlling signals E4000 and the like. In addition, the ASIC E1102 transmits signals to, and receives signals from, the host I/F E0017. Furthermore, the ASIC E1102 transmits signals to, and receives signals from, the device I/F E0100 on the front panel by use of the panel signals E0107. As well, the ASIC E1102 detects conditions by means of the sensors such as the PE sensor and an ASF sensor with the sensor signals E0104. Moreover, the ASIC E1102 controls the multi-sensor system E3000 with the multi-sensor signals E4003, and thus detects conditions. In addition, the ASIC E1102 detects conditions of the panels signals E0107, and thus controls the drive of the panel signals E0107. Accordingly, the ASIC E1102 turns on/off the LEDs E0020 on the front panel.

The ASIC E1102 detects conditions of the encoder signals (ENC) E1020, and thus generates timing signals. The ASIC E1102 interfaces with the printing head H1001 with head controlling signals E1021, and thus controls print operations. In this respect, the encoder signals (ENC) E1020 are signals which are receives from the CRFFC E0012, and which have been outputted from the encoder sensor E0004. In addition, the head controlling signals E1021 are connected to the carriage board E0013 through the flexible flat cable E0012. Subsequently, the head controlling signals E1021 are supplied to the printing head H1001 through the head driving voltage modulation circuit E3001 and the head connector E0101. Various types of information from the printing head H1001 are transmitted to the ASIC E1102. Signals representing information on head temperature of each of the ejecting portions among the types of information are amplified by a head temperature detecting circuit E3002 on the main substrate, and thereafter the signals are inputted into the ASIC E1102. Thus, the signals are used for various decisions on controls.

In the figure, reference numeral E3007 denotes a DRAM. The DRAM E3007 is used as a data buffer for a print, a buffer for data received from the host computer, and the like. In addition, the DRAM is used as work areas needed for various control operations.

1.4 Configuration of Printing Head

Descriptions will be provided below for a configuration of the head cartridge H1000 to which this embodiment is applied.

The head cartridge H1000 in this embodiment includes the printing head H1001, means for mounting the ink tanks H1900 on the printing head H1001, and means for supplying inks from the respective ink tanks H1900 to the printing head H1001. The head cartridge H1000 is detachably mounted on the carriage M4000.

Figure 21:
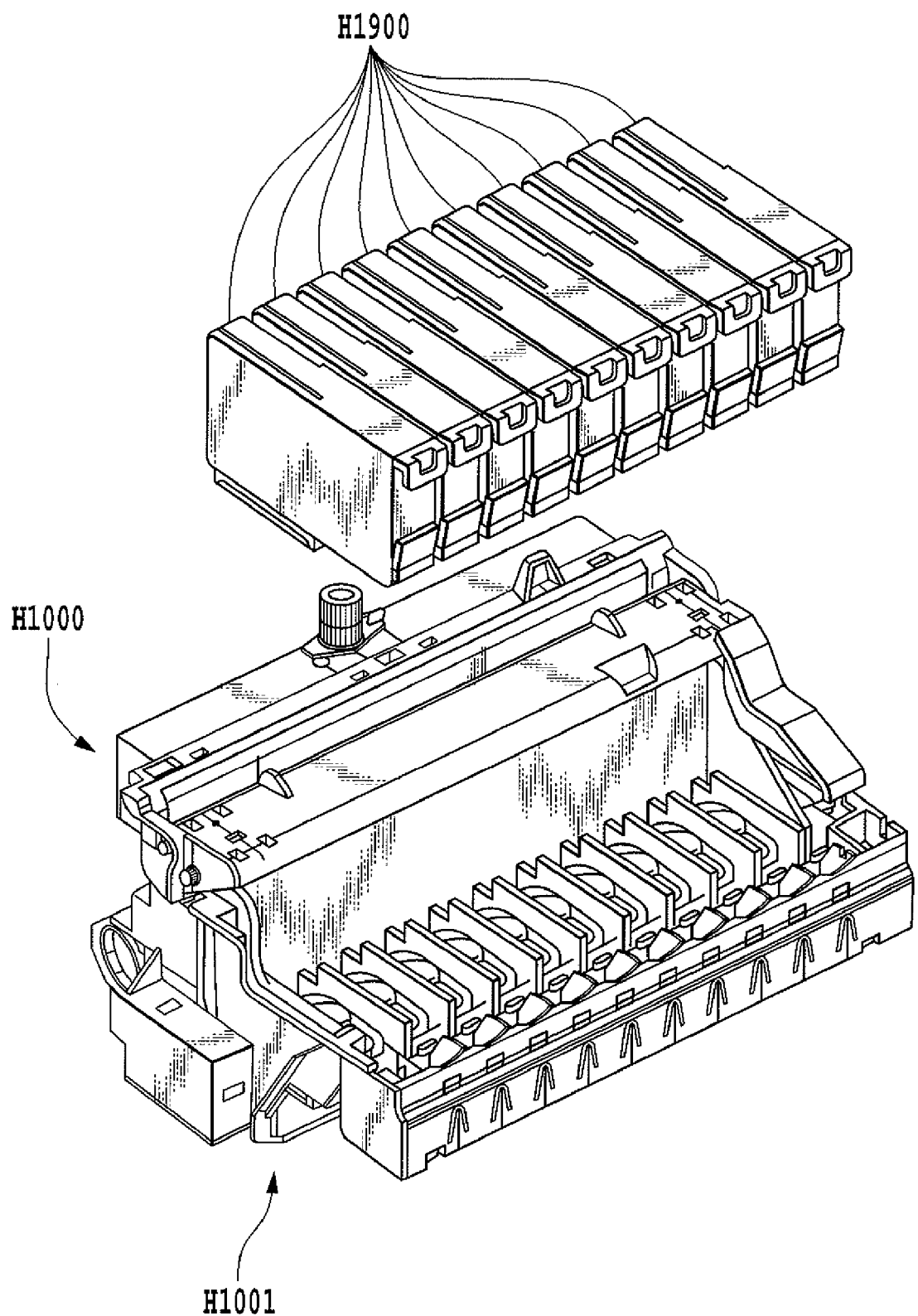
FIG. 21 is a perspective view of a head cartridge and ink tanks applied in the embodiment, which shows how the ink tanks are attached to the head cartridge.

FIG. 21 is a diagram showing how the ink tanks H1900 are attached to the head cartridge H1000 to which this embodiment is applied. The printing apparatus of this embodiment forms an image by use of the pigmented inks corresponding respectively to the ten colors. The ten colors are cyan (C), light cyan (Lc), magenta (M), light magenta (Lm), yellow (Y), black 1 (K1), black 2 (K2), red (R), green (G) and gray (Gray). For this reason, the ink tanks H1900 are prepared respectively for the ten colors. As shown in FIG. 21, each of the ink tanks can be attached to, and detached from, the head cartridge H1000. Incidentally, the ink tanks H1900 are designed to be attached to, and detached from, the head cartridge H1000 in a state where the head cartridge H1000 is mounted on the carriage M4000.

1.5 Configuration of Inks

Descriptions will be provided below for the ten color inks used in the present invention.

The ten colors used in the present invention are cyan (C), light cyan (Lc), magenta (M), light magenta (Lm), yellow (Y), black 1 (K1), black 2 (K2), gray (Gray), red (R) and green (G). It is desirable that all of the coloring agents used respectively for the ten colors should be pigments. In this respect, for the purpose of dispersing the pigments, publicly known dispersants may be used. Otherwise, for the purpose, it is sufficient that pigments surfaces are modified by use of a publicly known method, and that self-dispersants are added thereto. In addition, coloring agents used for at least some of the colors may be dyes as long as the use agrees with the spirit and scope of the present invention. Furthermore, coloring agents used for at least some of the colors may be what are obtained by harmonizing pigments and dyes in color, and a plurality of kinds of pigments may be included therein. Moreover, as for the ten colors of the present invention at least one kind of substance selected from the group consisting of an aqueous organic solvent, an additive, a surfactant, a binder and an antiseptic may be included in therein as long as the inclusion is within the spirit and the scope of the present invention.

2. Characteristic Configuration

The present invention relates to an arrangement of print permitting areas of a mask used for the multi-pass printing. Specifically, in the gradation mask shown in FIG. 5, print permitting areas are arranged not to be positioned adjacent to each other in a direction in which the printing head scans. In the case of this embodiment, the mask pattern to be used in the mask data converting process J0008, which has been described in conjunction with FIG. 1, and to be used for the multi-pass printing, is configured to be a pattern of the gradation mask, and to be concurrently a pattern in which print permitting areas are not disposed adjacent to each other in the direction in which the printing head scans.

Features of the present embodiment will be explained below more specifically. The present embodiment executes multi-pass printing in which K (K is an integer equal to or greater than 2) times of scanning with a printing head to a given area of a printing medium are executed to perform printing. In the multi-pass printing, K nozzle groups, which is made by dividing nozzles of the printing head into K parts, are sequentially opposed to the given area of the printing medium for each of K times of scanning so as to use the K nozzle groups sequentially to perform printing. In order to oppose the K nozzle groups sequentially to the given area in each scanning, the printing medium is conveyed by a length corresponding to one nozzle group between two successive scans. For example, in the case of 4 pass printing shown in FIG. 5, the first to fourth nozzle groups are sequentially used in first to fourth scanning respectively for performing printing. The mask patterns A to D are made correspond to the first to fourth nozzle groups respectively, and printing by the first to fourth nozzle groups are sequentially executed based on print data that is generated by thinning data with use of the corresponding mask patterns A to D, respectively.

Figure 24:
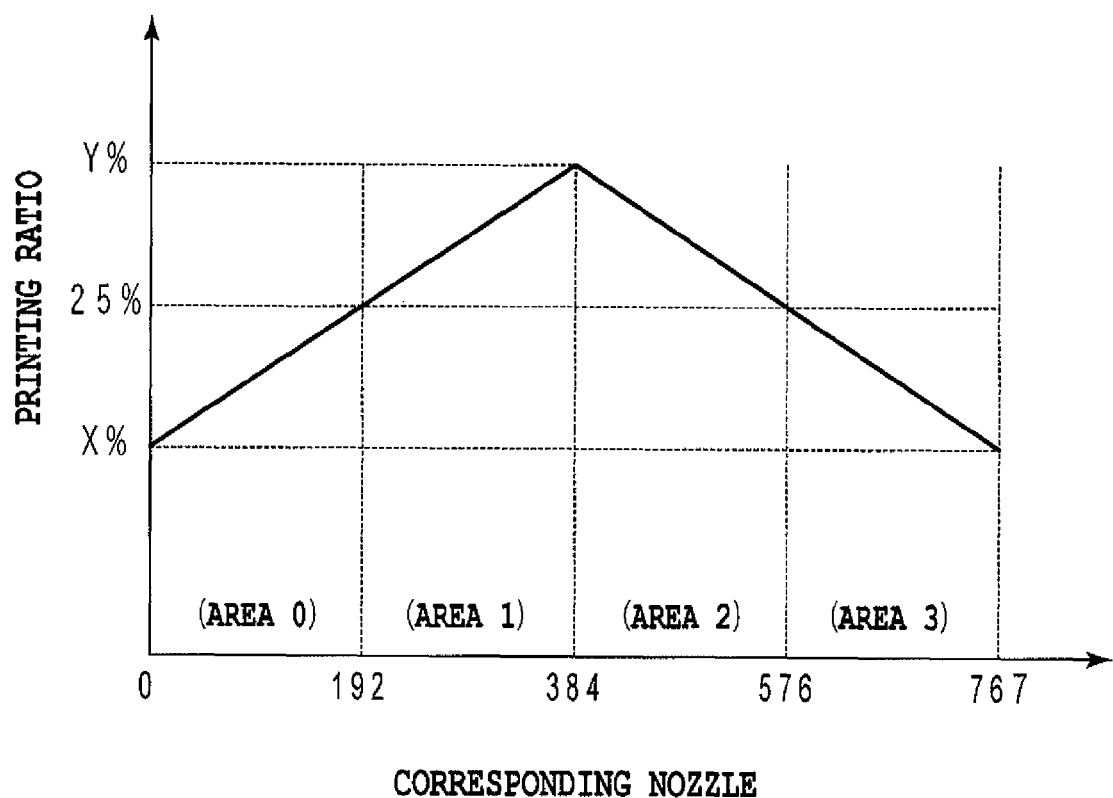
FIG. 24 is a diagram showing what printing ratio is set for each nozzle position according to the first embodiment.
Figure 25:
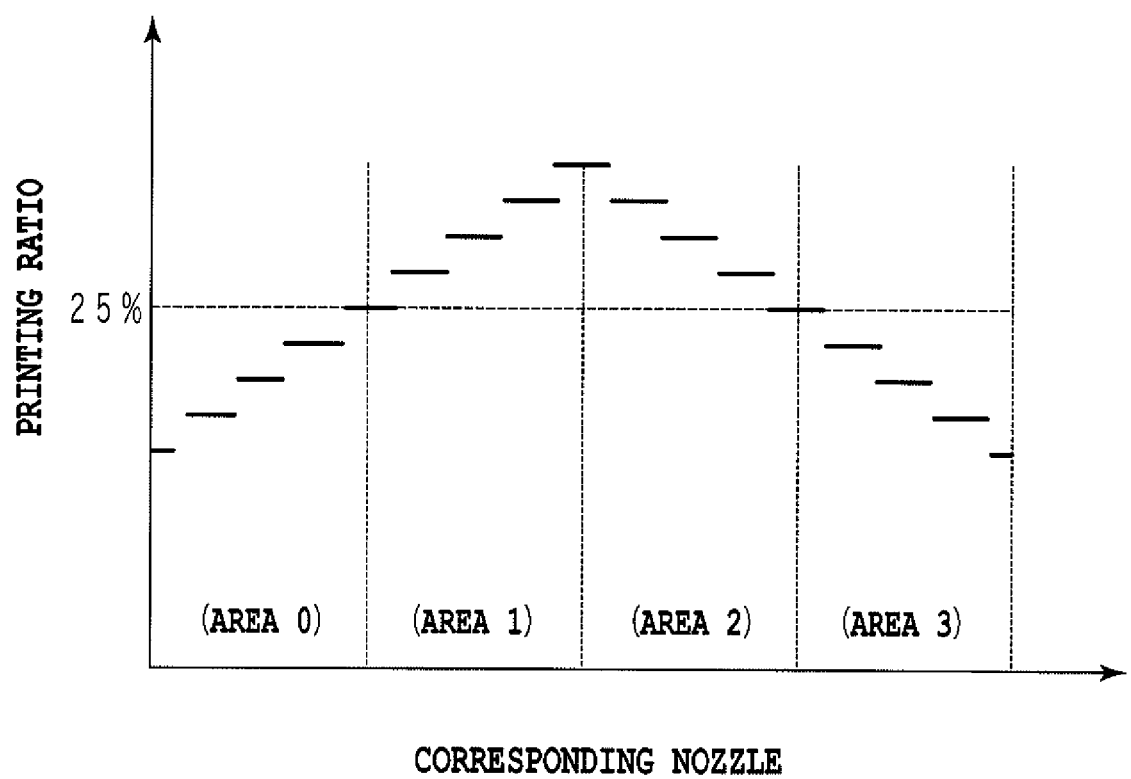
FIG. 25 is a diagram showing another example of what printing ratio is set for each nozzle position according to the first embodiment.

A first feature of the mask pattern according to the present embodiment is that as shown in FIG. 5, printing ratios of mask pattern (10%, 10%) corresponding to nozzles located at end portions in a nozzle arrangement of the printing head (lower nozzles in the first nozzle group, upper nozzles in the fourth nozzle group) are smaller than printing ratios of mask pattern (40%, 40%) corresponding to nozzles located at central portions in the nozzle arrangement (upper nozzles in the second nozzle group, lower nozzles in the third nozzle group). In the example shown in FIG. 5, print permitting areas and print non-permitting areas of the mask pattern are determined so that the printing ratio (ratio of the print permitting area) gradually decreases from central portions of a nozzle arrangement to end portions of the nozzle arrangement along the nozzle arrangement such as decreasing form 40% to 30%, form 30% to 20%, and form 20% to 10%. It is preferable that each of the mask patterns A to D also has an arrangement of the print permitting areas and the print non-permitting areas so that the farther from the central portion and closer to the end portion, the ratio of the print permitting areas becomes smaller, as shown in FIG. 5 and FIGS. 24 and 25.

In addition to the above first feature, the present embodiment also has a second feature that "the print permitting areas are arranged not to be adjacent to each other in a scanning direction". That is, the mask patterns of the present embodiment have a non-adjacency property that the print permitting areas are not adjacent to each other, as well as a property of the gradation mask that printing ratios are differentiated along a nozzle arrangement. According to the mask patterns having these two properties, both end stripes and high speed driving of the print head are achieved at the same time.

Further, it is preferable that the print permitting areas are arranged to be aperiodic. The aperiodic arrangement of the print permitting areas can bring an effect of decreasing coincidence of the arrangement of the print permitting areas and print data.

First Embodiment

Mask Pattern Generating Process

Figure 22:
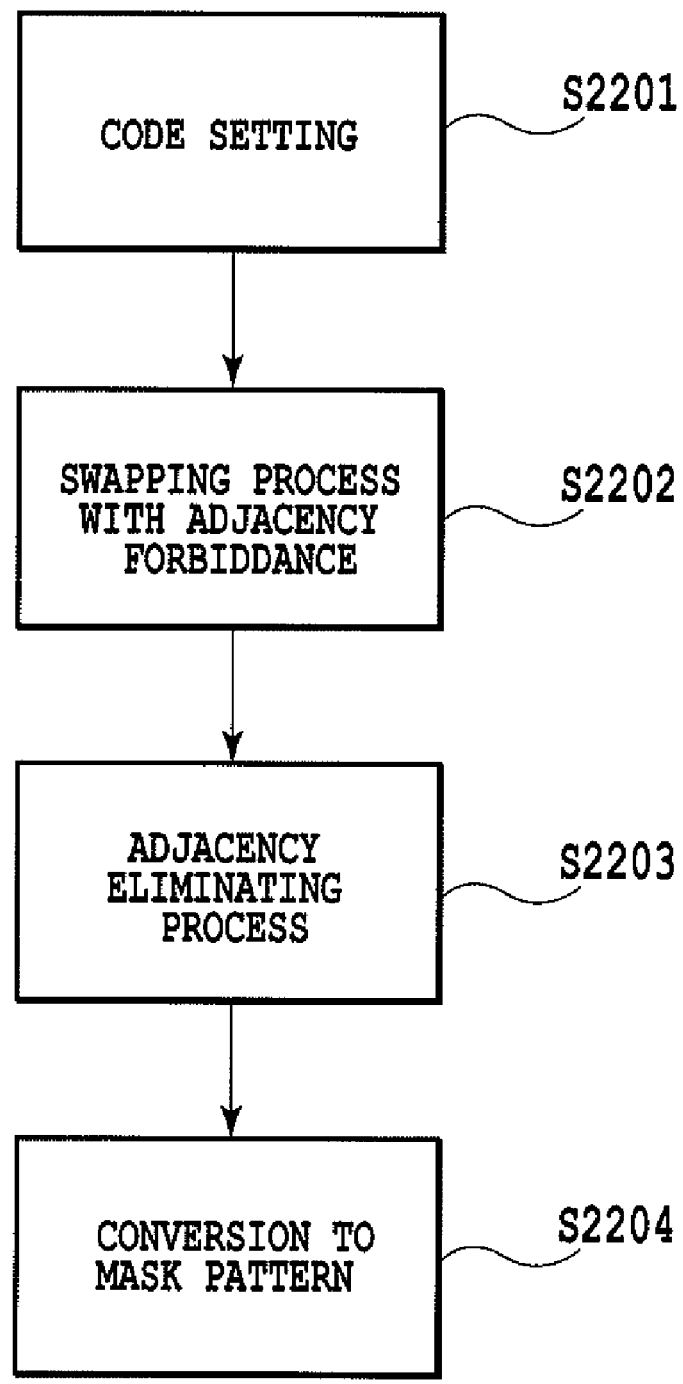
FIG. 22 is a flowchart schematically showing a process of generating a mask pattern according to a first embodiment of the present invention.

FIG. 22 is a flowchart showing a mask pattern generating process according to the first embodiment of the present invention.

As shown in FIG. 22, the mask pattern generating process includes the following four steps. Specifically, in a "code setting" step S2201, codes distinguished by numbers and types, which correspond respectively to the setting of the number of passes and printing ratios, are set in a buffer for making a mask pattern. In a subsequent step S2202 of performing "swapping process with adjacency forbiddance," two points in the horizontal direction (corresponding to the direction in which the printing head scans) of the buffer in which the codes are set as described above are selected, and thus codes located in the two points are interchanged whit each other (swapped). This process is performed sequentially on all of the lines (data lines running in the horizontal direction). Subsequently, in a step S2203 of performing an "adjacency eliminating process," it is checked on whether or not there still remain the same codes adjacent to each other. If there still remain the same codes adjacent to each other, a process of eliminating adjacency is performed. Thereafter, in a "conversion to mask pattern" step S2204, these codes are converted into a mask pattern on a basis of a code for making a mask pattern.

Through performing the above mask pattern generating process according to this embodiment, adjacency between print permitting areas is removed from the mask pattern. Thereby, restrictions on driving frequencies are eased. For example, the speed at which the printing head scans can be approximately doubled without changing the driving frequencies. Thus, the printing operations can be performed at a higher speed. Specifically, in a case where the mask pattern includes an area arrangement pattern in which print permitting areas are adjacent to each other, the driving frequencies are set in order for corresponding nozzles to be driven for the purpose of performing a printing operation which the adjacent print permitting areas allow to be performed. In a case where the printing speed is intended to be increased, driving frequencies which are the highest possible in the printing head, and which is obtained by giving consideration to the refilling of ink, is set as the driving frequency for realizing the higher-speed printing speed. Thus, scanning speed is set in conjunction with the driving frequency. Thereby, dots are arranged to be printed in pixels corresponding to the adjacent print permitting areas. In sum, this embodiment of the present invention makes it possible to remove at least adjacency between print permitting areas in the mask pattern, and to thereby double the scanning speed in a case where the preset driving frequency is not changed.

Detailed descriptions will be provided below for each of the steps shown in FIG. 22. This embodiment enables a multi-pass printing operation which completes a print in a certain area by print scanning four times by use of a printing head with 768 nozzles arrayed for each color.

In this case, a sheet of paper is conveyed in a distance equal to the width of a group of 192 nozzles in a time interval between each two consecutive passes for the print scanning.

"Code Setting" Step S2201

Figure 23:
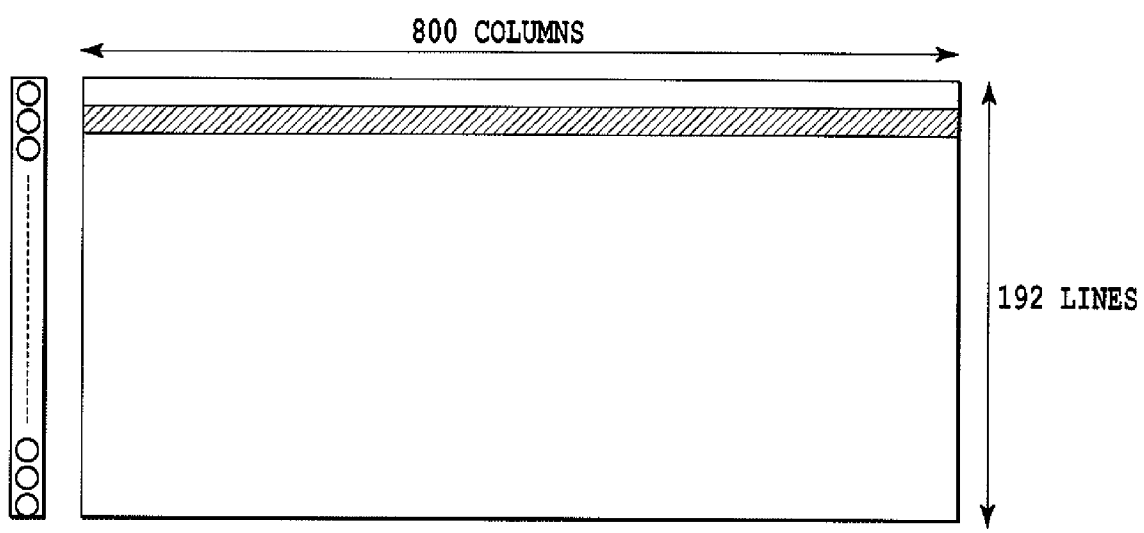
FIG. 23 is an explanatory view of a buffer for generating the mask pattern according to the first embodiment of the present invention.

FIG. 23 is a diagram for explaining contents of the buffer for making a mask pattern. The buffer for making a mask pattern according to this embodiment is the same in size as the mask pattern. The vertical size of the buffer for making a mask pattern corresponds to a number which is obtained by dividing the number of nozzles by the number of passes (four as the number of scan passes for the multi-pass printing operation). The vertical size corresponds to 192 lines in the case of this embodiment, as shown in FIG. 23. The horizontal size of the buffer is the same as that of the mask pattern, and corresponds to 800 columns in the case of this embodiment. Incidentally, the mask pattern which corresponds to these 800 columns in the horizontal direction (corresponding to the scanning direction) is repeatedly used as the mask pattern according to this embodiment.

FIGS. 24 and 25 show examples of printing ratios which are set corresponding to the positions of the respective nozzles used for printing by use of the mask pattern. FIG. 24 shows a case where the printing ratios are set corresponding to the respective nozzle positions as continuously as possible. FIG. 25 shows a case where the printing ratios are set stepwise. Descriptions will be provided below for an example in which the printing ratios are set as shown in FIG. 24. In addition, for the purpose of forbidding adjacency between print permitting areas, the printing ratios for the respective nozzles are set equal to, or less than, 50%. It should be noted that in FIGS. 24 and 25, nozzles of numbers 0-191 correspond to Area 0 make up the first nozzle group shown in FIG. 5, and nozzles of numbers 192-383 correspond to Area 1 make up the second nozzle group shown in FIG. 5. Similarly, nozzles of numbers 384-575 correspond to Area 2 make up the third nozzle group shown in FIG. 5, and nozzles of numbers 576-767 correspond to Area 3 make up the fourth nozzle group shown in FIG. 5.

Figure 26:
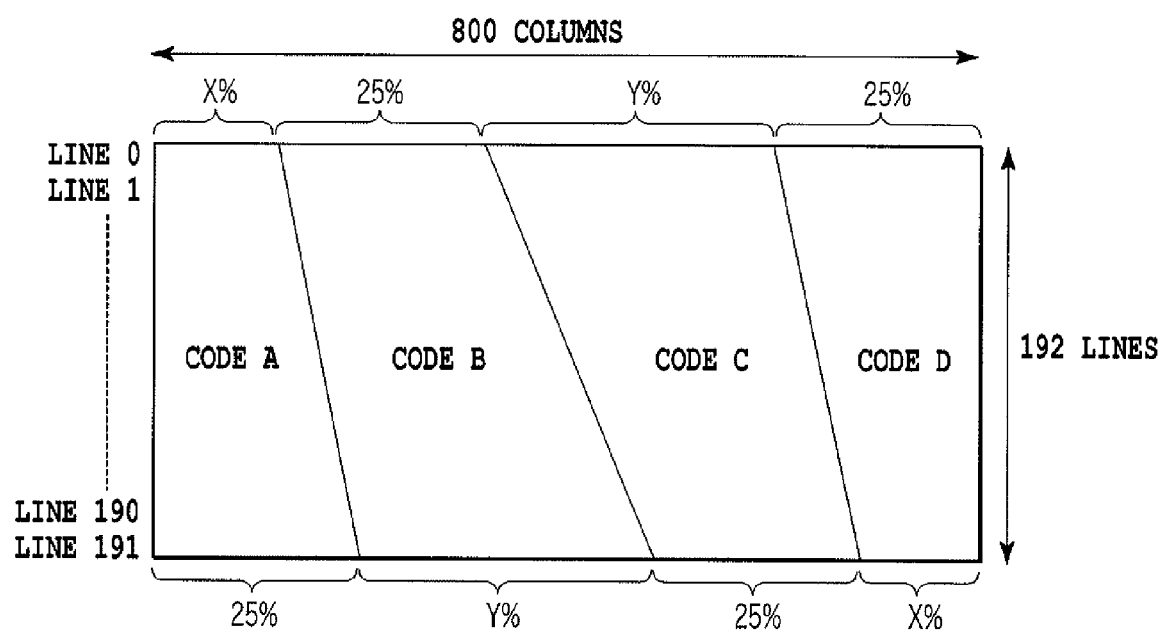
FIG. 26 is a diagram for explaining a "code setting" step to be performed in the process of generating the mask pattern according to the first embodiment.

FIG. 26 shows how Codes A, B, C and D are set in the buffer for making a mask pattern on the basis of the setting of the printing ratios which has been shown in FIG. 24. Codes A, B, C and D correspond to codes for setting the print permitting areas for a first, second, third and fourth passes respectively. In the example shown in FIG. 26, the vertical size and positions correspond to size and positions of nozzles, the number of which is 192 and which are used in each of four times of scanning to a same region where a print is completed by the four times of scanning. In addition, Codes A, B, C and D are codes corresponding respectively to Areas 0, 1, 2 and 3 which have been showed in FIG. 24, and are stored in the buffer as shown in FIG. 26. Specifically, the codes are stored respectively in the vertical 192×horizontal 800 areas with a code arrangement pattern as shown in FIG. 26. For example, in Line 0, Code A is stored in each of areas representing X % of the 800 areas which are arranged in a line from the left to the right depending on the printing ratios. Similarly, Code B is stored in each of areas representing 25% of the 800 areas, Code C is stored in each of areas representing Y % of the 800 areas, and Code D is stored in each of areas representing the other 25% of the 800 areas. In this manner, in this code setting step, the region where printing is to be completed by print scanning four times is filled with Codes A, B, C and D corresponding to the respective four scan passes in a way that the areas to which Codes A, B, C and D are assigned sum up to 100% of the 800 areas. This arrangement preliminarily ensures that the mask patterns to be used for the respective four scan passes are complementary with one another.

"Swapping Process with Adjacency Forbiddance" Step

Figure 27:
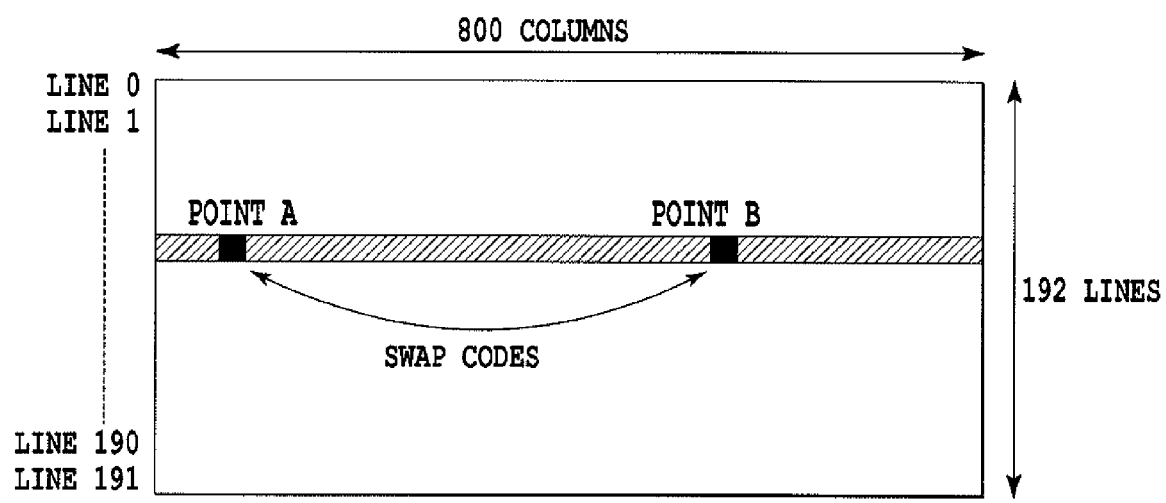
FIG. 27 is a diagram for explaining an "swapping process with adjacency forbiddance" to be performed in the process of making the mask pattern according to the first embodiment.

FIG. 27 is a diagram explaining the "swapping process with adjacency forbiddance." The process performed in this step is to select two points (for example, Points A and B shown in FIG. 27) from each of the code data lines (hereinafter also referred to as "lines") running in the horizontal direction in the buffer in which the codes are stored as described by referring to FIG. 26 by use of a method which will be described later. Thereafter, codes of the two points are interchanged (swapped). This process is repeated for each of the lines, for example, 200,000 times. Specifically, as described later, a process in which respective codes of two points are randomly selected and selected two codes are interchanged with each other is repeated, and therefore Codes A to D are arranged to be aperiodic. Thereby, property of mask can become aperiodic.

Figure 28:
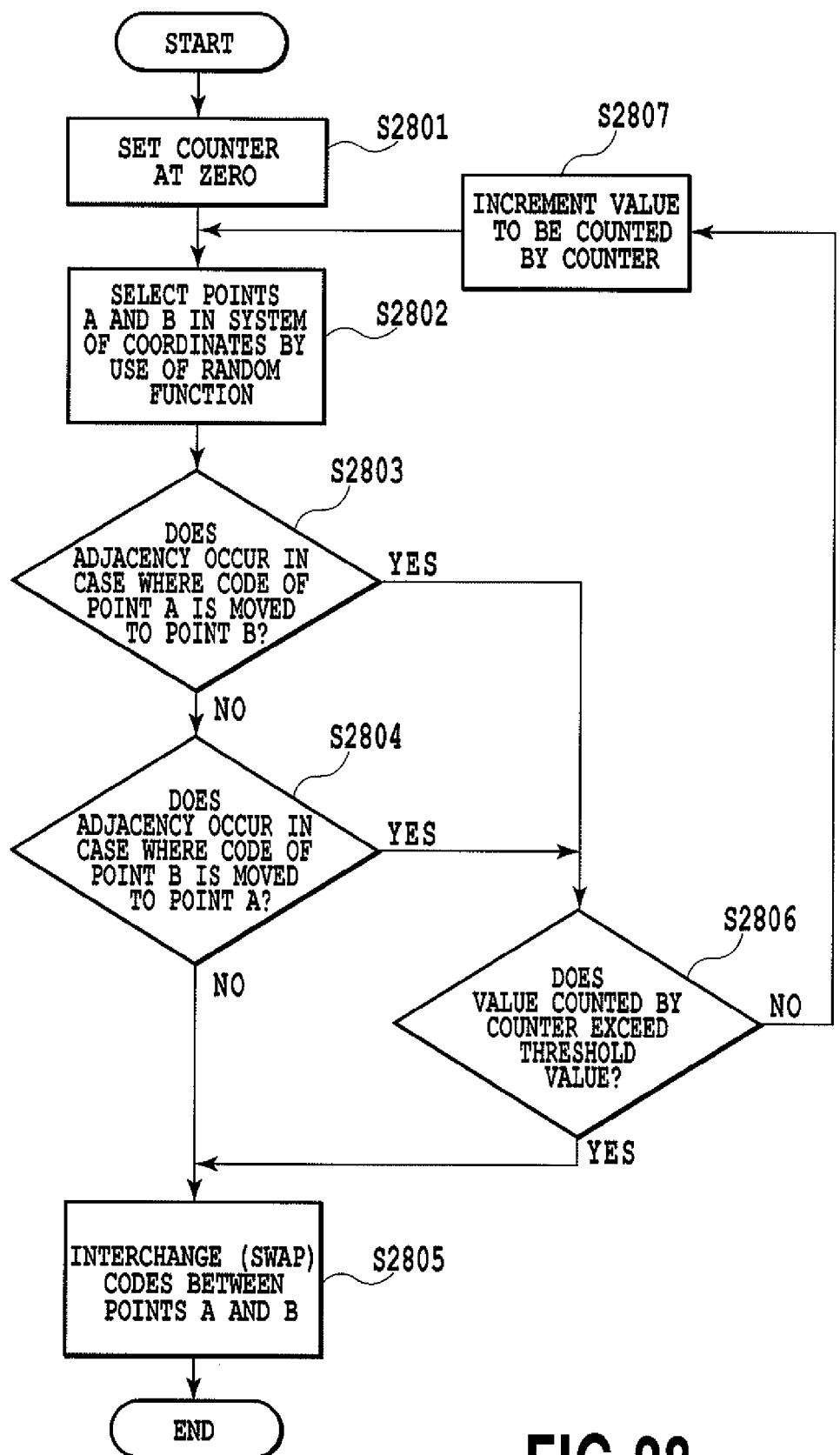
FIG. 28 is a flowchart showing steps for performing the "swapping process with adjacency forbiddance"

FIG. 28 is a flowchart showing details of the "swapping process with adjacency forbiddance."

First of all, a counter to be used for putting a limitation on the repetition of the process of removing adjacency is initialized as an initial process (step S2801). Subsequently, two points are selected by use of a random function (step S2802). Thereafter, it is checked on whether or not any one of points immediately next to each of the two selected points has the same code as the selected point has if codes are swapped between the selected two points (S2803, S2804) In a case where the same codes are not adjacent to each other with respect to both of the two selected points, the codes are swapped between the two selected points (S2805).

When it is determined, in step S2803 or step S2804, that the adjacency occurs, the value counted by the counter is checked on, and thus it is determined whether or not the value counted by the counter exceeds a given threshold value (S2806). In a case where the value counted by the counter exceeds the threshold value, the codes are swapped between the two selected points even if an adjacency occurs. In a case where the value counted by the counter does not exceed the threshold value, the value counted by the counter is incremented (S2807). Subsequently, the processes of step S2802 and subsequent steps are repeated. In this respect, for example, 1000 is set as the threshold value to be compared with the value counted by the counter.

Through the foregoing processes, the swapping of codes between each two selected points in a manner that the same codes are prevented from being adjacent to each other as much as possible, can be realized. In a case where a combination of two consecutive points which causes the same codes not to be adjacent to each other if codes are swapped, can not be selected until the number of repetition reaches the threshold value thus set, the swapping is carried out for the following reason there still remains the adjacency. The reason is that the processes need to be prevented from continuing for a long time or endlessly by completing the main process under condition that a certain level of adjacency is removed from the code arrangement. In theory, a mask pattern with adjacency forbidden therein can be generated if the printing ratios are up to 50%. The closer to 50% the printing ratios are, the more difficult it is to select a combination of two points which causes the same codes not to be adjacent to each. Such a case is a known technique with respect to the random function. For this reason, the descriptions will be omitted.

Figure 29A:
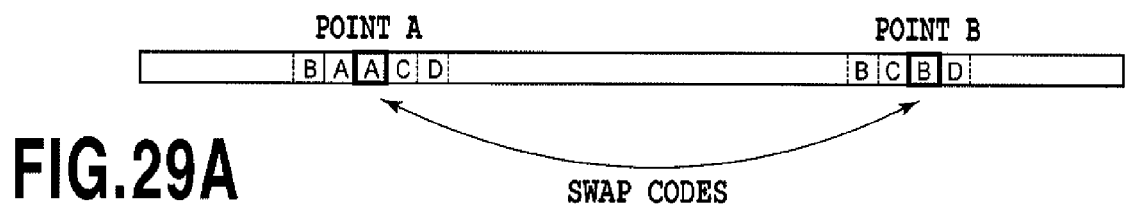
FIGS. 29A to 29C are diagrams for explaining a judgment on whether or not the same codes are adjacent to each other in a case where codes are swapped in the steps for performing the "swapping process with adjacency forbiddance"
Figure 29B:
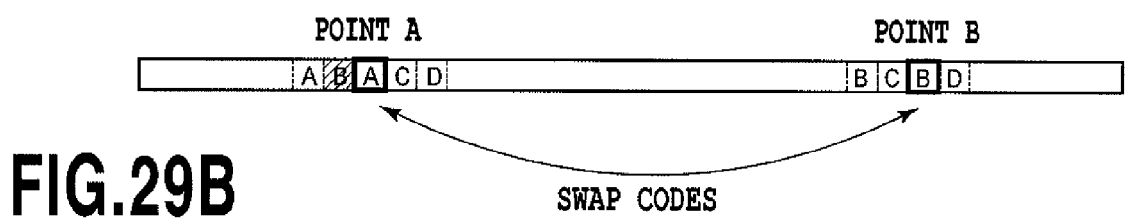
Figure 29C:
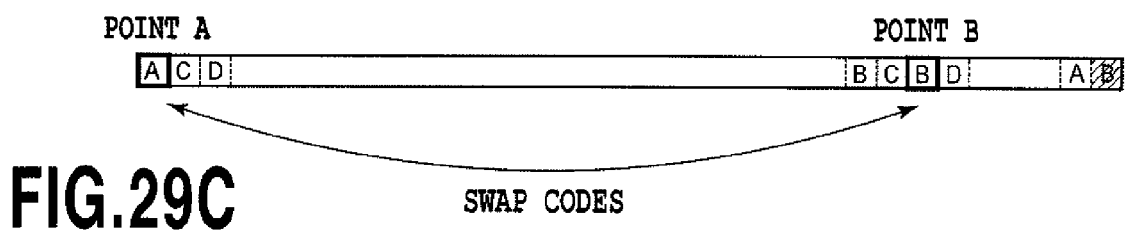

FIGS. 29A to 29C are diagrams for concretely explaining a judgment on whether or not the same codes are adjacent to each other.

FIG. 29A shows a case where when codes of two points (Points A and B), which are selected by use of the random function, are interchanged with each other between Points A and B, the resultant swapped codes of Points A and B are not the same as codes of adjacent points respectively. FIG. 29B shows a case where when codes are swapped between two selected points, and resultantly a point immediately next to Point A has the same code as the Point A has. In addition, FIG. 29C shows a case where Point A exists at an end of a line. In this case, consideration is given to the repeated use of the mask patterns in the case of the multi-pass printing method, and thus data at the opposite end of the same line is checked on. In this case, if a code which is the same as the code assigned to Point B is newly assigned to Point A through swapping, the code newly-assigned to Point A becomes the same as the code currently assigned to the position at the opposite end of the line.

"Adjacency Eliminating Process" Step

FIGS. 30A to 30D are diagrams for explaining the adjacency eliminating process (step S2203 in FIG. 22) to be performed on the code arrangement obtained by removing a certain level of adjacency through the foregoing "swapping process with adjacency forbiddance." In this step, it is checked, with the foregoing code arrangement in the line, whether or not there still remains an adjacency. In a case where there still remains an adjacency, a process of eliminating the adjacency is carried out.

First of all, one point (Start Point shown in FIG. 30A) is selected from the line by use of the random function. Thus, whether or not the same codes are adjacent to each other is sequentially checked on by keeping moving one area to another to the right from Start Point. FIG. 30B shows a case where Codes D are found to be adjacent to each other. Hereinafter, the points where their respective Codes D are found to be adjacent to each other will be referred to as "Point A" for the conveniences of explanation.

Once the same codes are found to be adjacent to each other, subsequently, points where the same codes, except for Codes D, are adjacent to each other are searched for. FIG. 30C shows a status in which Codes A are found to be adjacent to each other at Point B after searching for the same codes, except for Codes D, which are adjacent to each other. After the new adjacency is found, the posterior (right-side) code of the same codes adjacent to each other at Point A is re-assigned to the anterior (left-side) point at Point B. In conjunction with this re-assignment, the codes currently existing between the posterior (right-side) code of the same codes adjacent to each other at Point A and the anterior code of the same codes adjacent to each other at Point B are shifted by one area toward Point A (hereinafter, an operation shown in FIGS. 30C to 30D will be referred to as a "shift operation"). Even in a case where there still remains an adjacency between the same codes, the adjacency can be eliminated securely through this process.

Figure 31:
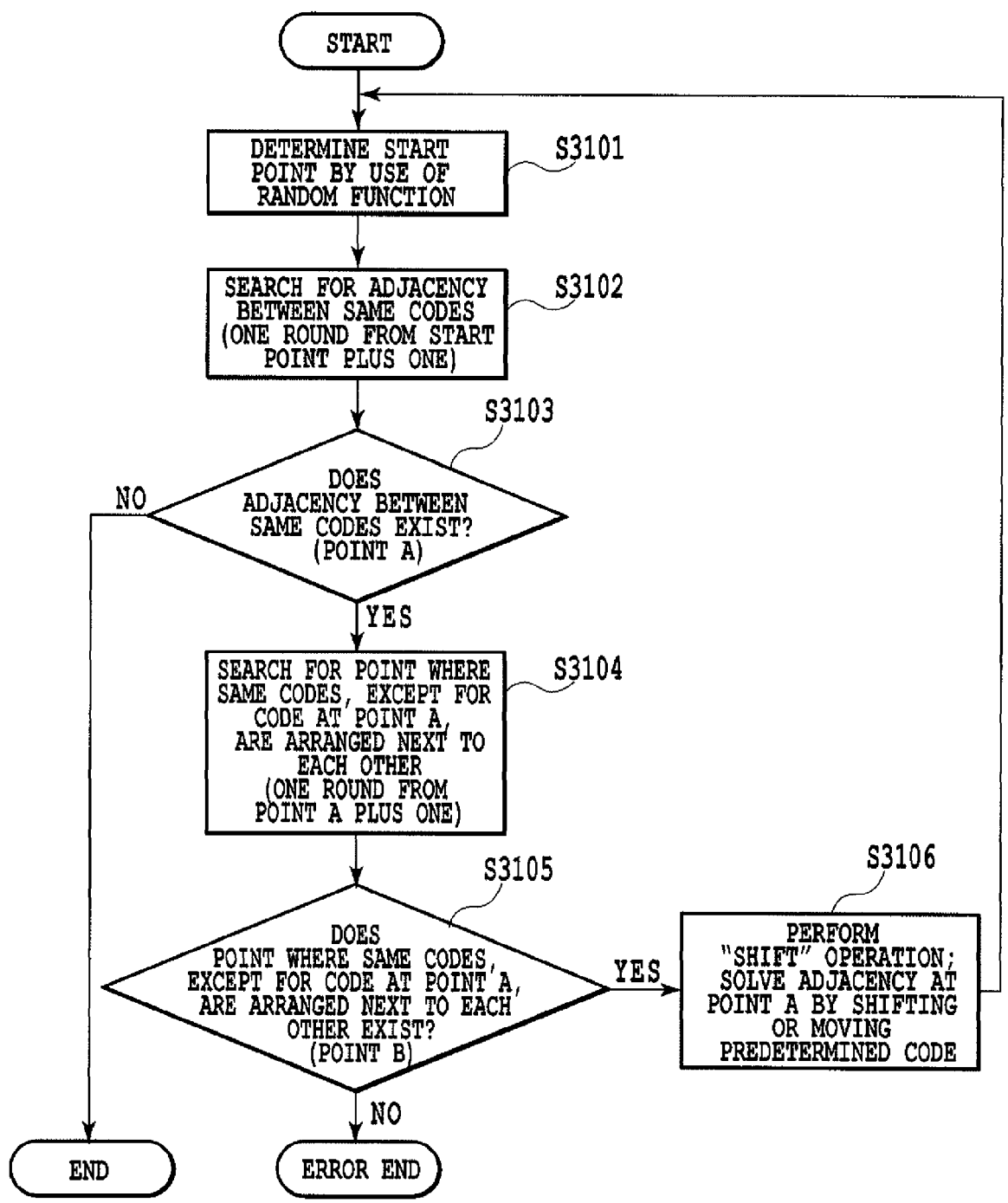
FIG. 31 is a flowchart for explaining the steps for performing the "adjacency eliminating process"

FIG. 31 is a flowchart showing details of processes under the step of performing the "adjacency eliminating process."

First of all, Start Point is determined by use of the random function (step S3101). Subsequently, an adjacency between the same codes is searched for sequentially from Start Point, and thus it is checked on whether or not the same codes are adjacent to each other (steps S3102 and S3103). Once a search point reaches an area at the right end of the line made up of 800 areas, the search restarts from an area at the opposite side of the same line, and similarly continues. If no adjacency between the same codes is found in codes assigned to the areas corresponding to the round of the areas plus one area, the search is terminated.

In a case where the same codes are found to be adjacent to each other, as described above by referring FIG. 30, points (Point B) where another set of the same codes is adjacent to each other, except for the codes of the type whose adjacency has been found, are thereafter searched for (steps S3104 and S3105). Incidentally, as long as the printing ratios are not more than 50%, Point B is always found. In order to provide against a case where the printing ratios are set wrongly, the search is designed to be terminated by judging that the error has occurred if Point B is not found.

Once Point B is found, as described by referring to FIG. 30, the shift operation is carried out (step S3106), and thus the adjacency between the same codes is eliminated. Thereafter, the process returns to the top of the flowchart, and Start Point is newly selected.

"Conversion to Mask Pattern" Step

In the "conversion to mask pattern" step (step S2204 in FIG. 22), the codes in the buffer for making a mask pattern which has the code arrangement in which the adjacency is eliminated between the same codes through the above-described steps are finally converted to the mask data.

FIG. 32A shows a part of the buffer for making the mask pattern in which the adjacency is eliminated, and shows how Codes A, B, C and D are stored in the buffer. FIG. 32B shows a part of the mask data obtained by extracting parts representing Codes A from the storage condition (blackened areas indicate print permitting areas, and whitened areas indicate print non-permitting areas). In addition, FIG. 32B is a diagram showing a mask pattern corresponding to Area 0 shown FIG. 24. Similarly, FIG. 32C shows a pattern obtained by extracting parts representing Codes B from the storage condition, and shows a mask pattern corresponding to Area 1 shown in FIG. 24. Moreover, FIG. 32D shows a pattern obtained by extracting parts representing Codes C from the storage condition, and shows a mask pattern corresponding to Area 2 shown in FIG. 24. Furthermore, FIG. 32E shows a pattern obtained by extracting parts representing Codes D from the storage condition, and shows a mask pattern corresponding to Area 3 shown in FIG. 24.

Figure 33A:
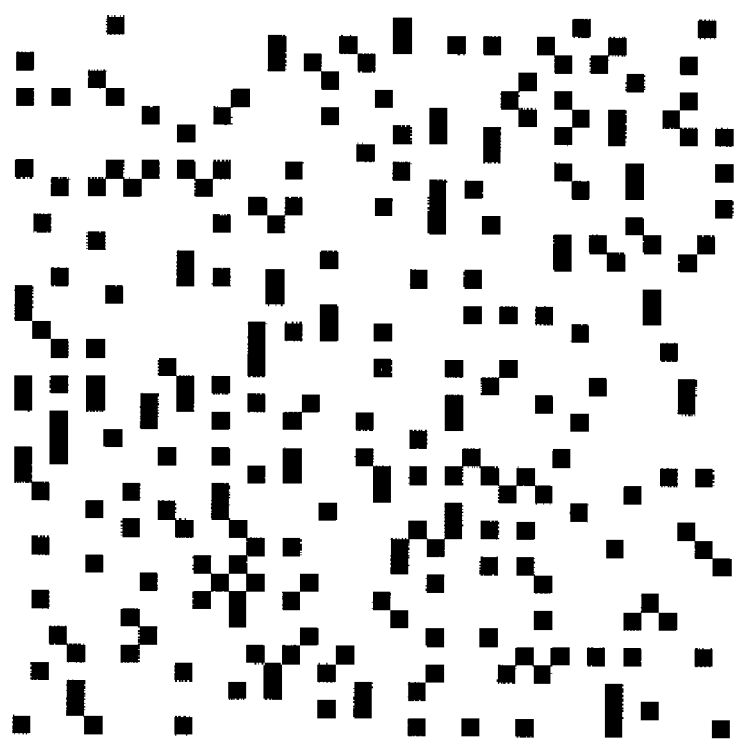
FIGS. 33A and 33B are diagrams for explaining examples of the mask pattern generated in the first embodiment.
Figure 33B:

FIGS. 33A and 33B are diagrams showing examples of a mask pattern generated by use of the method according this embodiment which has been described above. FIG. 33A shows a part of a mask with lower printing ratios. Specifically, this part corresponds to the printing ratios in a vicinity of the left end of Area 0 shown in FIG. 24. FIG. 33B shows a part of a mask with relatively high ratios, and shows a mask pattern corresponding to the printing ratios in vicinities of the boundary between Areas 1 and 2 shown in FIG. 24. As understood from these figures, mask patterns without pieces of data each representing two adjacent print permitting areas in the horizontal direction (the scanning direction) are generated. In each of the mask patterns, print permitting areas are aperiodically arranged in the scanning direction.

Descriptions will be provided for an example of a high-speed printing operation using these mask patterns. An example cited here is a case of using a printing head which takes 100 μsec to enable ink newly refilled in a nozzle to be ejected after ink previously refilled in the nozzle is ejected from the nozzle. In this case, when there is an adjacency in the mask pattern, a print can be made on each of adjacent pixels out of pixels regulating ejecting data at a speed of 10 kHz. In contrast, in a case where a mask pattern with no adjacency is used in the present embodiment, the ejection frequency at which ink is ejected from the printing head is half of the print frequency at which the print is made on the aforementioned print pixel. In this case, if the scanning speed of the printing head is doubled, this makes it possible to make a print on each of pixels defining print data at a printing frequency of 20 kHz.

Properties of Mask Pattern

Figure 34:
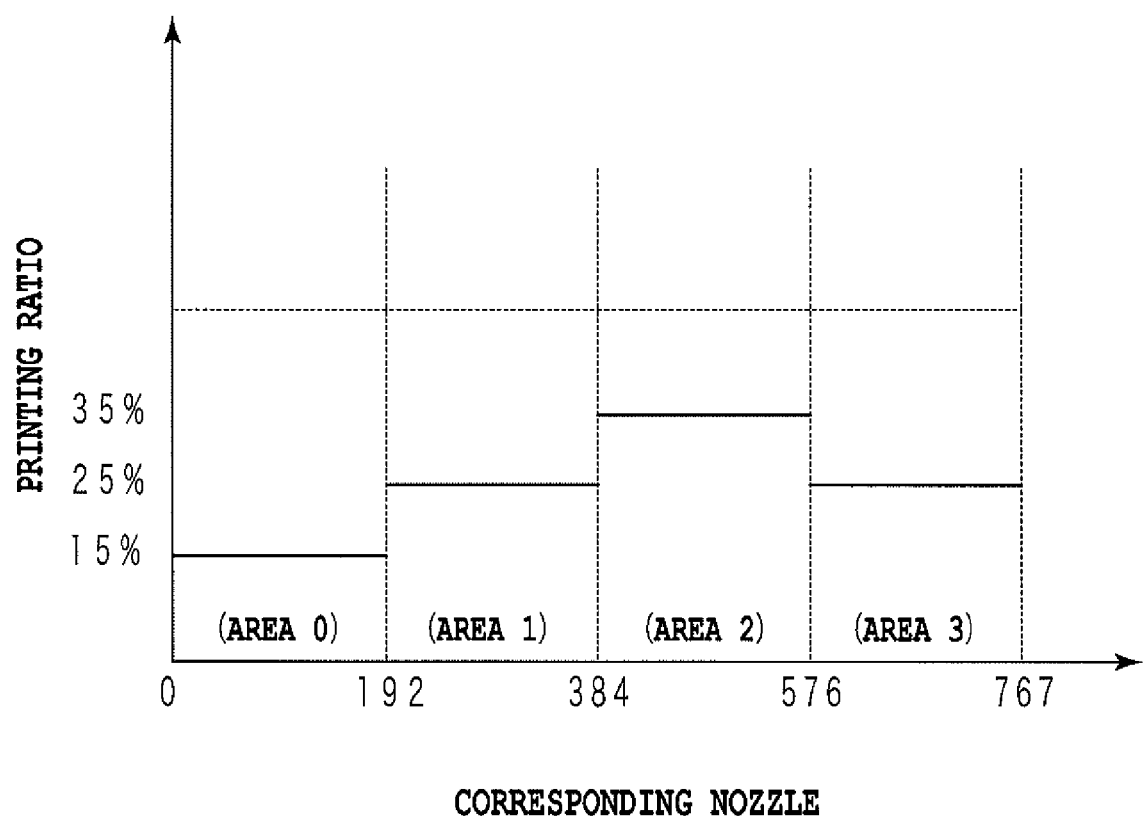
FIG. 34 is a diagram for explaining printing ratios of a mask pattern generated for the purpose of determining properties of the mask pattern according to the first embodiment.

FIG. 34 is a diagram showing how printing ratios are set in a mask pattern to be made for the purpose of determining properties of the mask pattern according to the present embodiment which has been described above. The printing head includes arrayed 768 nozzles for each of the colors. This printing head prints an image for determining the properties by use of the multi-pass printing method with which an image is completed in a given scanning region by scanning four times and by conveying a sheet of paper in a distance equal to the width of the 192 nozzles between each two consecutive scan passes. Out of mask patterns generated on the basis of the present invention, a part of a mask pattern corresponding to Area 0 shown in FIG. 34 is shown in FIG. 35A, and a part of another mask pattern corresponding to Area 2 shown in FIG. 34 is shown in FIG. 35B.

Figure 35A:
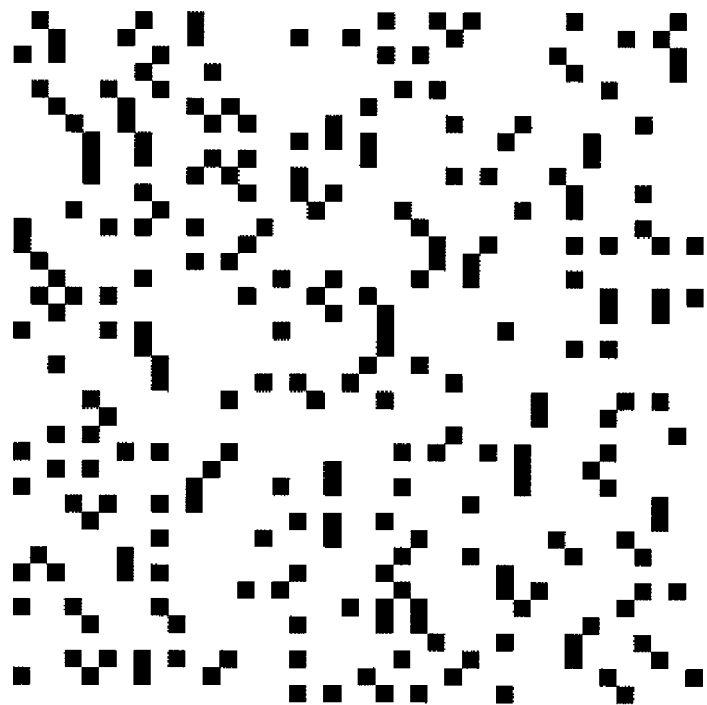
FIGS. 35A and 35B are diagrams for explaining the mask pattern generated for determining the properties.
Figure 35B:
Figure 36A:
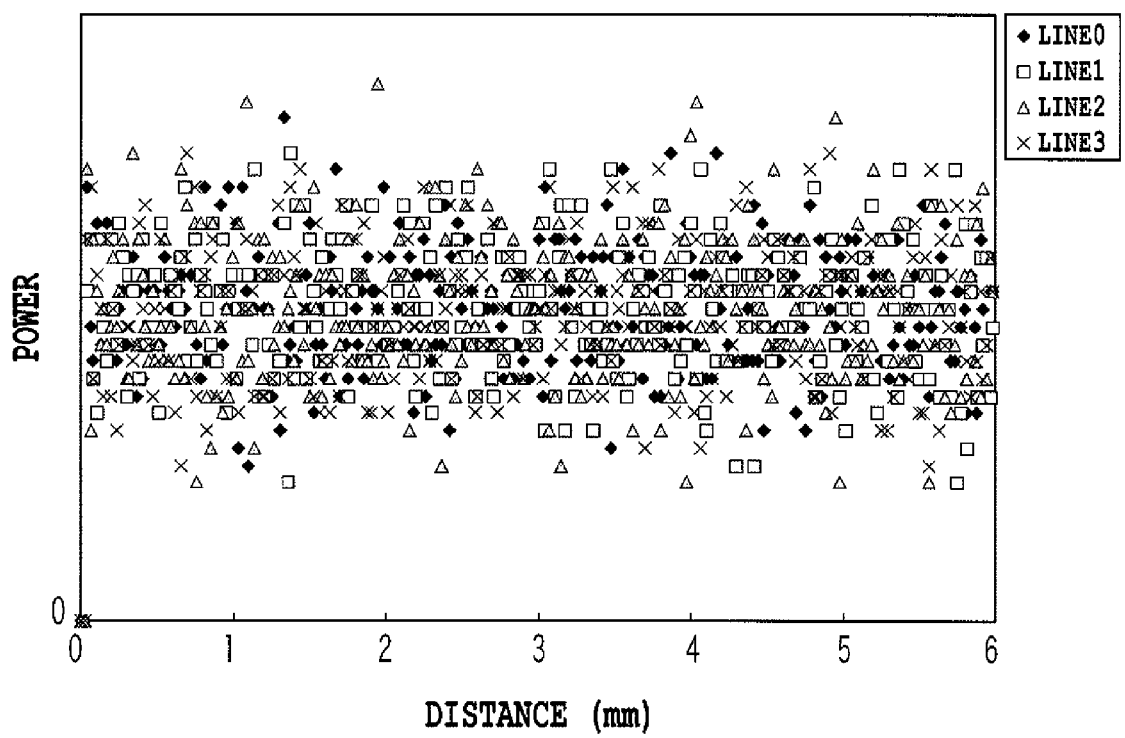
FIGS. 36A and 36B are diagrams for explaining the properties of the mask pattern generated for the purpose of determining the properties.
Figure 36B:
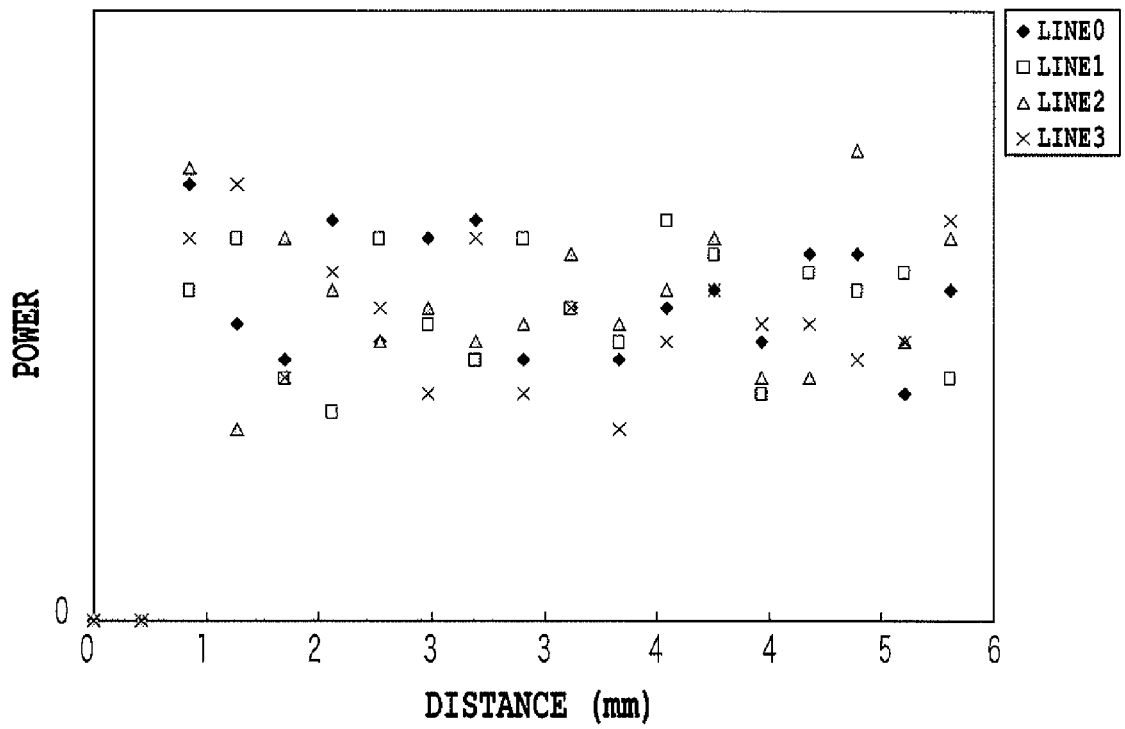

FIGS. 36A and 36B show data obtained by checking on properties of the mask pattern shown in FIG. 35A with respect to distances between print permitting areas.

These data are obtained by checking on frequencies of distances of an arbitrary print permitting area to the other print permitting areas in each of the selected area rows (lines) running in the horizontal direction (the scanning direction) in the mask pattern. More specifically, a focus is placed on one print permitting area in each of the lines, each of the distances of the focused area to the remaining areas in the same line is represented by how many areas away the focused area is from each of the remaining areas. To this end, the number of areas between the focused area and each of the remaining areas in the same line is counted. Sequentially, a focus is placed on one print permitting area in each of the other lines, and the number of areas between the focused area and each of the remaining areas in the same line is counted as the distance therebetween. Thereafter, the data shown in FIG. 36A is obtained by adding up those counted values. Incidentally, judging from the repeated use of the mask pattern, an inter-dot distance from one focused print permitting area exists at the right side, and another inter-dot distance from the same focused print permitting area exists at the left side, in a case where the mask patterns are arranged periodically. However, the number of areas between the focused area and each of the remaining areas in the same line is counted by use of the shorter distance. In FIGS. 36A and 36B, the distances are denominated by the unit of millimeter, and the sum of counted numbers for each of the distances is denominated by "power."

FIG. 36A is a diagram in which the distances are plotted in a relatively wide range in the axis of abscissas. FIG. 36B is a diagram in which the distances are plotted while enlarging a relatively narrow range in a direction equal to the axis of abscissas. In the case of the mask patterns according to the present embodiment, pitches between areas correspond to 1200 dpi. For this reason, the inter-dot distances are denominated by millimeter obtained by conversion from the pitches. In addition, in FIGS. 36A and 36B, data for the mask data of four lines are superposed on one another.

FIG. 36B does not show a point which has no distance from the focused print permitting area, because this calculation adopts a rule that the distance from the focused print permitting area to a single print permitting area of the same area position is not calculated. Data representing a point right next to the point indicates that the right point is away with an adjacent distance, and shows no frequency (power). This means that there is no adjacency between two print permitting areas in the mask. In addition, data representing a point one more right next indicates a frequency at which there is a print permitting area with one blank area of data interposed between the focused piece of data and the piece of data representing the print permitting area. The frequency is slightly higher than the frequency at which there is a print permitting area with a longer distance away therefrom.

Generally speaking, for the purpose of preventing concentration of many pieces of print data in a single scan pass as a result of synchronism between the print data and mask patterns, it is desirable that print data representing all the distances between print permitting areas should appear at the same frequency. That is because one may consider that the synchronism among the print data and mask patterns can be suppressed below a certain level regardless of the distance between the print permitting areas. In this respect, the properties in question are aperiodical properties which make it less likely that the synchronism between the print data and the mask patterns may occur.

Figure 37A:
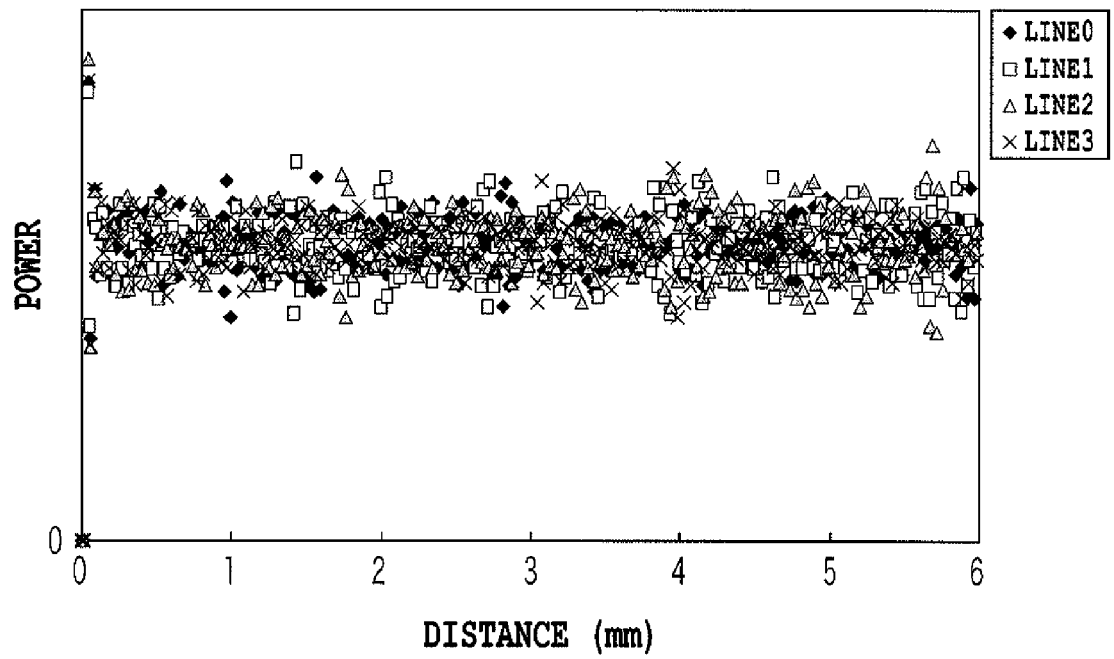
FIGS. 37A and 37B are other diagrams for explaining the properties of the mask pattern generated for the purpose of determining the properties.
Figure 37B:
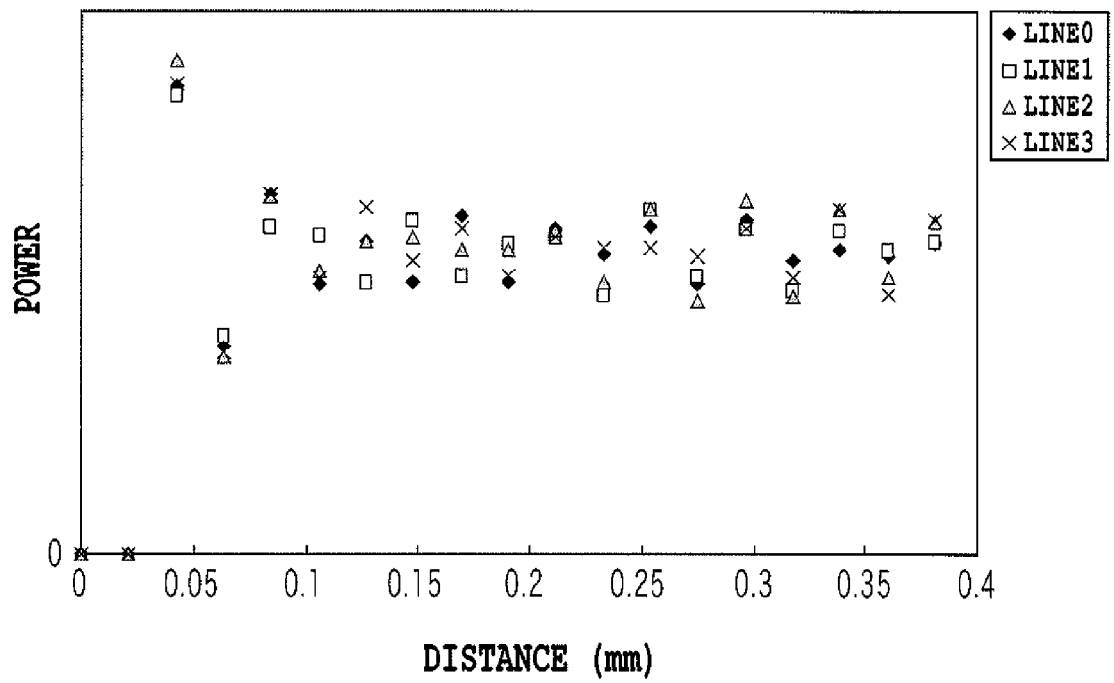

Next, FIGS. 37A and 37B show data indicating characteristics of the distances between the print permitting areas in the mask pattern shown in FIG. 35B. FIG. 37A is a graph in which the distances are plotted in a relatively wide range in the axis of abscissas. FIG. 37B is a graph in which the distances are plotted while enlarging a relatively narrow range in a direction equal to the axis of abscissas.

As shown in FIG. 37B, the result is that pieces of data corresponding to the third shortest inter-area distances exist at a higher frequency, in that, pieces of data with one blank area of data interposed between the focused piece of data and the pieces of data exist at a higher frequency. In other words, the properties shown in this figure are those which make it likely that the synchronism among the print data and the mask data may occur, in comparison with the properties shown in FIG. 36B. However, the frequency is approximately twice as high as the frequency at which pieces of data corresponding to inter-area distances longer by one area exist. For this reason, one may consider that the synchronism between the print data and the mask data is at such a negligible level that the synchronism is not problematic. It can be understood that these properties make it possible to obtain the mask pattern in which periodical fine textures less likely occur.

In the pattern of the gradation mask, the closer to 50% the printing ratios are set, the higher the frequency at which there exist pieces of data with one blank area of data interposed between the focused piece of data and each of the pieces of the data becomes, and the lower the frequency at which there exist pieces of data with two blank areas of data interposed between the focused piece of data and each of the pieces of the data becomes. The inventors of the present application made examinations by changing the setting of print ratios, and obtained data indicating that an image formation is obstructed in a case where one of these frequencies is more than three times as large as the other of the frequencies, when print scanning is made four times. As a result of this finding, if a mask pattern is designed by managing the difference between the frequencies to be within this range, this makes it possible to generate mask patterns which can bring about a preferable print result.

Effect of "Adjacency Eliminating Process"

Figure 38:
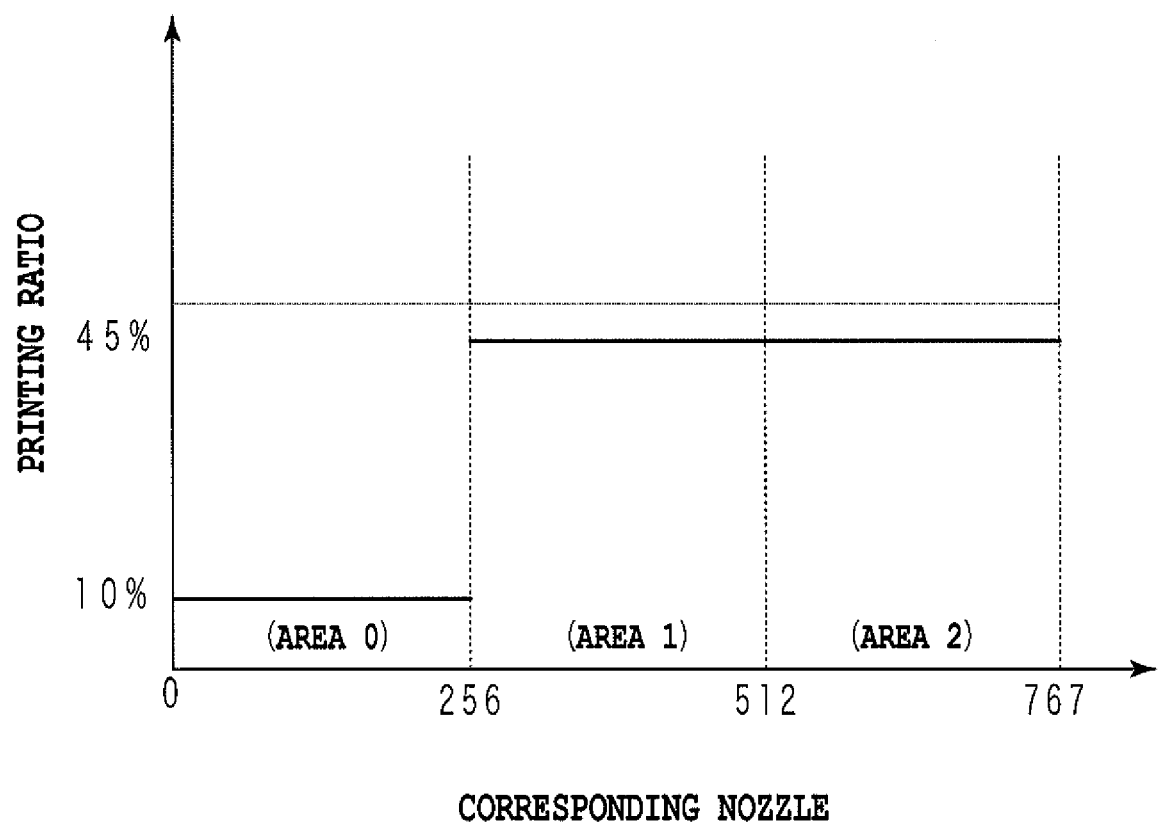
FIG. 38 is a diagram for explaining printing ratios of another mask pattern generated for determining its properties.
Figure 39:
FIG. 39 is a diagram showing an example of a mask pattern made without performing the "adjacency eliminating process"

FIG. 38 shows how the printing ratios are set in a mask pattern with a condition that the printing ratios in Area 1 and the printing ratios in Area 2 are considerably close to each other. FIG. 39 shows a part of the mask pattern, which was prepared with the condition for setting the printing ratios while omitting carrying out the step of performing the "adjacency eliminating process", and which corresponds to Area 1 shown in FIG. 38. It is understood that, as shown in FIG. 39, there still remain adjacencies between print permitting areas in the horizontal direction. This means that, in the case where two points were intended to be selected for swapping codes between the two points in the "swapping process with adjacency forbiddance," two points which caused the same codes not to be adjacent to each other failed to be selected as a result of swapping the codes between the two points. This is because the printing ratios are set to be higher.

Figure 40:
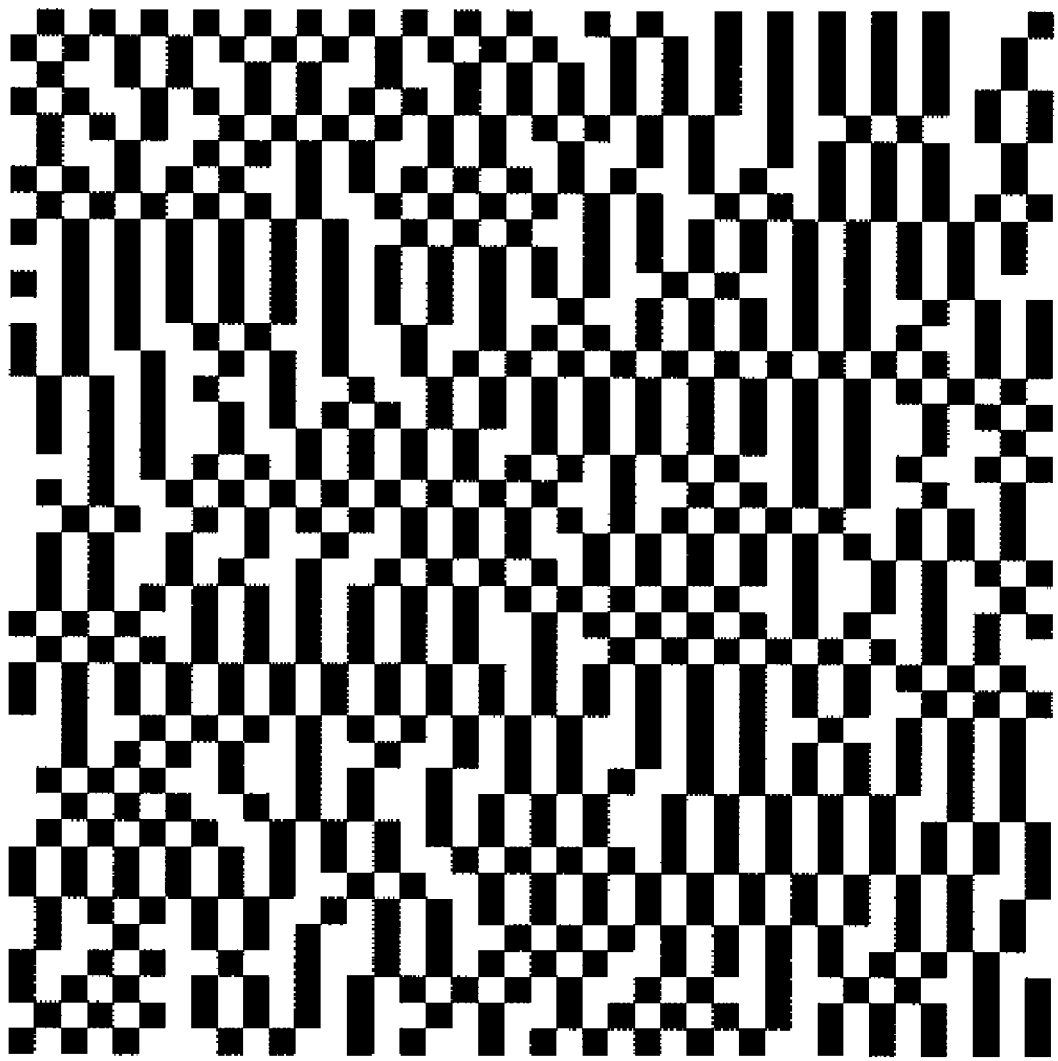
FIG. 40 is a diagram for explaining an effect which is brought about in a case where the "adjacency eliminating process" is performed according to the first embodiment.

FIG. 40 shows a part of mask data generated by performing the "adjacency eliminating process" for the mask patterns of the above condition. It is learned that adjacencies between pieces of data in the horizontal direction, which exist in FIG. 39, are eliminated in FIG. 40.

Under such a condition that the printing ratios are so high, there is a case where image formation is obstructed as follows. This obstruction is that, at an extremely higher frequency, pieces of data are arranged with an inter-dot distance obtained by interposing one blank area of data therebetween in the above-mentioned mask pattern. Even in this case, however, the mask pattern has a sufficiently high image quality for the high-speed mode, and is useful to perform a higher-speed printing operation while avoiding white stripes and the like by setting the printing ratios depending on the positions of the nozzles.

In the case of this embodiment of the present invention, as described above, white stripes and the like can be avoided by setting the printing ratios depending on the positions of the corresponding nozzles. In addition, a mask pattern in which there are no adjacencies between print permitting areas in the horizontal direction (the scanning direction) is generated This makes it possible to perform the printing operation at a higher speed. Moreover, print permitting areas are aperiodically arrayed in the mask pattern. This aperiodical array makes it possible to suppress the synchronism between the mask pattern and the print data.

Second Embodiment

With regard to the first embodiment which has been described above, as shown in FIG. 1, the foregoing descriptions have been provided for the example in which the "adjacency eliminating process" is performed after performing the step of the "swapping process with adjacency forbiddance." With regard to a second embodiment of the present invention, descriptions will be provided for an example in which the "adjacency eliminating process" is not performed.

In a case where, as the duty of the mask pattern, the printing ratios to be set in the "code setting" step are so relative low as to be below a certain level, the performing of the "swapping process with adjacency forbiddance" makes it possible to eliminate the adjacencies between the same codes. This makes it possible to omit the "adjacency eliminating process" depending on the printing ratios to be set. As a result, the series of process for generating the mask pattern can be simplified in comparison with the first embodiment. The experiment result shows that, if the highest print density to be set by use of the "code setting" means is 40%, a mask pattern in which there are no adjacencies between print permitting areas in the horizontal direction can be generated without performing the "adjacency eliminating process."

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-348248, filed Dec. 1, 2005, which is hereby incorporated by reference herein in its entirety.

What is claimed is:

1. A method of generating print data for printing by a plurality of times of scanning of a print head arranging a plurality of nozzles to a given region on a print medium, said method comprising the step of:
    generating print data for printing in each of the plurality of times of scanning, by thinning print data for printing on the given region with use of a plurality of mask patterns corresponding to the plurality of times of scanning, respectively,
    wherein each of the plurality of mask patterns corresponding to the plurality of times of scanning arranges print permitting areas that permit printing based on the print data and print non-permitting areas that do not permit printing based on the print data in a scanning direction, in correspondence with each of the plurality of nozzles, and the print permitting areas are not adjacent to each other in the scanning direction,
    wherein a ratio of the print permitting areas in the mask pattern corresponding to end nozzles of the printing head is smaller than a ratio of the print permitting areas in the mask pattern corresponding to central nozzles of the printing head, and
    wherein each of the plurality of mask patterns arranges the print permitting areas aperiodically in the scanning direction.

2. A printing apparatus for printing by a plurality of times of scanning of a print head arranging a plurality of nozzles to a given region on a print medium, said apparatus comprising:
    a generating unit that generates print data for printing in each of the plurality of times of scanning, by thinning print data for printing on the given region with use of a plurality of mask patterns corresponding to the plurality of times of scanning, respectively,
    wherein each of the plurality of mask patterns corresponding to the plurality of times of scanning arranges print permitting areas that permit printing based on the print data and print non-permitting areas that do not permit printing based on the print data in a scanning direction, in correspondence with each of the plurality of nozzles, and the print permitting areas are not adjacent to each other in the scanning direction,
    wherein a ratio of the print permitting areas in the mask pattern corresponding to end nozzles of the printing head is smaller than a ratio of the print permitting areas in the mask pattern corresponding to central nozzles of the printing head, and
    wherein each of the plurality of mask patterns arranges the print permitting areas aperiodically in the scanning direction.

3. An ink jet printing apparatus which performs a plurality of times of scanning with a print head arranging a plurality of nozzles to a given region on a print medium to print thinned images with use of different nozzle groups of the print head for each of the plurality of times of scanning so that an image to be printed to the given region is completed, said apparatus comprising:
    generating unit that generates print data for printing in each of the plurality of times of scanning, by thinning print data for printing on the given region with use of a plurality of mask patterns corresponding to a plurality of nozzle groups used in the plurality of times of scanning respectively; and
    print controller that prints the thinned image with use of the nozzle group which is opposed to the given region based on the generated print data, in each of the plurality of times of scanning,
    wherein each of the plurality of mask patterns arranges print permitting areas and print non-permitting areas so that a ratio of the print permitting areas corresponding to a nozzle at a part closer to an end of the nozzle arrangement is smaller than a ratio of the print permitting areas corresponding to a nozzle at a part closer to a center of the nozzle arrangement, and the print permitting areas are arranged to be not adjacent to each other and to be aperiodic, in a scanning direction, and wherein a ratio of the print permitting areas in the mask pattern corresponding to the nozzle group including an end nozzle of the printing head are smaller than a ratio of the print permitting areas in the mask pattern corresponding to the nozzle group including no end nozzle.

4. An ink jet printing apparatus which performs a plurality of times of scanning with a print head arranging a plurality of nozzles to a given region on a print medium to print thinned images with use of different nozzles of the print head for each of the plurality of times of scanning so that an image to be printed to the given region is completed, said apparatus comprising:

convey device that conveys the print medium by an amount corresponding to one nozzle group of a plurality of nozzle groups that are made by dividing the plurality of nozzles in predetermined number of parts, in order to oppose each of the plurality of nozzle groups to the given region for each of the plurality of times of scanning;

generating unit that generates print data for printing in each of the plurality of times of scanning, by thinning print data for printing on the given region with use of a plurality of mask patterns corresponding to a plurality of nozzle groups used in the plurality of times of scanning respectively; and print controller that prints the thinned image with use of the nozzle group which is opposed to the given region based on the generated print data, in each of the plurality of times of scanning, wherein each of the plurality of mask patterns arranges print permitting areas and print non-permitting areas so that the farther from a central part of the nozzle arrangement along the nozzle arrangement, ratios of the print permitting areas become smaller, and the print permitting areas are arranged to be not adjacent to each other and to be aperiodic, in a scanning direction, and wherein a ratio of the print permitting areas in the mask pattern corresponding to the nozzle group including an end nozzle of the printing head are smaller than a ratio of the print permitting areas in the mask pattern corresponding to the nozzle group including no end nozzle.

* * * * *